US009500020B2

(12) United States Patent
Imai et al.

(10) Patent No.: US 9,500,020 B2
(45) Date of Patent: Nov. 22, 2016

(54) WINDOW OPENING-CLOSING CONTROL SYSTEM AND WINDOW OPENING-CLOSING CONTROL APPARATUS

(71) Applicants: Hidekazu Imai, Dublin, OH (US); Katsunori Kigoshi, Aichi (JP); Kenji Sato, Osaka (JP); Atsushi Fujita, Aichi (JP); Akihiro Kakamu, Gifu (JP); Naoyuki Yokoyama, Aichi (JP); Yosuke Yamamoto, Aichi (JP); Daisuke Ogawa, Aichi (JP)

(72) Inventors: Hidekazu Imai, Dublin, OH (US); Katsunori Kigoshi, Aichi (JP); Kenji Sato, Osaka (JP); Atsushi Fujita, Aichi (JP); Akihiro Kakamu, Gifu (JP); Naoyuki Yokoyama, Aichi (JP); Yosuke Yamamoto, Aichi (JP); Daisuke Ogawa, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/749,972

(22) Filed: Jun. 25, 2015

(65) Prior Publication Data

US 2015/0376932 A1 Dec. 31, 2015

(30) Foreign Application Priority Data

Jun. 26, 2014 (JP) ................................ 2014-131166

(51) Int. Cl.

| | |
|---|---|
| ***B60R 22/00*** | (2006.01) |
| ***G05D 1/00*** | (2006.01) |
| ***E05F 15/73*** | (2015.01) |
| ***E05F 15/695*** | (2015.01) |

(52) U.S. Cl.
CPC ............ *E05F 15/73* (2015.01); *E05F 15/695* (2015.01); *E05Y 2900/55* (2013.01)

(58) Field of Classification Search
CPC combination set(s) only.
See application file for complete search history.

(56) References Cited

FOREIGN PATENT DOCUMENTS

| | | |
|---|---|---|
| JP | 06-343279 A | 12/1994 |
| JP | 2008-019625 A | 1/2008 |

*Primary Examiner* — Bhavesh V Amin
(74) *Attorney, Agent, or Firm* — Osha Liang LLP

(57) ABSTRACT

If closing operation to the passenger's seat sub switch continues for not less than a prescribed time period Tb, a passenger's seat relay contact on a close side is turned ON. If the closing operation to the passenger's seat sub switch thereafter ends before a prescribed time period Tc elapses, the passenger's seat relay contact on the close side is kept ON. If opening operation to the passenger's seat sub switch continues for not less than the prescribed time period Tb, a passenger's seat relay contact on an open side is turned ON. If the opening operation to the passenger's seat sub switch thereafter ends before the prescribed time period Tc elapses, the passenger's seat relay contact on the open side is kept ON. The invention is applicable to an automatic window system and the like.

8 Claims, 34 Drawing Sheets

WINDOW OPENING-CLOSING CONTROL SYSTEM AND WINDOW OPENING-CLOSING CONTROL APPARATUS

CROSS-REFERENCE TO RELATED APPLICATION

This application is based on Japanese Patent Application No. 2014-131166 filed with the Japan Patent Office on Jun. 26, 2014, the entire contents of which are incorporated herein by reference.

FIELD

The disclosure relates to a window opening-closing control system and a window opening-closing control apparatus, and particularly relates to a window opening-closing control system and a window opening-closing control apparatus configured to open and close windows at vehicle seats in addition to a driver's seat at the driver's seat.

BACKGROUND

In an automatic window system configured to open and close a vehicle window with an electric motor, the motor rotates positively or negatively in accordance with a state of operation to an operation switch, to open or close the window. For example, the motor rotates positively to close the window if the operation switch is operated to a close side (an UP side) whereas the motor rotates negatively to open the window if the operation switch is operated to an open side (a DOWN side). Positive and negative rotation of the motor is controlled by switching a direction of current flowing to the motor at a motor driving circuit in accordance with a signal transmitted from the operation switch.

An automobile is typically equipped with operation switches at a driver's seat and other seats (a front passenger's seat, a rear right passenger's seat, a rear left passenger's seat, and the like). The operation switch at the driver's seat (main switch) includes a driver's seat switch configured to open and close a driver's seat window as well as passenger's seat switches each configured to remotely open and close a corresponding one of passenger's seat windows. The operation switch at each of the passenger's seats (sub switch) is configured to open and close only the corresponding passenger's seat window. There is further provided a controller configured to control opening and closing the windows in accordance with operation to the main switch and the sub switches.

Window opening-closing control includes control to open or close a window only while an operation switch is operated (manual motion) and control to open or close a window until the window is entirely opened or closed even if operation is stopped (automatic motion). An operation switch for automatic motion of the driver's seat window is typically provided only with the main switch whereas each of the sub switches is provided only with an operation switch for manual motion.

JP 2008-19625 A discloses a window opening-closing control apparatus that includes controllers provided respectively to a main switch at a driver's seat and sub switches at passenger's seats, and the controller for each of the seats is configured to control manual motion and automatic motion of a window at the corresponding seat. The controllers for the respective seats are connected via a serial communication line in the window opening-closing control apparatus. If the driver's seat main switch is operated to open or close one of passenger's seat windows, the controller for the driver's seat communicates to the controller for the corresponding seat via the serial communication line and the controller for this seat controls to drive a motor.

JP 06-343279 A discloses a window opening-closing control apparatus that includes a single controller configured to control a driving motor for a window at each seat in response to input to a main switch at a driver's seat or to a sub switch at each passenger's seat. The sub switch at each passenger's seat is provided with an automatic switch. Operation to the automatic switch enables a window at the passenger's seat to open and close automatically.

SUMMARY

One or more embodiments of the disclosure provide a window opening-closing control system and a window opening-closing control apparatus configured to automatically open and close a window at a passenger's seat with an operation switch that is provided at the passenger's seat, includes a contact for manual operation, and is not provided with any member for automatic operation.

One or more embodiments of the disclosure provide a window opening-closing control system configured to control opening and closing a window at a driver's seat and a window at a passenger's seat other than the driver's seat in a vehicle, the window opening-closing control system including: a passenger's seat unit provided at the passenger's seat; and a window opening-closing control apparatus provided at the driver's seat and configured to control a driver's seat motor configured to open and close the window at the driver's seat and a passenger's seat motor configured to open and close the window at the passenger's seat; the passenger's seat unit including: a momentary passenger's seat sub switch having a first contact operated to close the window at the passenger's seat and a second contact operated to open the window at the passenger's seat; the first contact including: a first common terminal connected to a first end of the passenger's seat motor; a first normally opened terminal connected to a positive electrode of a power supply of the vehicle via a wire, and connected to the first common terminal in response to closing operation for closing the window at the passenger's seat; and a first normally closed terminal; the second contact including: a second common terminal connected to a second end of the passenger's seat motor; a second normally opened terminal connected to the positive electrode of the power supply via the wire, and connected to the second common terminal in response to opening operation for opening the window at the passenger's seat; and a second normally closed terminal; the window opening-closing control apparatus including: a driver's seat main switch operated to open and close the window at the driver's seat; a passenger's seat main switch having a third contact operated to close the window at the passenger's seat and a fourth contact operated to open the window at the passenger's seat, the passenger's seat main switch operated to open and close the window at the passenger's seat; a motor current detector configured to detect current flowing to the passenger's seat motor; a first relay circuit unit including a first common relay terminal connected to the first normally closed terminal, a first normally opened relay terminal connected to the positive electrode of the power supply, and a first normally closed relay terminal connected to ground; a second relay circuit unit including a second common relay terminal connected to the second normally closed terminal, a second normally opened relay terminal connected to the positive electrode of the power supply, and a second normally closed relay terminal connected to ground; an operation detector configured to detect operation to the passenger's seat sub switch in accordance with motor current detected by the motor current detector;

and an opening-closing controller configured to control the first relay circuit unit and the second relay circuit unit in accordance with the operation to the passenger's seat sub switch; in which the operation detector detects whether the closing operation or the opening operation is performed to the passenger's seat sub switch in accordance with an amount of the motor current and detects duration of the operation to the passenger's seat sub switch, and the opening-closing controller controls the first relay circuit unit or the second relay circuit unit to execute automatic motion of automatically closing or opening the window at the passenger's seat in accordance with the duration of the operation to the passenger's seat sub switch.

The window opening-closing control system according to one or more embodiments of the disclosure detects whether the closing operation for closing the window at the passenger's seat or the opening operation for opening the window at the passenger's seat is performed to the passenger's seat sub switch in accordance with the amount of the motor current, detects the duration of the operation to the passenger's seat sub switch, and controls the first relay circuit unit or the second relay circuit unit to execute the automatic motion of automatically closing or opening the window at the passenger's seat in accordance with the duration of the operation to the passenger's seat sub switch.

The window at the passenger's seat can be thus opened and closed automatically with the operation switch that is provided at the passenger's seat, includes the contact for manual operation, and is not provided with any member for automatic operation.

The operation detector and the opening-closing controller can be each embodied by a CPU or the like.

The operation detector can control the first relay circuit unit or the second relay circuit unit to execute the automatic motion if the duration of the operation to the passenger's seat sub switch is less than a predetermined first prescribed time period.

The window at the passenger's seat can be thus opened and closed automatically by short push operation or the like to the passenger's seat operation switch.

If the operation detector detects that the duration of the closing operation to the passenger's seat sub switch is not less than a predetermined second prescribed time period shorter than the first prescribed time period and less than the first prescribed time period, the opening-closing controller can connect the first common relay terminal and the first normally opened relay terminal for the second prescribed time period and can keep the connection for more than the first prescribed time period, if the operation detector detects that the duration of the closing operation to the passenger's seat sub switch is not less than the first prescribed time period, the opening-closing controller can connect the first common relay terminal and the first normally opened relay terminal for the second prescribed time period and can subsequently switch to connect the first common relay terminal to the first normally closed relay terminal for the first prescribed time period, if the operation detector detects that the duration of the opening operation to the passenger's seat sub switch is not less than a predetermined second prescribed time period shorter than the first prescribed time period and less than the first prescribed time period, the opening-closing controller can connect the second common relay terminal and the second normally opened relay terminal for the second prescribed time period and can keep the connection for more than the first prescribed time period, and if the operation detector detects that the duration of the opening operation to the passenger's seat sub switch is not less than the first prescribed time period, the opening-closing controller can connect the second common relay terminal and the second normally opened relay terminal for the second prescribed time period and can subsequently switch to connect the second common relay terminal to the second normally closed relay terminal for the first prescribed time period.

The window at the passenger's seat can be thus opened and closed automatically by short push operation or the like to the passenger's seat operation switch, and can be also prevented from opening and closing discontinuously.

The opening-closing controller connects the first common relay terminal and the first normally opened relay terminal if the closing operation to the passenger's seat sub switch ends before the first prescribed time period elapses, and the opening-closing controller connects the second common relay terminal and the second normally opened relay terminal if the opening operation to the passenger's seat sub switch ends before the first prescribed time period elapses.

The window at the passenger's seat can be thus opened and closed automatically by short push operation or the like to the passenger's seat operation switch.

The opening-closing controller can control the first relay circuit unit or the second relay circuit unit to execute the automatic motion if the duration of the operation to the passenger's seat sub switch is more than a predetermined third prescribed time period.

The window at the passenger's seat can be thus opened and closed automatically by long push operation or the like to the passenger's seat operation switch.

The opening-closing controller can connect the first common relay terminal and the first normally opened relay terminal if the closing operation to the passenger's seat sub switch continues for not less than the third prescribed time period and can keep the connection between the first common relay terminal and the first normally opened relay terminal after the closing operation ends, and the opening-closing controller can connect the second common relay terminal and the second normally opened relay terminal if the opening operation to the passenger's seat sub switch continues for not less than the first prescribed time period and can keep the connection between the second common relay terminal and the second normally opened relay terminal after the opening operation ends.

The window at the passenger's seat can be thus opened and closed automatically by long push operation or the like to the passenger's seat operation switch.

The operation detector can detect whether the closing operation or the opening operation is performed to the passenger's seat sub switch in accordance with the amount of the motor current.

An operation direction of the passenger's seat sub switch can be thus detected with no provision of any sensor or the like.

One or more embodiments of the disclosure also provide a window opening-closing control apparatus connected to a passenger's seat unit provided at a passenger's seat other than a driver's seat in a vehicle, the passenger's seat unit including: a momentary passenger's seat sub switch having a first contact operated to close a window at the passenger's seat and a second contact operated to open the window at the passenger's seat; the first contact including: a first common terminal connected to a first end of a passenger's seat motor configured to open and close the window at the passenger's seat; a first normally opened terminal connected to a positive electrode of a power supply of the vehicle via a wire, and connected to the first common terminal in response to closing operation for closing the window at the passenger's seat; and a first normally closed terminal; the second contact including: a second common terminal connected to a second end of the passenger's seat motor; a second normally opened terminal connected to the positive electrode of the power supply via the wire, and connected to the second common terminal in response to opening operation for opening the window at the passenger's seat; and a second normally closed terminal; the window opening-closing control apparatus provided at the driver's seat in the vehicle and configured to control a driver's seat motor configured to open and close a window at the driver's seat and the passenger's seat motor; the window opening-closing control apparatus including: a driver's seat main switch operated to open and close the window at the driver's seat; a passenger's seat main switch having a third contact operated to close the window at the passenger's seat and a fourth contact operated to open the window at the passenger's seat, the passenger's seat main switch operated to open and close the window at the passenger's seat; a motor current detector configured to detect current flowing to the passenger's seat motor; a first relay circuit unit including a first common relay terminal connected to the first normally closed terminal, a first normally opened relay terminal connected to the positive electrode of the power supply, and a first normally closed relay terminal connected to ground; a second relay circuit unit including a second common relay terminal connected to the second normally closed terminal, a second normally opened relay terminal connected to the positive electrode of the power supply, and a second normally closed relay terminal connected to ground; an operation detector configured to detect operation to the passenger's seat sub switch in accordance with motor current detected by the motor current detector; and an opening-closing controller configured to control the first relay circuit unit and the second relay circuit unit in accordance with the operation to the passenger's seat sub switch; in which the operation detector detects whether the closing operation or the opening operation is performed to the passenger's seat sub switch in accordance with an amount of the motor current and detects duration of the operation to the passenger's seat sub switch, and the opening-closing controller controls the first relay circuit unit or the second relay circuit unit to execute automatic motion of automatically closing or opening the window at the passenger's seat in accordance with the duration of the operation to the passenger's seat sub switch.

The window opening-closing control apparatus according to one or more embodiments of the disclosure detects whether the closing operation for closing the window at the passenger's seat or the opening operation for opening the window at the passenger's seat is performed to the passenger's seat sub switch in accordance with the amount of the motor current, detects the duration of the operation to the passenger's seat sub switch, and controls the first relay circuit unit or the second relay circuit unit to execute the automatic motion of automatically closing or opening the window at the passenger's seat in accordance with the duration of the operation to the passenger's seat sub switch.

The window at the passenger's seat can be thus opened and closed automatically with the operation switch that is provided at the passenger's seat, includes the contact for manual operation, and is not provided with any member for automatic operation.

The operation detector and the opening-closing controller can be each embodied by a CPU or the like.

According to the one or more embodiments of the disclosure, the window at the passenger's seat can be opened and closed automatically with the operation switch that is provided at the passenger's seat, includes the contact for manual operation, and is not provided with any member for automatic operation.

DETAILED DESCRIPTION

Embodiments of the disclosure (hereinafter, referred to as embodiments) will now be described below. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention. Description will be made in the following order.

1. Embodiments

2. Modification examples

<1. Embodiments>

{Exemplary Configuration of Automatic Window System 1}

Figure 1:
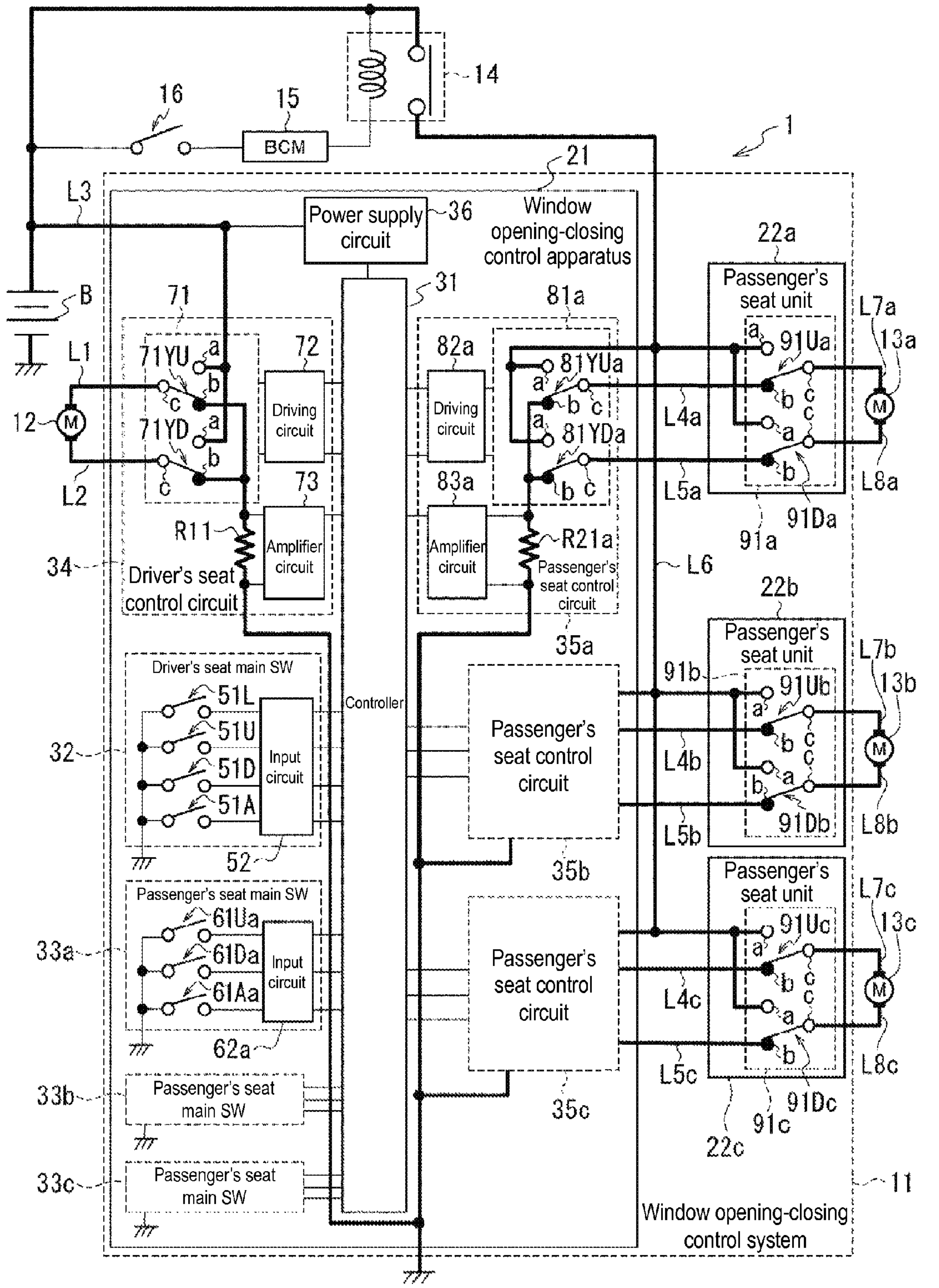
FIG. 1 is a circuit diagram of an automatic window system according to one or more embodiments of the disclosure.

FIG. 1 is a circuit diagram depicting an exemplary configuration of the automatic window system 1, as an automatic window system according to one or more embodiments of the disclosure. The following description relates to a case where the automatic window system 1 opens and closes four vehicle windows at a driver's seat, a front passenger's seat, a rear right passenger's seat, and a rear left passenger's seat.

The window at the driver's seat, the window at the front passenger's seat, the window at the rear right passenger's seat, and the window at the rear left passenger's seat will be also simply referred to as the driver's seat window, the front passenger's seat window, the rear right passenger's seat window, and the rear left passenger's seat window, respectively. Each of the seats other than the driver's seat will be generically referred to as a passenger's seat.

The automatic window system 1 includes a window opening-closing control system 11, a motor 12, motors 13*a* to 13*c*, a main relay 14, a body control module (BCM) 15, an ignition switch 16, and a power supply B.

The window opening-closing control system 11 includes an operation unit configured to open and close a vehicle window. The window opening-closing control system 11 controls turning ON/OFF and a direction of motor current flowing to the motors 12 and 13*a* to 13*c* in accordance with operation to the operation unit, so as to control opening and closing each vehicle window. The motor 12 is configured to open and close the driver's seat window, whereas the motors 13*a* to 13*c* are configured to open and close the front passenger's seat window, the rear right passenger's seat window, and the rear left passenger's seat window, respectively.

The main relay 14 opens and closes an electric circuit from the power supply B to each of the motors 13*a* to 13*c* under the control of the BCM 15. Specifically, the BCM 15 turns ON a contact of the main relay 14 if the ignition switch 16 is turned ON. Motor current can be supplied from the power supply B to each of the motors 13*a* to 13*c* in this case, to open and close the front passenger's seat window and the rear right and rear left passenger's seat windows. In contrast, the BCM 15 turns OFF the contact of the main relay 14 if the ignition switch 16 is turned OFF. Motor current cannot be supplied from the power supply B to each of the motors 13*a* to 13*c* in this case, so as not to open and close the front passenger's seat window and the rear right and rear left passenger's seat windows.

The power supply B can be configured as a battery provided to the vehicle, and supplies driving power for each unit in the automatic window system 1.

The window opening-closing control system 11 includes a window opening-closing control apparatus 21, and passenger's seat units 22*a* to 22*c*. The passenger's seat units 22*a* to 22*c* are connected to a positive electrode of the power supply B via the main relay 14.

The window opening-closing control apparatus 21 is disposed near the driver's seat (e.g. inside a door at the driver's seat), and is configured to open and close, at the driver's seat, the driver's seat window and the passenger's seat windows. The window opening-closing control apparatus 21 can be configured as a single unit including a single case and respective components accommodated therein.

The passenger's seat unit 22*a* is disposed near the front passenger's seat (e.g. inside a door at the front passenger's seat), and is configured to open and close the front passenger's seat window at the front passenger's seat.

The passenger's seat unit 22*b* is disposed near the rear right passenger's seat (e.g. inside a door at the rear right passenger's seat), and is configured to open and close the rear right passenger's seat window at the rear right passenger's seat.

The passenger's seat unit 22*c* is disposed near the rear left passenger's seat (e.g. inside a door at the rear left passenger's seat), and is configured to open and close the rear left passenger's seat window at the rear left passenger's seat.

The window opening-closing control apparatus 21 includes a controller 31, a driver's seat main switch 32, passenger's seat main switches 33*a* to 33*c*, a driver's seat control circuit 34, passenger's seat control circuits 35*a* to 35*c*, and a power supply circuit 36.

The controller 31 can be configured as a central processing unit (CPU). The controller 31 controls the driver's seat control circuit 34 and the passenger's seat control circuits 35*a* to 35*c* in accordance with operation to the driver's seat main switch 32 and the passenger's seat main switches 33*a* to 33*c*, so as to control opening and closing the vehicle windows. The controller 31 also detects a motion direction of each window (whether it is opening or closing), a position of each window in an opening-closing direction (hereinafter, simply referred to as a position of each window), and interposition, in accordance with detection results and the like of motor current supplied from the driver's seat control circuit 34 and the passenger's seat control circuits 35*a* to 35*c*. Interposition herein indicates a phenomenon that an object is interposed between a closing window and a vehicle body.

The driver's seat main switch 32 is a momentary operation switch configured to open and close the driver's seat window at the driver's seat. The driver's seat main switch 32 includes contacts 51L, 51U, 51D, and 51A, as well as an input circuit 52.

The contact 51L is of a normally opened type and is operated to set a locking function of invalidating operation to passenger's seat sub switches 91*a* to 91*c* in the passenger's seat units 22*a* to 22*c*. The contact 51L is turned ON if operation for setting the locking function is performed, and is turned OFF if operation for canceling the locking function is performed.

The contact 51U is of the normally opened type and is operated to close the driver's seat window. The contact 51U is turned ON if closing operation for closing the driver's seat window is performed to the driver's seat main switch 32, and is turned OFF if the closing operation is not performed.

The contact 51D is of the normally opened type and is operated to open the driver's seat window. The contact 51D is turned ON if opening operation for opening the driver's seat window is performed to the driver's seat main switch 32, and is turned OFF if the opening operation is not performed.

The contact 51A is of the normally opened type and is operated to automatically open and close the driver's seat window. The contact 51A is turned ON if closing operation for automatically closing the driver's seat window (hereinafter, referred to as automatically closing operation) or opening operation for automatically opening the driver's seat window (hereinafter, referred to as automatically opening operation) is performed to the driver's seat main switch 32.

Closing operation for manually closing a window will be also referred to as manually closing operation in comparison to the automatically closing operation, whereas opening operation for manually opening a window will be also referred to as manually opening operation.

The manual operation and the automatic operation to the driver's seat main switch 32 are performed in different manners according to specifications of the switch. For example, the manual operation and the automatic operation are distinguished from each other depending on stress of the operation to an operation knob (not depicted) of the driver's seat main switch 32. The manually closing operation can be performed by lightly pulling upward the operation knob, and the automatically closing operation can be performed by applying more force to further heavily pull upward the operation knob. In contrast, the manually opening operation can be performed by lightly pushing the operation knob, and the automatically opening operation can be performed by applying more force to further heavily push downward the operation knob.

Alternatively, the manual operation and the automatic operation are distinguished from each other depending on operation time periods to the operation knob of the driver's seat main switch. The manually closing operation can be performed by pulling upward the operation knob for less than a predetermined time period, and the automatically closing operation can be performed by pulling upward the operation knob for not less than the predetermined time period. In contrast, the manually opening operation can be performed by pushing the operation knob for less than the predetermined time period, and the automatically opening operation can be performed by pushing the operation knob for not less than the predetermined time period.

The input circuit 52 transmits, to the controller 31, signals indicating states of the contacts 51L, 51U, 51D, and 51A.

The passenger's seat main switch 33*a* is a momentary operation switch configured to open and close the front passenger's seat window at the driver's seat. The passenger's seat main switch 33*a* includes contacts 61Ua, 61Da, and 61Aa, as well as an input circuit 62*a*.

The contact 61Ua is of the normally opened type and is operated to close the front passenger's seat window. The contact 61Ua is turned ON if the closing operation for closing the front passenger's seat window is performed to the passenger's seat main switch 33*a*, and is turned OFF if the closing operation is not performed.

The contact 61Da is of the normally opened type and is operated to open the front passenger's seat window. The contact 61Da is turned ON if the opening operation for opening the front passenger's seat window is performed to the passenger's seat main switch 33*a*, and is turned OFF if the opening operation is not performed.

The contact 61Aa is of the normally opened type and is operated to automatically open and close the front passenger's seat window. The contact 61Aa is turned ON if the automatically closing operation or the automatically opening operation is performed to the passenger's seat main switch 33*a*.

The manual operation and the automatic operation to the passenger's seat main switch 33*a* can be performed in manners similar to the manual operation and the automatic operation to the driver's seat main switch 32.

The input circuit 62*a* transmits, to the controller 31, signals indicating states of the contacts 61Ua, 61Da, and 61Aa.

The passenger's seat main switch 33*b* and the passenger's seat main switch 33*c* are momentary operation switches configured to open and close, at the driver's seat, the rear right passenger's seat and the rear left passenger's seat, respectively. The passenger's seat main switch 33*b* and the passenger's seat main switch 33*c* each have a circuit configuration similar to that of the passenger's seat main switch 33*a* and will not be described or depicted repeatedly. The passenger's seat main switch 33*b* not depicted includes sections denoted by reference signs that are obtained by replacing the last letter "a" in the reference signs of the sections in the passenger's seat main switch 33*a* with the letter “b”. The passenger’s seat main switch 33_c_ not depicted includes sections denoted by reference signs that are obtained by replacing the last letter “a” in the reference signs of the sections in the passenger’s seat main switch 33_a_ with the letter “c”.

The driver’s seat control circuit 34 controls the motor 12. The driver’s seat control circuit 34 includes a switching circuit 71, a driving circuit 72, an amplifier circuit 73, and a resistor R11.

The switching circuit 71 includes a relay circuit 71 U configured to be driven to close the driver’s seat window (only a relay contact 71YU is depicted) and a relay circuit 71D configured to be driven to open the driver’s seat window (only a relay contact 71YD is depicted).

The relay circuit 71U includes a coil 71XU (not depicted) and the relay contact 71YU serving as a transfer contact configured to be transferred in state by driving current flowing through the coil 71XU. The relay contact 71YU includes a normally opened terminal (NO terminal) a that is connected to the positive electrode of the power supply B via a wire L3. The relay contact 71YU includes a normally closed terminal (NC terminal) b that is connected to ground via the resistor R11. The relay contact 71YU includes a common terminal c that is connected to a first end of the motor 12 via a wire L1.

The relay circuit 71D includes a coil 71XD (not depicted) and the relay contact 71YD serving as a transfer contact configured to be transferred in state by driving current flowing through the coil 71XD. The relay contact 71YD includes a normally opened terminal (NO terminal) a that is connected to the positive electrode of the power supply B via the wire L3. The relay contact 71YD includes a normally closed terminal (NC terminal) b that is connected to ground via the resistor R11. The relay contact 71YD includes a common terminal c that is connected to a second end of the motor 12 via a wire L2.

The driving circuit 72 drives the relay circuits 71U and 71D under the control of the controller 31. Specifically, the driving circuit 72 controls driving current to the coil 71 XU of the relay circuit 71U and the coil 71 XD of the relay circuit 71D under the control of the controller 31, so as to control the states of the relay contacts 71YU and 71YD.

The amplifier circuit 73 is connected to the both ends of the resistor R11. The amplifier circuit 73 amplifies voltage generated at the both ends of the resistor R11 by motor current at the motor 12 outputted from the switching circuit 71, and transmits the amplified voltage to the controller 31. The controller 31 monitors motor current at the motor 12 on the basis of voltage received from the amplifier circuit 73.

Hereinafter, the direction of motor current flowing through the relay contact 71YU, the motor 12, and the relay contact 71YD in the mentioned order will be called a forward direction whereas the direction of motor current flowing through the relay contact 71YD, the motor 12, and the relay contact 71YU in the mentioned order will be called a backward direction. Also, assume that the driver’s seat window shifts upward and closes if motor current flows in the forward direction to the motor 12 and the driver’s seat window shifts downward and opens if motor current flows in the backward direction to the motor 12.

The passenger’s seat control circuit 35_a_ controls the motor 13_a_ via the passenger’s seat unit 22_a_. The passenger’s seat control circuit 35_a_ includes a switching circuit 81_a_, a driving circuit 82_a_, an amplifier circuit 83_a_, and a resistor R21_a_.

The switching circuit 81_a_ includes a relay circuit 81Ua configured to be driven to close the front passenger’s seat window (only a relay contact 81YUa is depicted) and a relay circuit 81Da configured to be driven to open the front passenger’s seat window (only a relay contact 81YDa is depicted).

The relay circuit 81Ua includes a coil 81XUa (not depicted) and the relay contact 81YUa serving as a transfer contact configured to be transferred in state by driving current flowing through the coil 81XUa. The relay contact 81YUa includes a normally opened terminal (NO terminal) a that is connected to the positive electrode of the power supply B via a wire L6 and the main relay 14. The relay contact 81YUa includes a normally closed terminal (NC terminal) b that is connected to ground via the resistor R21_a_. The relay contact 81YUa includes a common terminal c that is connected to a terminal b of a contact 91Ua in the passenger’s seat sub switch 91_a_ via a wire L4_a_.

The relay circuit 81Da includes a coil 81XDa (not depicted) and the relay contact 81YDa serving as a transfer contact configured to be transferred in state by driving current flowing through the coil 81XDa. The relay contact 81YDa includes a normally opened terminal (NO terminal) a that is connected to the positive electrode of the power supply B via the wire L6 and the main relay 14. The relay contact 81YDa includes a normally closed terminal (NC terminal) b that is connected to ground via the resistor R21_a_. The relay contact 81YDa includes a common terminal c that is connected to a terminal b of a common terminal 91Da in the passenger’s seat sub switch 91_a_ via a wire L5_a_.

The driving circuit 82_a_ drives the relay circuits 81Ua and 81Da under the control of the controller 31. Specifically, the driving circuit 82_a_ controls driving current to the coil 81XUa of the relay circuit 81Ua and the coil 81XDa of the relay circuit 81Da under the control of the controller 31, so as to control the states of the relay contacts 81YUa and 81YDa.

The amplifier circuit 83_a_ is connected to the both ends of the resistor R21 a serving as a motor current detector configured to detect motor current flowing to the motor 13_a_. The amplifier circuit 83_a_ amplifies voltage generated at the both ends of the resistor R21_a_ by motor current at the motor 13_a_ outputted from the switching circuit 71, and transmits the amplified voltage to the controller 31. The controller 31 monitors motor current at the motor 13_a_ on the basis of voltage received from the amplifier circuit 83_a_.

The passenger’s seat control circuit 35_b_ controls the motor 13_b_ via the passenger’s seat unit 22_b_, whereas the passenger’s seat control circuit 35_c_ controls the motor 13_c_ via the passenger’s seat unit 22_c_. The passenger’s seat control circuit 35_b_ and the passenger’s seat control circuit 35_c_ each have a circuit configuration similar to that of the passenger’s seat control circuit 35_a_ and will not be described or depicted repeatedly. The passenger’s seat control circuit 35_b_ not depicted includes sections denoted by reference signs that are obtained by replacing the last letter “a” in the reference signs of the sections in the passenger’s seat control circuit 35_a_ with the letter “b”. The passenger’s seat control circuit 35_c_ not depicted includes sections denoted by reference signs that are obtained by replacing the last letter “a” in the reference signs of the sections in the passenger’s seat control circuit 35_a_ with the letter “c”.

The power supply circuit 36 is connected to the positive electrode of the power supply B via the wire L3 to supply each section in the window opening-closing control apparatus 21 with power from the power supply B.

The passenger’s seat unit 22_a_ includes the passenger’s seat sub switch 91_a_.

The passenger's seat sub switch 91*a* is a momentary operation switch configured to open and close the front passenger's seat window at the front passenger's seat window. The passenger's seat sub switch 91*a* includes the contacts 91Ua and 91Da.

The contact 91Ua serves as a transfer contact configured to be transferred if the passenger's seat sub switch 91*a* is operated to close the front passenger's seat window. The contact 91Ua includes a normally opened terminal (NO terminal) a that is connected to the positive electrode of the power supply B via a wire L6 and the main relay 14. The contact 91Ua includes a normally closed terminal (NC terminal) b that is connected to the terminal c of the relay contact 81YUa via the wire L4*a*. The contact 91Ua includes a common terminal c that is connected to a first end of the motor 13*a* via a wire L7*a*. The terminal a and the terminal c are connected to each other if the closing operation for closing the front passenger's seat window is performed to the passenger's seat sub switch 91*a*, and the terminal b and the terminal c are connected to each other if the closing operation is not performed.

The contact 91Da serves as a transfer contact configured to be transferred if the passenger's seat sub switch 91*a* is operated to open the front passenger's seat window. The contact 91Da includes a normally opened terminal (NO terminal) a that is connected to the positive electrode of the power supply B via the wire L6 and the main relay 14. The contact 91Da includes a normally closed terminal (NC terminal) b that is connected to the terminal c of the relay contact 81YDa via the wire L5*a*. The contact 91Da includes a common terminal c that is connected to a second end of the motor 13*a* via a wire L8*a*. The terminal a and the terminal c are connected to each other if the opening operation for opening the front passenger's seat window is performed to the passenger's seat sub switch 91*a*, and the terminal b and the terminal c are connected to each other if the opening operation is not performed.

Hereinafter, the direction of motor current flowing through the contact 91Ua, the motor 13*a*, and the contact 91Da in the mentioned order will be called a forward direction whereas the direction of motor current flowing through the contact 91Da, the motor 13*a*, and the contact 91Ua in the mentioned order will be called a backward direction. Also, assume that the front passenger's seat window shifts upward and closes if motor current flows in the forward direction to the motor 13*a* and the front passenger's seat window shifts downward and opens if motor current flows in the backward direction to the motor 13*a*.

The passenger's seat units 22*b* and 22*c* each have a circuit configuration similar to that of the passenger's seat unit 22*a* and will not be described repeatedly.

The window opening-closing control apparatus 21 and the motor 12 are connected via the two wires L1 and L2. The window opening-closing control apparatus 21 and the passenger's seat units 22*a* to 22*c* are connected via six wires L4*a* to L4*c* and L5*a* to L5*c*. The window opening-closing control apparatus 21 can be thus easily connected to the motor 12 and the passenger's seat units 22*a* to 22*c* in the vehicle via such a small number of wires.

As depicted in FIG. 1, the window opening-closing control apparatus 21 and the passenger's seat units 22*a* to 22*c* are connected via the wire L6, which connects the main relay 14, the window opening-closing control apparatus 21, and the passenger's seat units 22*a* to 22*c*. Accordingly, the window opening-closing control apparatus 21 and the passenger's seat units 22*a* to 22*c* are not necessarily connected directly via the wire L6.

Hereinafter, the motors 13*a* to 13*c* will be each simply referred to as the motor 13 if there is no need to distinguish the motors 13*a* to 13*c* from one another. Furthermore, the passenger's seat units 22*a* to 22*c*, the passenger's seat main switches 33*a* to 33*c*, and the passenger's seat control circuits 35*a* to 35*c* will be each simply referred to as the passenger's seat unit 22, the passenger's seat main switch 33, and the passenger's seat control circuit 35, respectively, if there is no need to distinguish the passenger's seat units 22*a* to 22*c*, the passenger's seat main switches 33*a* to 33*c*, and the passenger's seat control circuits 35*a* to 35*c* from one another.

Moreover, if there is no need to distinguish the sections in the passenger's seat units 22*a* to 22*c*, the passenger's seat main switches 33*a* to 33*c*, and the passenger's seat control circuits 35*a* to 35*c* from one another, respectively, these sections will be denoted by reference signs that are obtained by removing the last letters "a" to "c". For example, the passenger's seat sub switches 91*a* to 91*c* in the passenger's seat units 22*a* to 22*c* will be each simply referred to as the passenger's seat sub switch 91 if there is no need to distinguish the passenger's seat sub switches 91*a* to 91*c* from one another.

Connecting the terminal a and the terminal c at a transfer contact (turning ON an a contact) will be hereinafter referred to as turning ON the transfer contact. For example, connecting the terminal a and the terminal c at the contact 91Ua will be hereinafter referred to as turning ON the contact 91Ua. Similarly, connecting the terminal b and the terminal c at a transfer contact (turning ON a b contact) will be hereinafter referred to as turning OFF the transfer contact. For example, connecting the terminal b and the terminal c at the contact 91Ua will be hereinafter referred to as turning OFF the contact 91Ua.

{Exemplary Functional Configurations in Controller 31}

Figure 2:
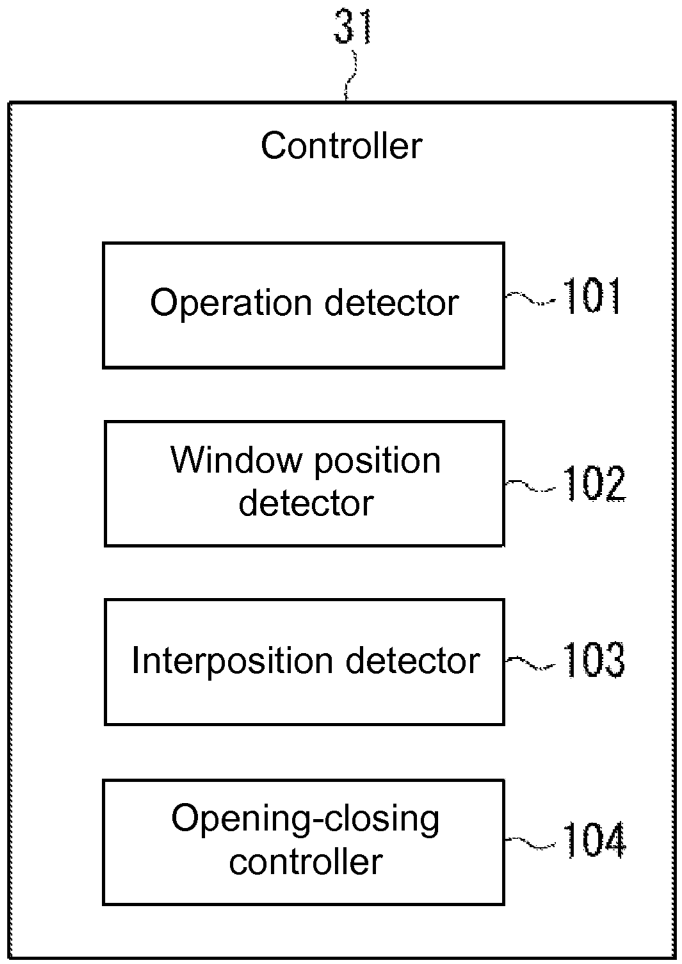
FIG. 2 is a block diagram depicting exemplary functional configurations in a controller.

FIG. 2 depicts exemplary functional configurations in the controller 31. The controller 31 includes an operation detector 101, a window position detector 102, an interposition detector 103, and an opening-closing controller 104. FIG. 2 depicts only part of the functional configurations in the controller 31, which will be described hereinafter.

The operation detector 101 detects operation to the driver's seat main switch 32 and the passenger's seat main switches 33*a* to 33*c* in accordance with signals transmitted from the input circuits 52 and 62*a* to 62*c*. The operation detector 101 monitors motor current at the motors 13*a* to 13*c* on the basis of voltage received from the amplifier circuits 83*a* to 83*c*, respectively. The operation detector 101 detects operation to the passenger's seat sub switches 91*a* to 91*c* in accordance with motor current at the motors 13*a* to 13*c*, respectively. The operation detector 101 transmits the detection results to the respective sections in the controller 31.

The window position detector 102 monitors motor current at the motors 12 and 13*a* to 13*c* on the basis of voltage received from the amplifier circuits 73 and 83*a* to 83*c*, respectively. The window position detector 102 detects positions and motion directions of the respective vehicle seat windows in accordance with the motor current at the motors 12 and 13*a* to 13*c* as well as the detection results on the operation to the driver's seat main switch 32 and the passenger's seat main switches 33*a* to 33*c*. The window position detector 102 transmits the detection results to the respective sections in the controller 31.

The interposition detector 103 monitors motor current at the motors 12 and 13*a* to 13*c* on the basis of voltage received from the amplifier circuits 73 and 83*a* to 83*c*, respectively. The interposition detector 103 detects interposition at the respective windows in accordance with the motor current at the motors 12 and 13*a* to 13*c*, the detection results on the operation to the driver's seat main switch 32 and the passenger's seat main switches 33*a* to 33*c*, and the detection results on the positions and the motion directions of the respective vehicle seat windows. The interposition detector 103 transmits the detection results to the respective sections in the controller 31.

The opening-closing controller 104 controls opening and closing the respective vehicle windows in accordance with the operation to the driver's seat main switch 32, the passenger's seat main switches 33*a* to 33*c*, and the passenger's seat sub switches 91*a* to 91*c*, as well as the detection results on the positions and the motion directions of the respective windows and the interposition at the respective windows. Specifically, the opening-closing controller 104 controls the driving circuit 72 and the relay circuits 71U and 71D, so as to control motor current at the motor 12 and opening and closing the driver's seat window. The opening-closing controller 104 also controls the driving circuits 82*a* to 82*c* and the relay circuits 81Ua to 81Uc and 81Da to 81Dc, so as to control motor current at the motors 13*a* to 13*c* and opening and closing the front passenger's seat, the rear right passenger's seat, and the rear left passenger's seat.

{Basic Motion of Automatic Window System 1}

Basic motion of the automatic window system 1 will be described next with reference to FIGS. 3 to 8. FIGS. 3 to 8 do not include sections and reference signs not particularly needed in the description.

{When Closing Operation is Performed to Driver's Seat Main Switch 32}

Figure 3:
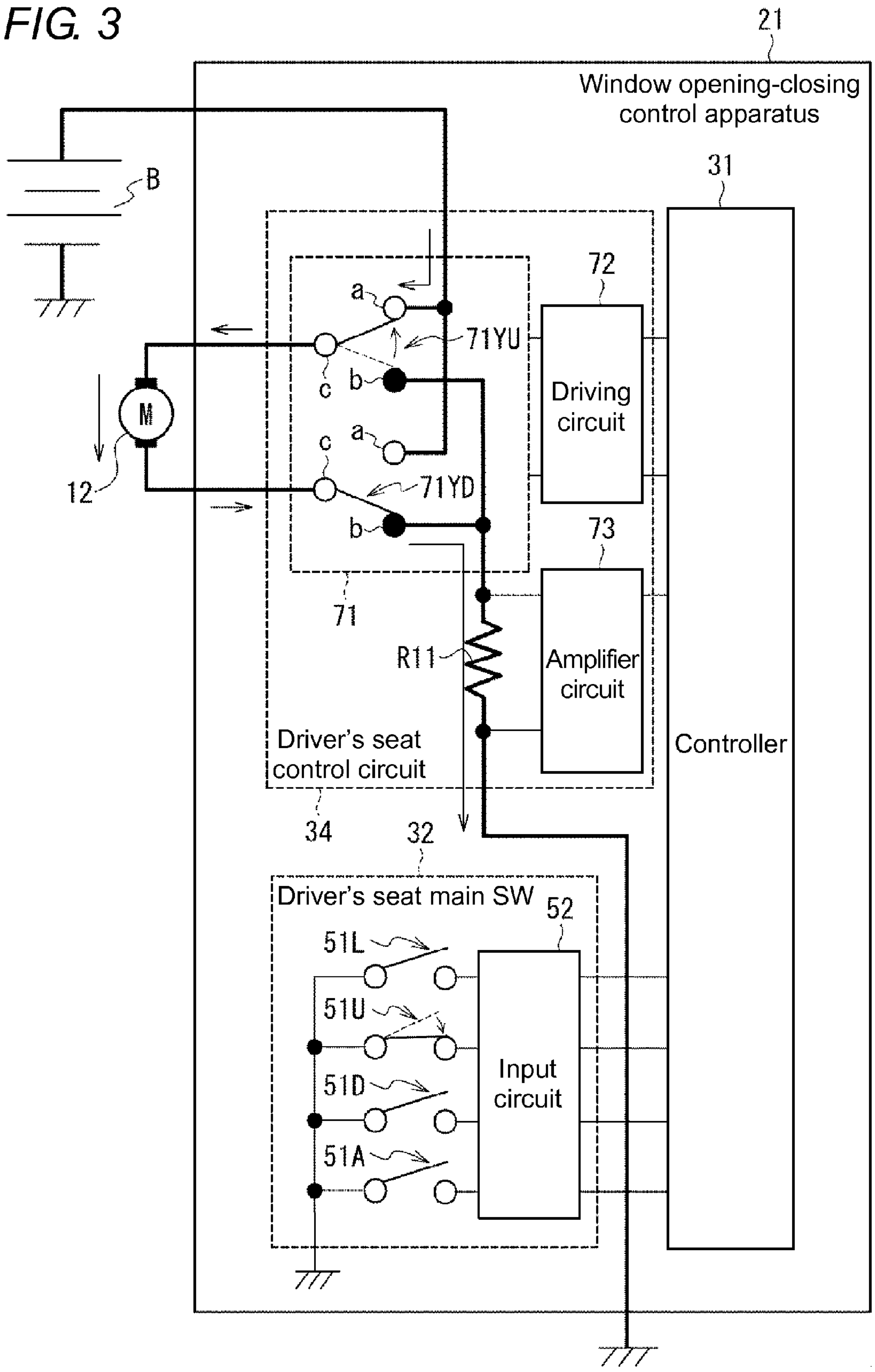
FIG. 3 is a diagram depicting a state of the automatic window system when manually closing operation is performed to a driver's seat main switch.

FIG. 3 depicts a state of the automatic window system 1 when the manually closing operation is performed to the driver's seat main switch 32.

If manually closing operation is performed to the driver's seat main switch 32, the contact 51U is turned ON. If the operation detector 101 detects that the contact 51U is ON, the opening-closing controller 104 turns ON the relay contact 71YU via the driving circuit 72. In this case, current flows from the power supply B to ground via the terminal a of the relay contact 71YU, the motor 12, the terminal b of the relay contact 71YD, and the resistor R11. This causes motor current to flow in the forward direction to the motor 12, so as to close the driver's seat window.

If the manually closing operation to the driver's seat main switch 32 is stopped, the contact 51U is turned OFF. If the operation detector 101 detects that the contact 51U is OFF, the opening-closing controller 104 turns OFF the relay contact 71YU via the driving circuit 72. This stops supply of motor current to the motor 12 so as to stop the closing motion of the driver's seat window.

If the automatically closing operation is performed to the driver's seat main switch 32, the contacts 51U and 51A are turned ON. Similarly to the case where the manually closing operation is performed, the relay contact 71YU is turned ON and motor current flows in the forward direction to the motor 12, so as to close the driver's seat window.

Even when the automatically closing operation to the driver's seat main switch 32 is subsequently stopped and the contacts 51U and 51A are turned OFF, the opening-closing controller 104 keeps the state where the relay contact 71YU is ON via the driving circuit 72 until the driver's seat window is fully closed. The driver's seat window is thus automatically fully closed.

If the manually opening operation or the automatically opening operation is performed to the driver's seat main switch 32 while the driver's seat window is automatically closing and the operation detector 101 detects that the contact 51D is ON, the opening-closing controller 104 turns OFF the relay contact 71YU via the driving circuit 72. This stops the automatically closing motion of the driver's seat window.

{When Opening Operation is Performed to Driver's Seat Main Switch 32}

Figure 4:
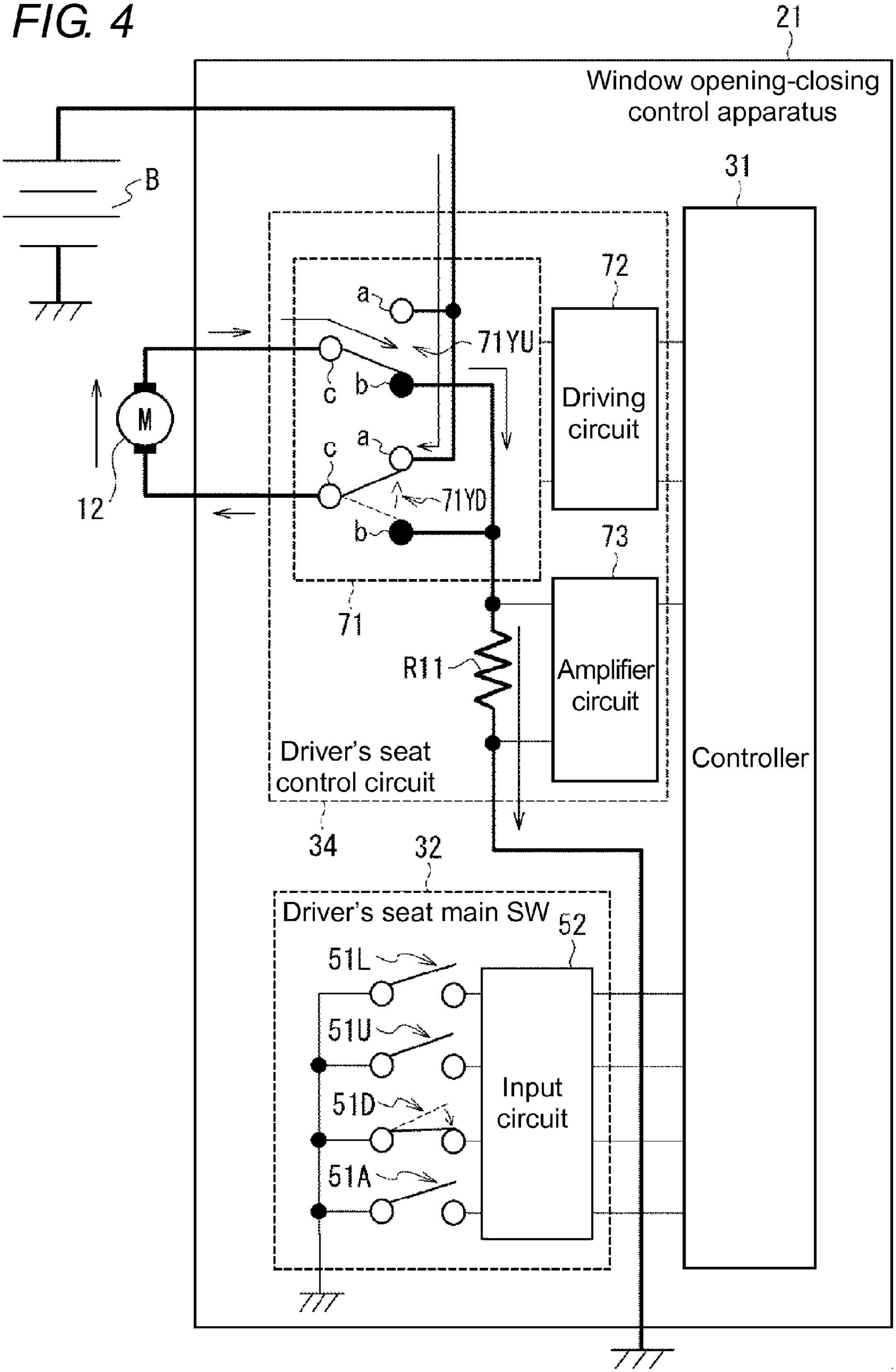
FIG. 4 is a diagram depicting a state of the automatic window system when manually opening operation is performed to the driver's seat main switch.

FIG. 4 depicts a state of the automatic window system 1 when the manually opening operation is performed to the driver's seat main switch 32.

If the manually opening operation is performed to the driver's seat main switch 32, the contact 51D is turned ON. If the operation detector 101 detects that the contact 51D is ON, the opening-closing controller 104 turns ON the relay contact 71YD via the driving circuit 72. In this case, current flows from the power supply B to ground via the terminal a of the relay contact 71YD, the motor 12, the terminal b of the relay contact 71YU, and the resistor R11. This causes motor current to flow in the backward direction to the motor 12, so as to open the driver's seat window.

If the manually opening operation to the driver's seat main switch 32 is stopped, the contact 51D is turned OFF. If the operation detector 101 detects that the contact 51D is OFF, the opening-closing controller 104 turns OFF the relay contact 71YD via the driving circuit 72. This stops supply of motor current to the motor 12 so as to stop the opening motion of the driver's seat window.

If the automatically opening operation is performed to the driver's seat main switch 32, the contacts 51D and 51A are turned ON. Similarly to the case where the manually opening operation is performed, the relay contact 71YD is turned ON and motor current flows in the backward direction to the motor 12, so as to open the driver's seat window. Even when the automatically opening operation to the driver's seat main switch 32 is subsequently stopped and the contacts 51D and 51A are turned OFF, the opening-closing controller 104 keeps the state where the relay contact 71YD is ON via the driving circuit 72 until the driver's seat window is fully opened. The driver's seat window is thus automatically fully opened.

If the manually closing operation or the automatically closing operation is performed to the driver's seat main switch 32 while the driver's seat window is automatically opening and the operation detector 101 detects that the contact 51U is ON, the opening-closing controller 104 turns OFF the relay contact 71YD via the driving circuit 72. This stops the automatically opening motion of the driver's seat window.

{When Closing Operation is Performed to Passenger's Seat Main Switch 33*a*}

Figure 5:
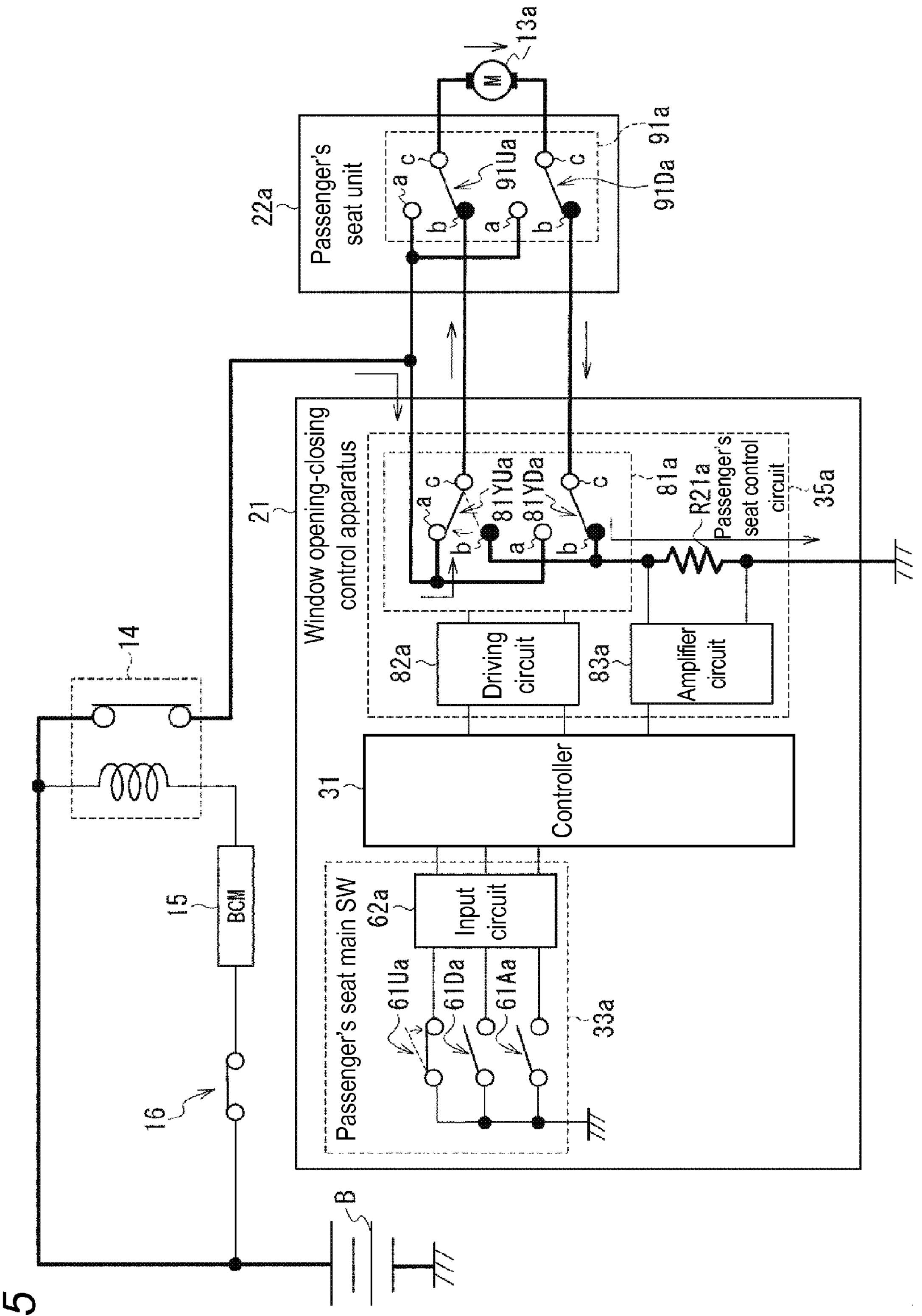
FIG. 5 is a diagram depicting a state of the automatic window system when the manually closing operation is performed to a passenger's seat main switch.

FIG. 5 depicts a state of the automatic window system 1 when the manually closing operation is performed to the passenger's seat main switch 33*a*.

If the manually closing operation is performed to the passenger's seat main switch 33*a*, the contact 61Ua is turned ON. If the operation detector 101 detects that the contact 61Ua is ON, the opening-closing controller 104 turns ON the relay contact 81YUa via the driving circuit 82*a*. In this case, current flows from the power supply B to ground via the main relay 14, the terminal a of the relay contact 81YUa, the terminal b of the contact 91Ua, the motor 13*a*, the terminal b of the contact 91Da, the terminal b of the relay contact 81YDa, and the resistor R21*a*. This causes motor current to flow in the forward direction to the motor 13*a*, so as to close the front passenger's seat window.

If the manually closing operation to the passenger's seat main switch 33*a* is stopped, the contact 61Ua is turned OFF. If the operation detector 101 detects that the contact 61Ua is OFF, the opening-closing controller 104 turns OFF the relay contact 81YUa via the driving circuit 82*a*. This stops supply of motor current to the motor 13*a* so as to stop the closing motion of the front passenger's seat window.

If the automatically closing operation is performed to the passenger's seat main switch 33*a*, the contacts 61Ua and 61Aa are turned ON. Similarly to the case where the manually closing operation is performed, the relay contact 81YUa is turned ON and motor current flows in the forward direction to the motor 13*a*, so as to close the front passenger's seat window. Even when the automatically closing operation to the passenger's seat main switch 33*a* is subsequently stopped and the contacts 61Ua and 61Aa are turned OFF, the opening-closing controller 104 keeps the state where the relay contact 81YUa is ON via the driving circuit 82*a* until the front passenger's seat window is fully closed. The front passenger's seat window is thus automatically fully closed.

If the manually opening operation or the automatically opening operation is performed to the passenger's seat main switch 33*a* while the front passenger's seat window is automatically closing and the operation detector 101 detects that the contact 61Da is ON, the opening-closing controller 104 turns OFF the relay contact 81YUa via the driving circuit 82*a*. This stops the automatically closing motion of the front passenger's seat.

{When Opening Operation is Performed to Passenger's Seat Main Switch 33*a*}

Figure 6:
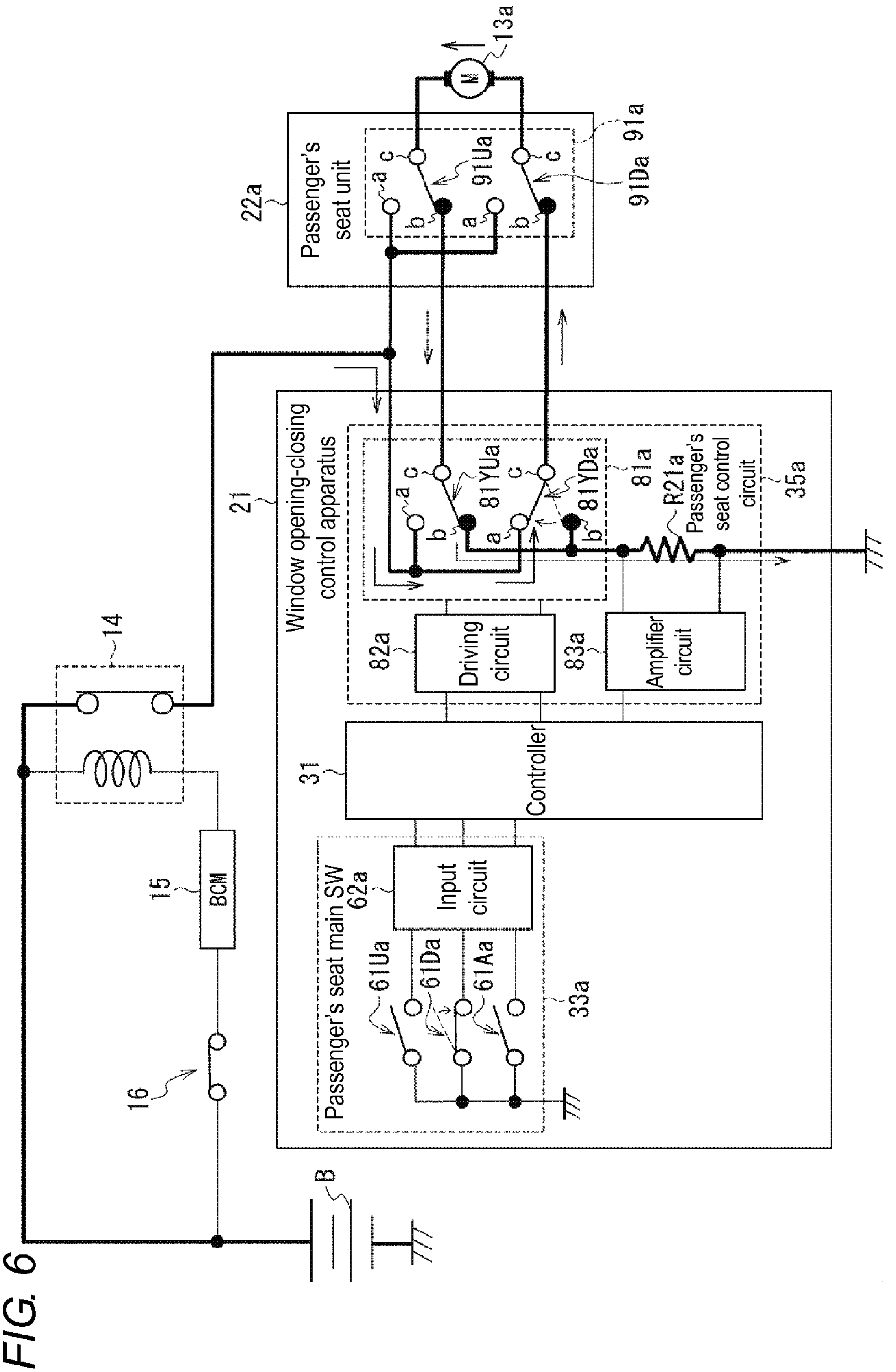
FIG. 6 is a diagram depicting a state of the automatic window system when the manually opening operation is performed to the passenger's seat main switch.

FIG. 6 depicts a state of the automatic window system 1 when the manually opening operation is performed to the passenger's seat main switch 33*a*.

If the manually opening operation is performed to the passenger's seat main switch 33*a*, the contact 61Da is turned ON. If the operation detector 101 detects that the contact 61Da is ON, the opening-closing controller 104 turns ON the relay contact 81YDa via the driving circuit 82*a*. In this case, current flows from the power supply B to ground via the main relay 14, the terminal a of the relay contact 81YDa, the terminal b of the contact 91Da, the motor 13*a*, the terminal b of the contact 91Ua, the terminal b of the relay contact 81YUa, and the resistor R21*a*. This causes motor current to flow in the backward direction to the motor 13*a*, so as to open the front passenger's seat window.

If the manually opening operation to the passenger's seat main switch 33*a* is stopped, the contact 61Da is turned OFF. If the operation detector 101 detects that the contact 61Da is OFF, the opening-closing controller 104 turns OFF the relay contact 81YDa via the driving circuit 82*a*. This stops supply of motor current to the motor 13*a* so as to stop the opening motion of the front passenger's seat window.

If the automatically opening operation is performed to the passenger's seat main switch 33*a*, the contacts 61Da and 61Aa are turned ON. Similarly to the case where the manually opening operation is performed, the relay contact 81YDa is turned ON and motor current flows in the backward direction to the motor 13*a*, so as to open the front passenger's seat window. Even when the automatically opening operation to the passenger's seat main switch 33*a* is subsequently stopped and the contacts 61Da and 61Aa are turned OFF, the opening-closing controller 104 keeps the state where the relay contact 81YDa is ON via the driving circuit 82*a* until the front passenger's seat window is fully opened. The front passenger's seat window is thus automatically fully opened.

If the manually closing operation or the automatically closing operation is performed to the passenger's seat main switch 33*a* while the front passenger's seat window is automatically opening and the operation detector 101 detects that the contact 61Ua is ON, the opening-closing controller 104 turns OFF the relay contact 81YDa via the driving circuit 82*a*. This stops the automatically opening motion of the front passenger's seat.

Although description will not be made in detail, the rear right or rear left passenger's seat window can be opened or closed in similar manners when the passenger's seat main switch 33*b* or 33*c* is operated.

{When Closing Operation is Performed to Passenger's Seat Sub Switch 91*a*}

Figure 7:
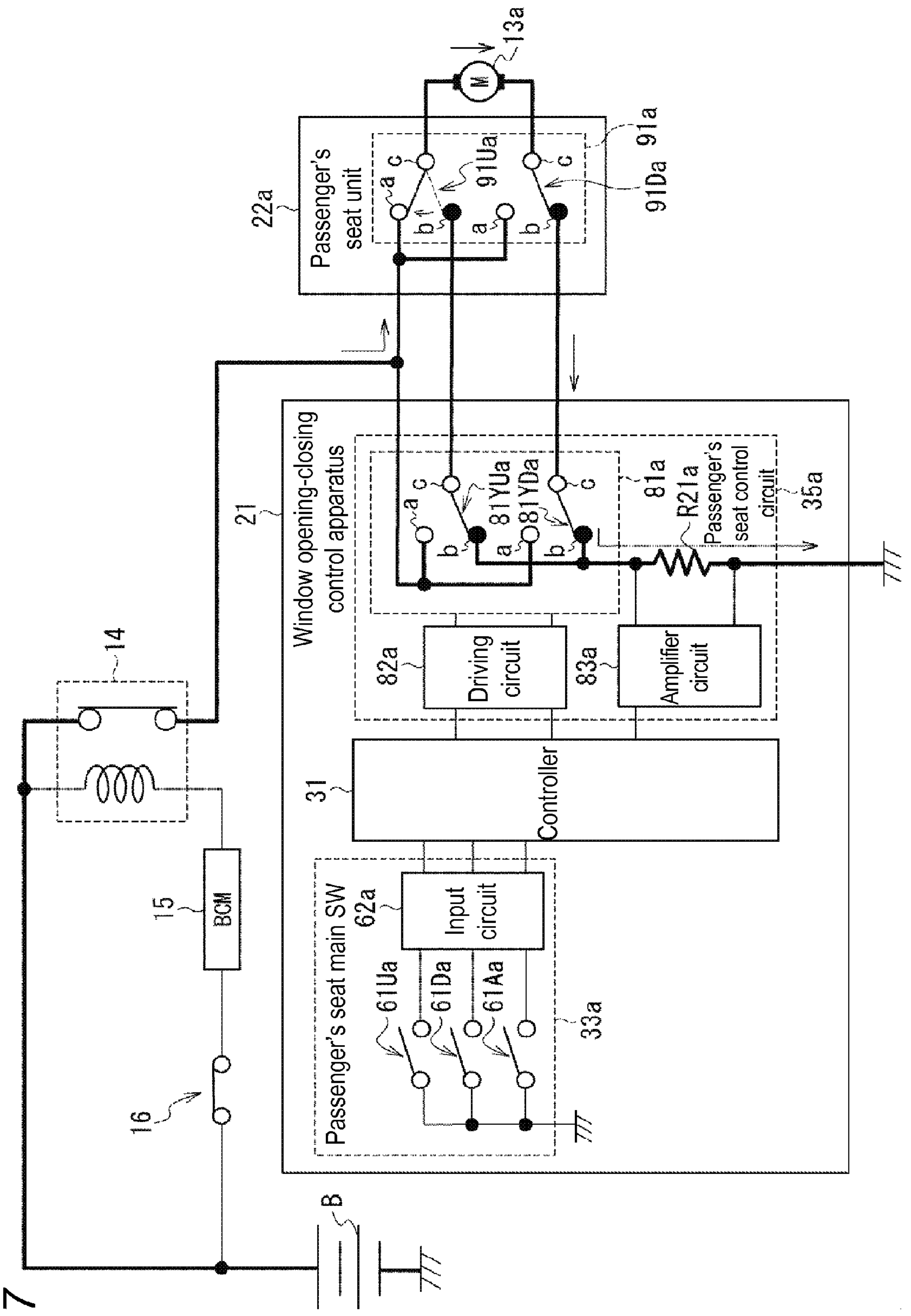
FIG. 7 is a diagram depicting a state of the automatic window system when closing operation is performed to a passenger's seat sub switch.

FIG. 7 depicts a state of the automatic window system 1 when the closing operation is performed to the passenger's seat sub switch 91*a*.

If the closing operation is performed to the passenger's seat sub switch 91*a*, the contact 91Ua is turned ON.

In this case, current flows from the power supply B to ground via the main relay 14, the terminal a of the contact 91Ua, the motor 13*a*, the terminal b of the contact 91Da, the terminal b of the relay contact 81YDa, and the resistor R21*a*. This causes motor current to flow in the forward direction to the motor 13*a*, so as to close the front passenger's seat window.

If the closing operation to the passenger's seat sub switch 91*a* is stopped, the contact 91Ua is turned OFF. This stops supply of motor current to the motor 13*a* so as to stop the closing motion of the front passenger's seat window.

{When Opening Operation is Performed to Passenger's Seat Sub Switch 91*a*}

Figure 8:
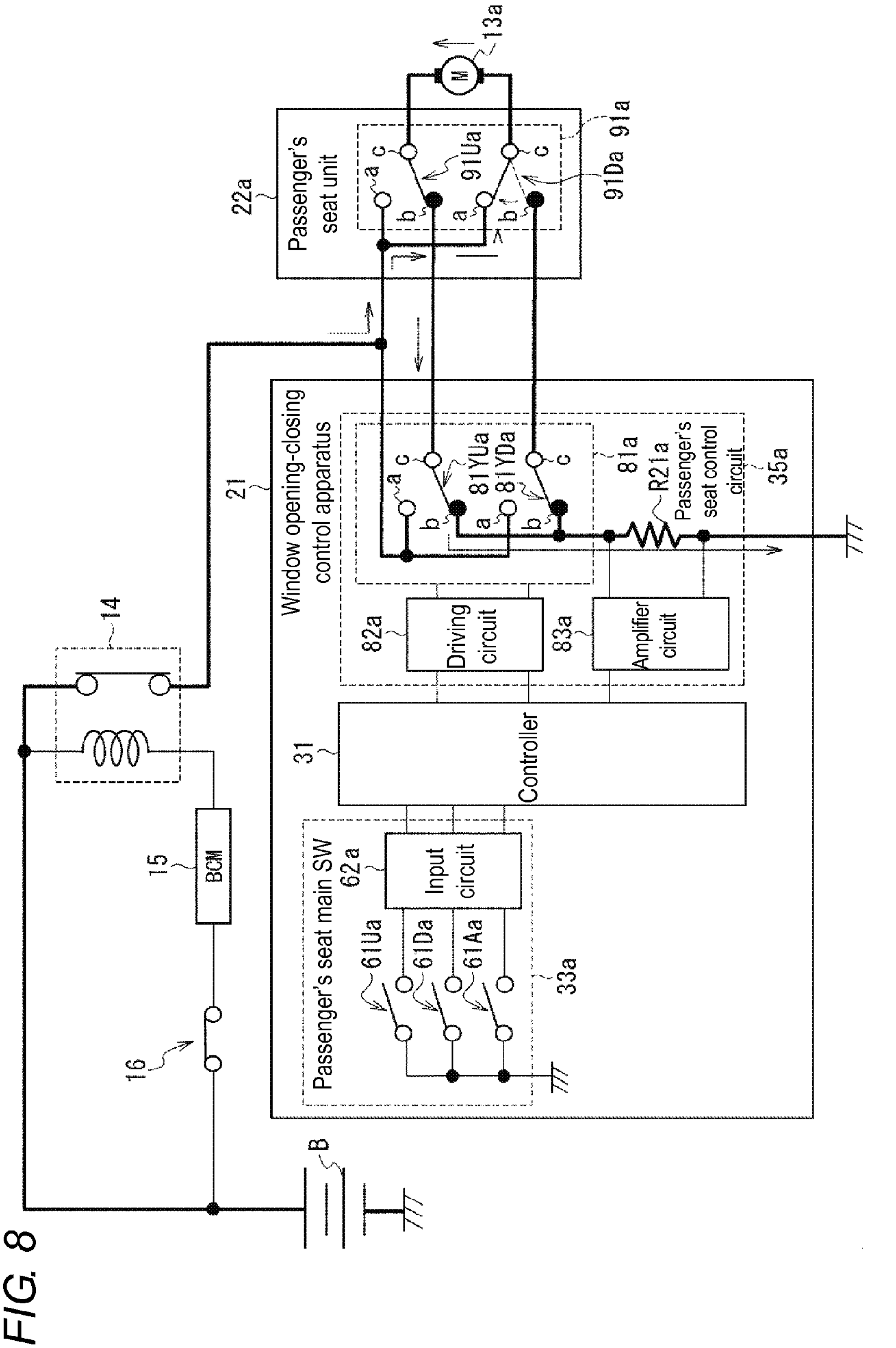
FIG. 8 is a diagram depicting a state of the automatic window system when opening operation is performed to the passenger's seat sub switch.

FIG. 8 depicts a state of the automatic window system 1 when the opening operation is performed to the passenger's seat sub switch 91*a*.

If the opening operation is performed to the passenger's seat sub switch 91*a*, the contact 91Da is turned ON. In this case, current flows from the power supply B to ground via the main relay 14, the terminal a of the contact 91Da, the motor 13*a*, the terminal b of the contact 91Ua, the terminal b of the relay contact 81YUa, and the resistor R21*a*. This causes motor current to flow in the backward direction to the motor 13*a*, so as to open the front passenger's seat window.

If the opening operation to the passenger's seat sub switch 91*a* is stopped, the contact 91Da is turned OFF. This stops supply of motor current to the motor 13*a* so as to stop the opening motion of the front passenger's seat window.

As described above, when operation is performed to the passenger's seat sub switch 91*a*, the front passenger's seat window can be opened or closed with no control by the window opening-closing control apparatus 21.

Although description will not be made in detail, the rear right or rear left passenger's seat window can be opened or closed in a similar manner when the passenger's seat sub switch 91*b* or 91*c* is operated.

{Method of Detecting Position of Each Vehicle Window}

A method of detecting a position of each vehicle window will be described next with reference to FIG. 9.

The window position detector 102 always monitors motor current flowing through the motors 12 and 13*a* to 13*c* on the basis of voltage received from the amplifier circuits 73 and 83*a* to 83*c*, respectively. Motor current flowing through each of the motors has a ripple. In a state where no interposition occurs, the ripple of the motor current has a stable waveform as depicted in the upper area of FIG. 9.

Figure 9:
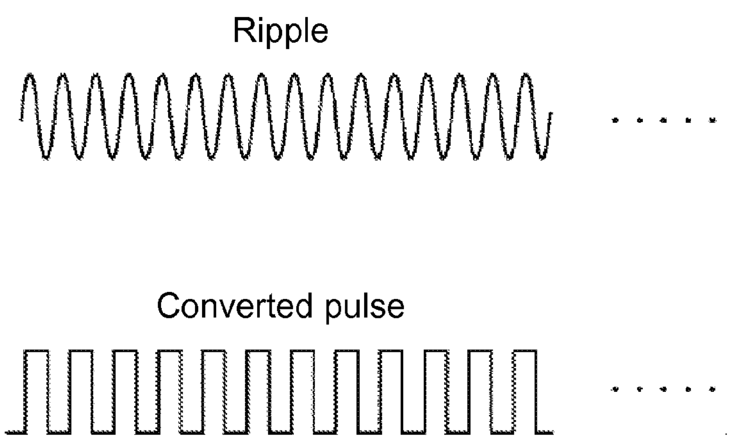
FIG. 9 is an explanatory diagram on a method of detecting a position of each vehicle window in an opening-closing direction.

The window position detector 102 converts the ripple of the motor current to a pulse train depicted in the lower area of FIG. 9. The window position detector 102 calculates rotational speed of each of the motors from the pulse train depicted in FIG. 9, and detects positions of the driver's seat window and the passenger's seat windows in accordance with the calculated motor rotational speed. This configuration requires no sensor for detection of each window position.

The controller 31 does not receive signals indicating states of the contacts 91Ua and 91Da of the passenger's seat sub switch 91*a* in this case, so that the controller 31 cannot detect the states of the contacts 91Ua and 91Da. The operation detector 101 cannot detect whether the opening operation or the closing operation is performed to the passenger's seat sub switch 91*a* directly from the states of the contacts 91Ua and 91Da.

The motor 13*a* receives a larger load for closing the front passenger's seat window rather than for opening the front passenger's seat window by an amount of lifting upward the window. Accordingly, motor current flowing through the motor 13*a* is larger for closing the window than motor current for opening the window.

In view of this, if the passenger's seat sub switch 91*a* is operated to open or close the front passenger's seat window, the operation detector 101 detects an operation direction (the closing operation or the opening operation) of the passenger's seat sub switch 91*a* in accordance with an amount of motor current at the motor 13*a*. Similarly, the window position detector 102 detects a motion direction (whether closing or opening) of the window in accordance with the amount of the motor current at the motor 13*a*.

This applies to the case where the passenger's seat sub switch 91 b is operated to open and close the rear right passenger's seat window as well as to the case where the passenger's seat sub switch 91*c* is operated to open and close the rear left passenger's seat.

When any one of the driver's seat main switch 32 and the passenger's seat main switches 33*a* to 33*c* is operated to open or close the corresponding window, the controller 31 receives a signal indicating a state of the contact of the switch. The window position detector 102 can thus detect a motion direction of each window not in accordance with an amount of motor current. It is also possible to detect the motion direction of each window in accordance with the amount of motor current when any one of the driver's seat main switch 32 and the passenger's seat main switches 33*a* to 33*c* is operated to open or close the corresponding window.

{Method of Detecting Interposition at each Vehicle Window}

An exemplary method of detecting interposition of each window will be described next with reference to FIG. 10.

Figure 10:
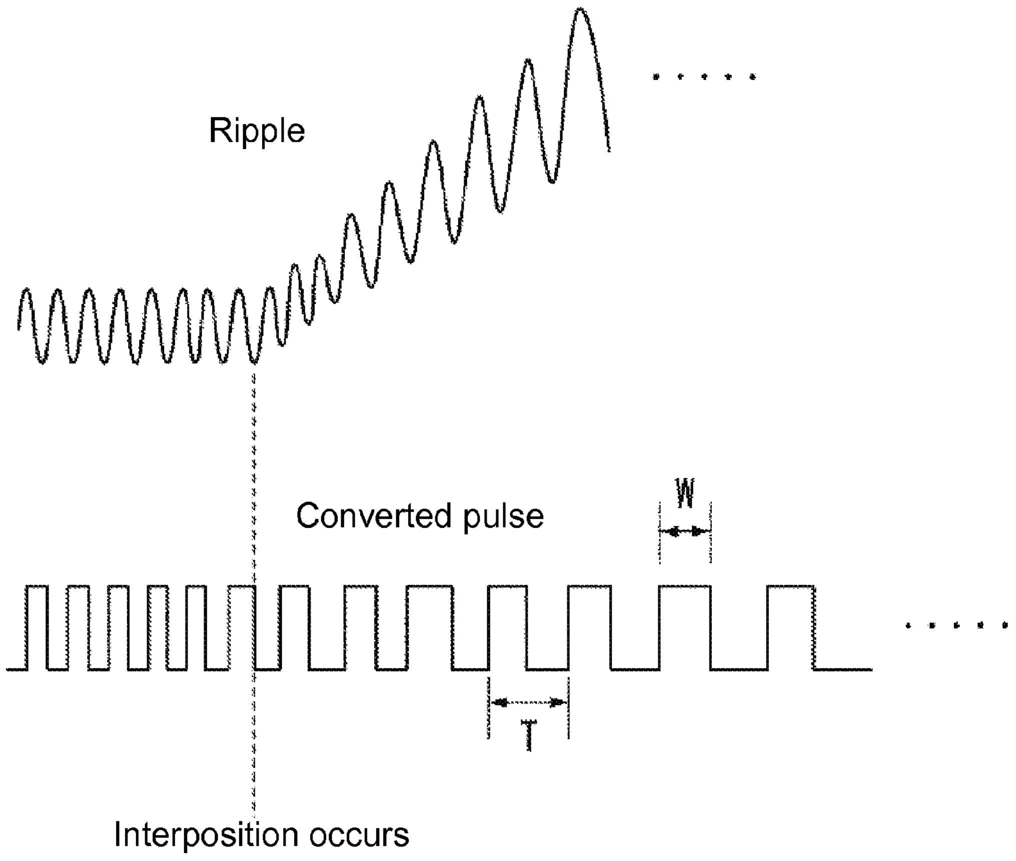
FIG. 10 is an explanatory diagram on a method of detecting interposition at each vehicle window.

If interposition occurs, motor current increases in current level and has a ripple in an unstable waveform with longer periods as depicted in the upper area of FIG. 10.

The interposition detector 103 monitors a change in period T of the ripple and determines that interposition has occurred if the period T reaches or exceeds a predetermined level. The interposition detector 103 can alternatively determine that interposition has occurred if a pulse width W, in place of the period T, reaches or exceeds a predetermined level. Interposition can be detected in accordance with a ripple of motor current in these manners.

The interposition detector 103 determines that interposition has not occurred even though the above condition is satisfied, if the interposition detector 103 determines that no interposition can possibly occur from detection results on operation to the driver's seat main switch 32 and the passenger's seat main switches 33*a* to 33*c* and detection results on positions and motion directions of the respective seat windows. For example, interposition cannot occur when a window is open.

As described above, the window opening-closing control apparatus 21 simply configured with no controllers provided at the passenger's seats other than the driver's seat and fewer wires can control (automatically opening and closing motion as well as manually opening and closing operation) the driver's seat window and the passenger's seat windows at the driver's seat. Furthermore, functions can be improved easily by connecting the window opening-closing control apparatus 21 without modifying the passenger's seat units 22. The window opening-closing control apparatus 21 can be thus easily provided as an additional part or an optional unit. The controller 31 in the window opening-closing control apparatus 21 monitors motor current at the motors 12 and 13*a* to 13*c* for the respective seats. The controller 31 can thus detect a position of and interposition at each seat window with no provision of any sensor or the like.

{Achievement Method for Automatic Operation to Passenger's Seat Window With Passenger's Seat Sub Switch 91}

As described above, the passenger's seat sub switch 91 is provided with no contact for automatic operation unlike the driver's seat main switch 32 and the passenger's seat main switch 33. Described below is an achievement method for automatic operation to each passenger's seat window not with a contact for automatic operation but with the passenger's seat sub switch 91.

{First Achievement Method}

The first achievement method for the automatic operation to the passenger's seat window with the passenger's seat sub switch 91 will be initially described with reference to FIGS. 11 to 19. According to the first achievement method, the passenger's seat sub switch 91 is operated continuously for not less than a prescribed time period Ta (hereinafter, referred to as long push operation) to achieve the automatic operation. The prescribed time period Ta can be set such that a user can recognize as having operated the passenger's seat sub switch 91 intentionally for a long period of time.

A window opening-closing process executed by the automatic window system 1 with the passenger's seat sub switch 91 according to a first embodiment will now be described with reference to the flowchart in FIG. 11 and the timing charts in FIGS. 12 and 13. This window opening-closing process starts when the closing operation or the opening operation is performed to any one of the passenger's seat sub switches 91*a* to 91*c* and the operation detector 101 detects that the operation is performed.

Figure 12:
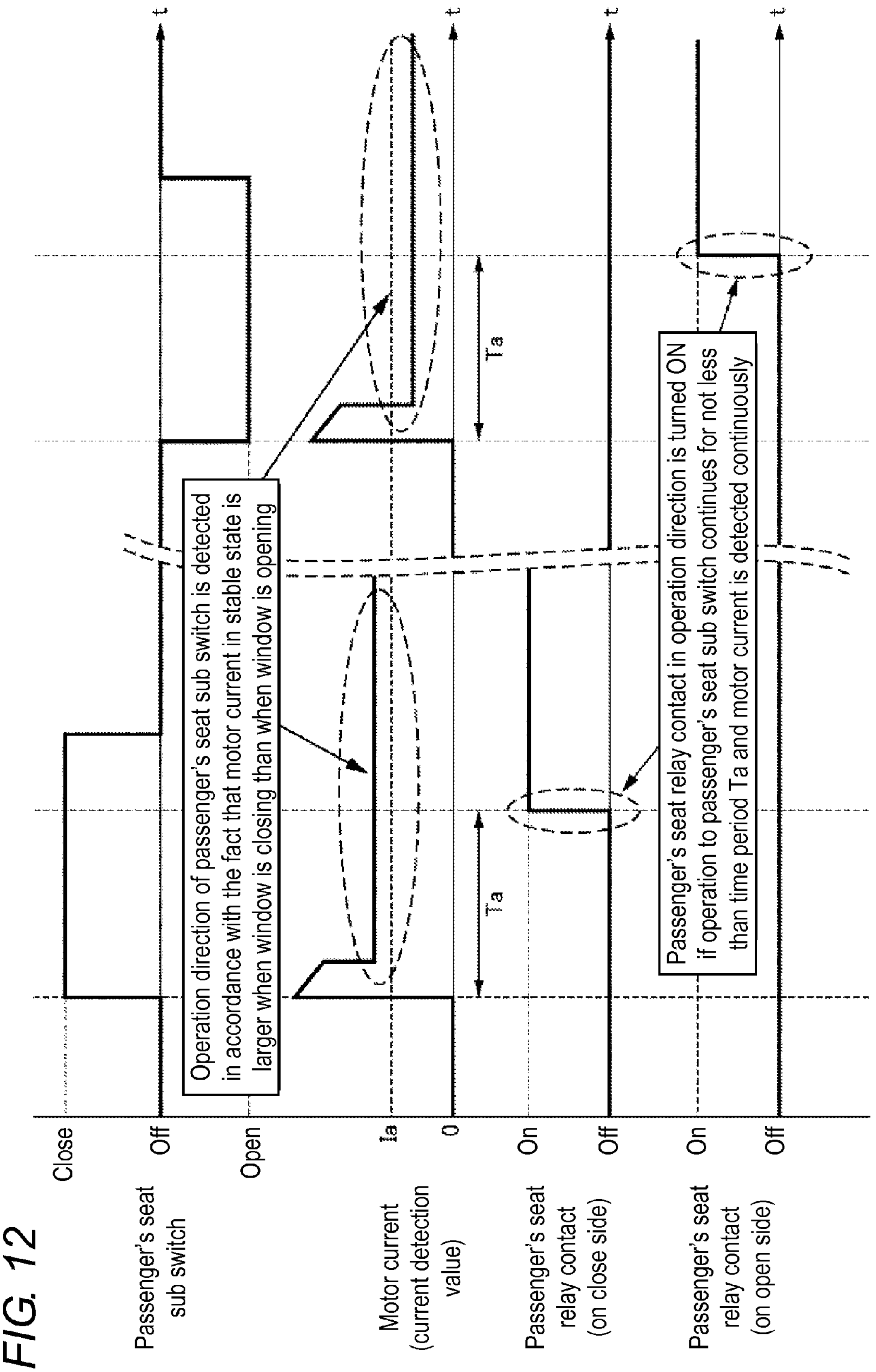
FIG. 12 is an explanatory timing chart of the window opening-closing process by the passenger's seat sub switch according to the first embodiment.
Figure 13:
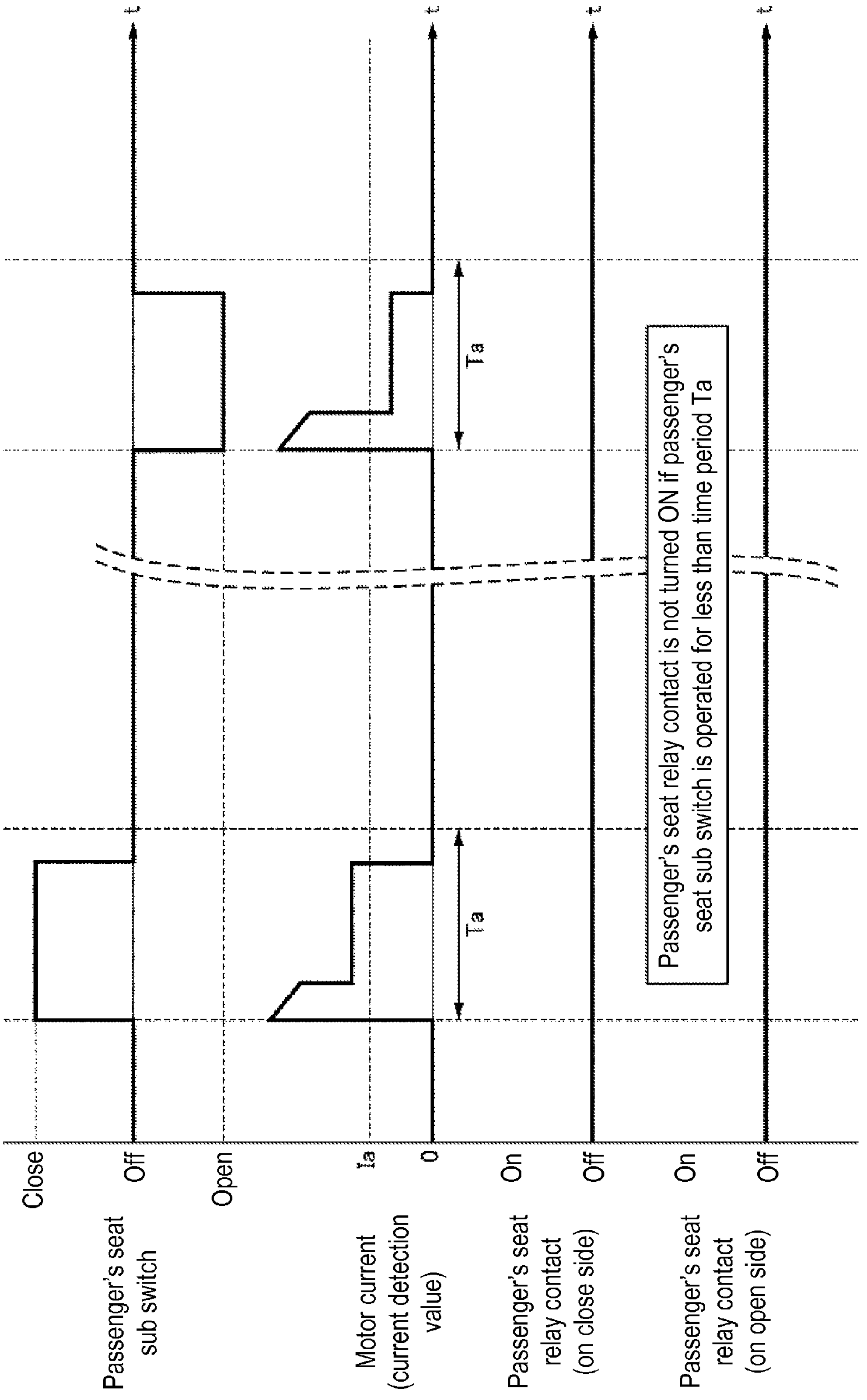
FIG. 13 is an explanatory timing chart of the window opening-closing process by the passenger's seat sub switch according to the first embodiment.
Figure 14:
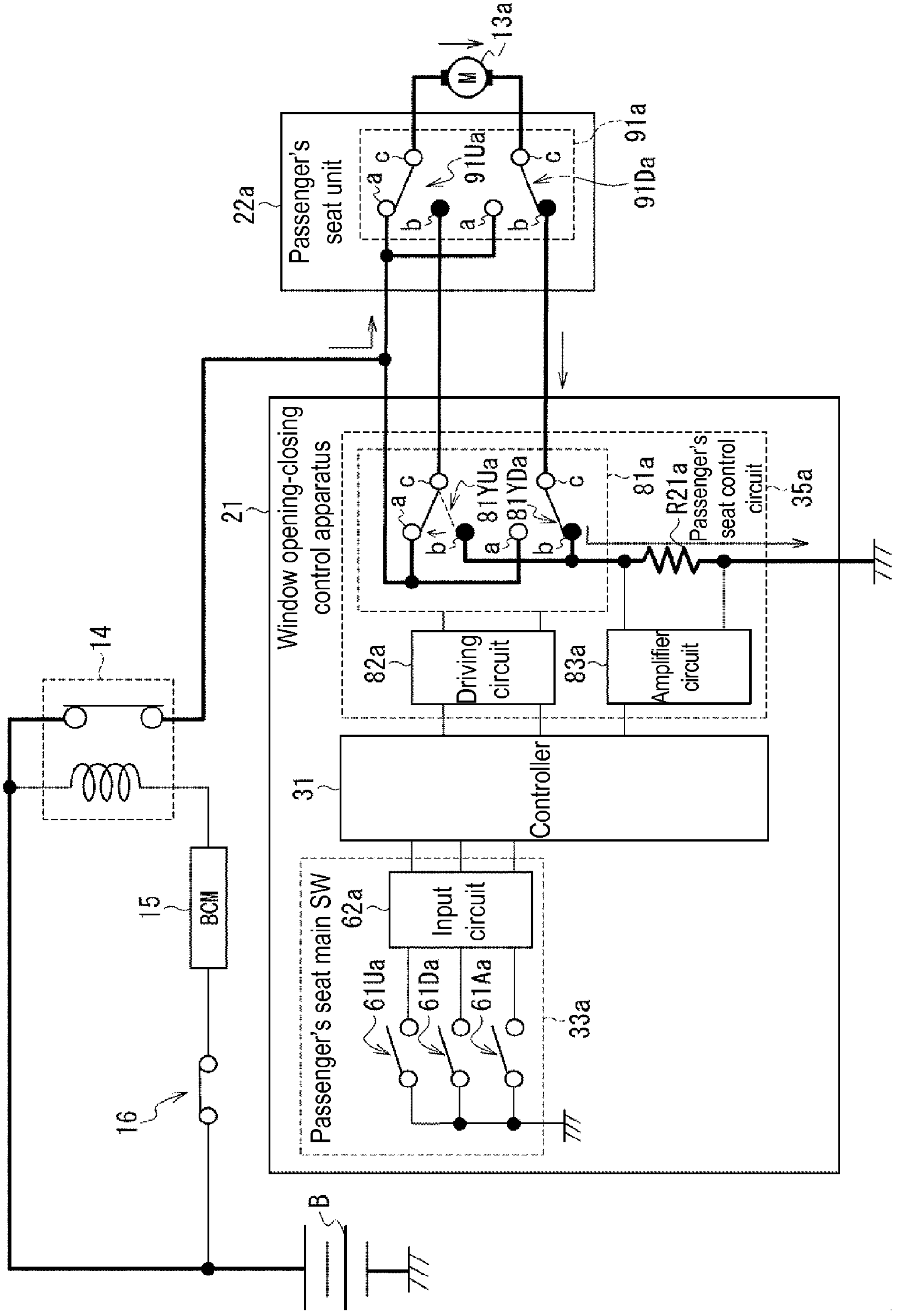
FIG. 14 is an explanatory diagram of automatically closing motion with the passenger's seat sub switch according to the first embodiment.

FIGS. 12 and 13 each indicate detection values of motor current at the passenger's seat sub switch 91 and the motor 13, as well as chronological state changes at the passenger's seat relay contact on a close side (the contact 81YU) and the passenger's seat relay contact on an open side (the contact 81YD). A timing chart for the automatically closing operation is indicated in the left half divided by the dotted lines in FIG. 12, whereas a timing chart for the automatically opening operation is indicated in the right half divided by the dotted lines in FIG. 12. A timing chart for the manually closing operation is indicated in the left half divided by the dotted lines in FIG. 13, whereas a timing chart for the manually opening operation is indicated in the right half divided by the dotted lines in FIG. 13.

Exemplified below is a case of opening and closing the front passenger's seat window with the passenger's seat sub switch 91*a*. The passenger's seat in the flowchart in FIG. 11 and the timing charts in FIGS. 12 and 13 mainly refer to the front passenger's seat in the following description.

In step S1, the operation detector 101 determines whether or not the closing operation is performed. If the closing operation or the opening operation is performed to the passenger's seat sub switch 91*a* and the contact 91Ua or 91Da is turned ON, inrush current flows when the motor 13*a* starts and then motor current comes into a stable state, as indicated in FIGS. 12 and 13. As described above, motor current flowing to the motor 13*a* is larger for closing the front passenger's seat window than motor current for opening the front passenger's seat window in the stable state.

For example, the operation detector 101 detects motor current at the motor 13*a* in accordance with voltage received from the amplifier circuit 83*a*, and compares the detection value with a predetermined threshold Ia. This threshold Ia can be set between the maximum value of the motor current flowing to the motor 13*a* for opening the front passenger's seat window and the minimum value of the motor current flowing to the motor 13*a* for closing the front passenger's seat window in the stable state. If the detection value of the motor current is not less than the threshold Ia, the operation detector 101 determines that the closing operation is performed. The process flow then proceeds to step S2.

The automatic window system 1 comes into the state depicted in FIG. 7 in this case, and motor current flows in the forward direction to the motor 13*a* so as to start closing motion of the front passenger's seat window.

In step S2, the operation detector 101 determines whether or not the closing operation is performed continuously. For example, if the detection value of the motor current at the motor 13*a* is not less than the threshold Ia, the operation detector 101 determines that the closing operation is performed continuously. The process flow then proceeds to step S3.

In step S3, the operation detector 101 determines whether or not the prescribed time period Ta has elapsed. If the operation detector 101 determines that the prescribed time period Ta has not yet elapsed, the process flow returns to step S2.

The processes in steps S2 and S3 are then repeated until the operation detector 101 determines that the closing operation has ended in step S2 or determines that the prescribed time period Ta has elapsed in step S3.

If the operation detector 101 determines that the prescribed time period Ta has elapsed in step S3, the process flow proceeds to step S4.

In step S4, the opening-closing controller 104 turns ON the passenger's seat relay contact on the close side. Specifically, the opening-closing controller 104 turns ON the relay contact 81YUa via the driving circuit 82*a*.

As indicated in the timing chart in the left half in FIG. 12, the relay contact 81YUa is turned ON if the closing operation is performed to the passenger's seat sub switch 91*a* continuously for not less than the prescribed time period Ta and motor current is detected continuously. The automatic window system 1 then comes into the state depicted in FIG. 14. Motor current does not change in route in this case, so that the closing motion of the front passenger's seat window continues.

Figure 15:
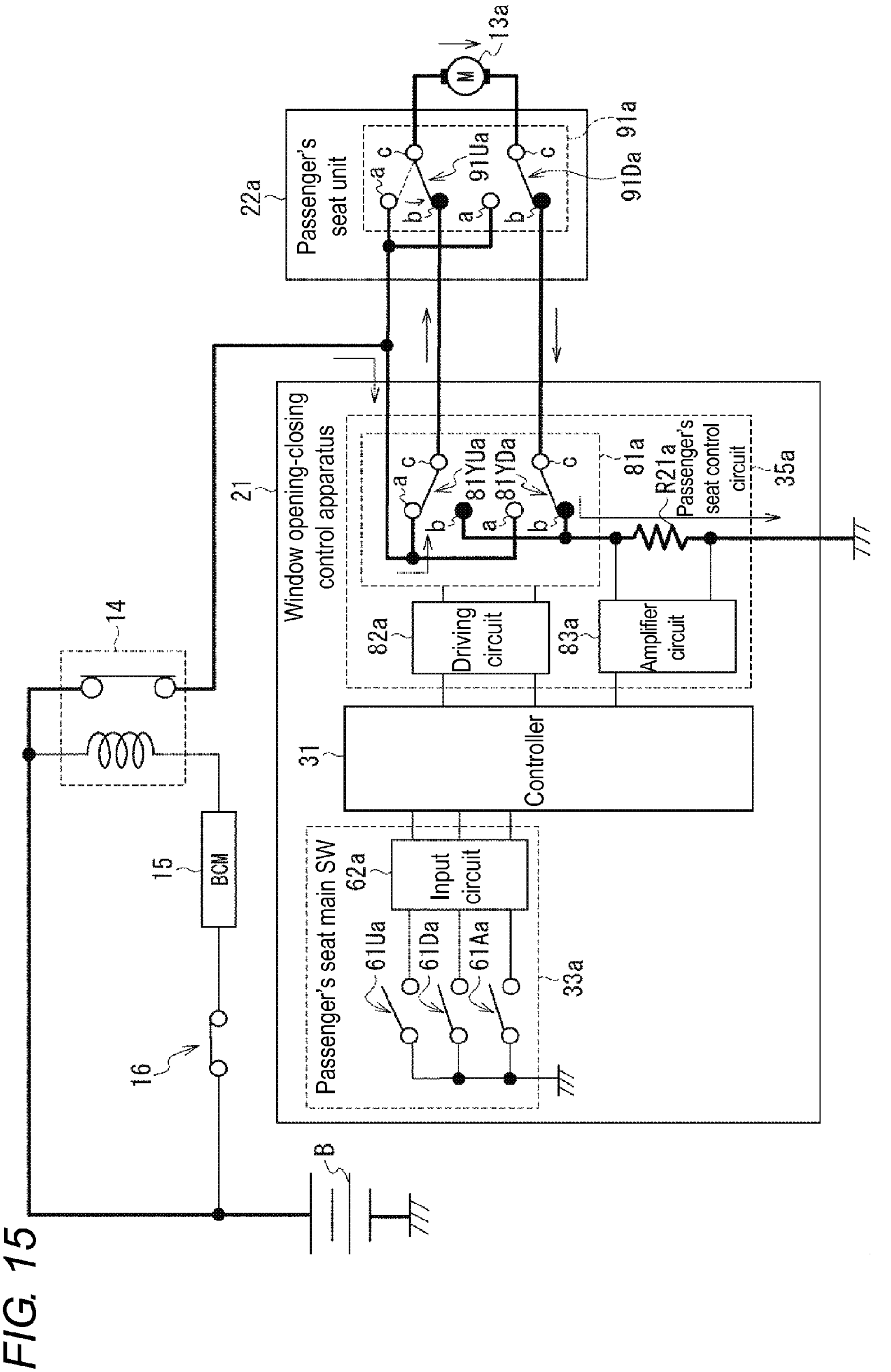
FIG. 15 is an explanatory diagram of the automatically closing motion with the passenger's seat sub switch according to the first embodiment.

As depicted in FIG. 15, even when the closing operation to the passenger's seat sub switch 91*a* subsequently ends and the contact 91Ua is turned OFF, the opening-closing controller 104 keeps the state where the relay contact 81YUa is ON via the driving circuit 82*a*. Accordingly, current flows from the power supply B to ground via the main relay 14, the terminal a of the relay contact 81YUa, the terminal b of the contact 91Ua, the motor 13*a*, the terminal b of the contact 91Da, the terminal b of the relay contact 81YDa, and the resistor R21*a*. This causes motor current to continuously flow in the forward direction to the motor 13*a*, so as to continue the closing motion of the front passenger's seat window.

In step S5, the window position detector 102 determines whether or not the passenger's seat window is fully closed. Specifically, the window position detector 102 detects a position of the front passenger's seat window in the opening-closing direction in accordance with the ripple of motor current at the motor 13*a* as described above. If the window position detector 102 determines that the front passenger's seat window has not been fully closed yet, the process flow proceeds to step S6.

In step S6, the operation detector 101 determines whether or not the automatically closing motion is canceled. If the operation detector 101 determines that automatically closing motion is not canceled, the process flow returns to step S5.

The processes in steps S5 and S6 are then repeated until the window position detector 102 determines that the passenger's seat window is fully closed in step S5 or the operation detector 101 determines that the automatically closing motion is canceled in step S6.

If the opening operation is performed to the passenger's seat main switch 33*a* or the passenger's seat sub switch 91*a*, for example, the operation detector 101 determines that the automatically closing motion is canceled in step S6. The operation detector 101 determines that the automatically closing motion is canceled if the opening operation is performed to the passenger's seat main switch 33*a* and the operation detector 101 detects that the contact 61Da is turned ON via the input circuit 62*a*, for example.

Figure 16:
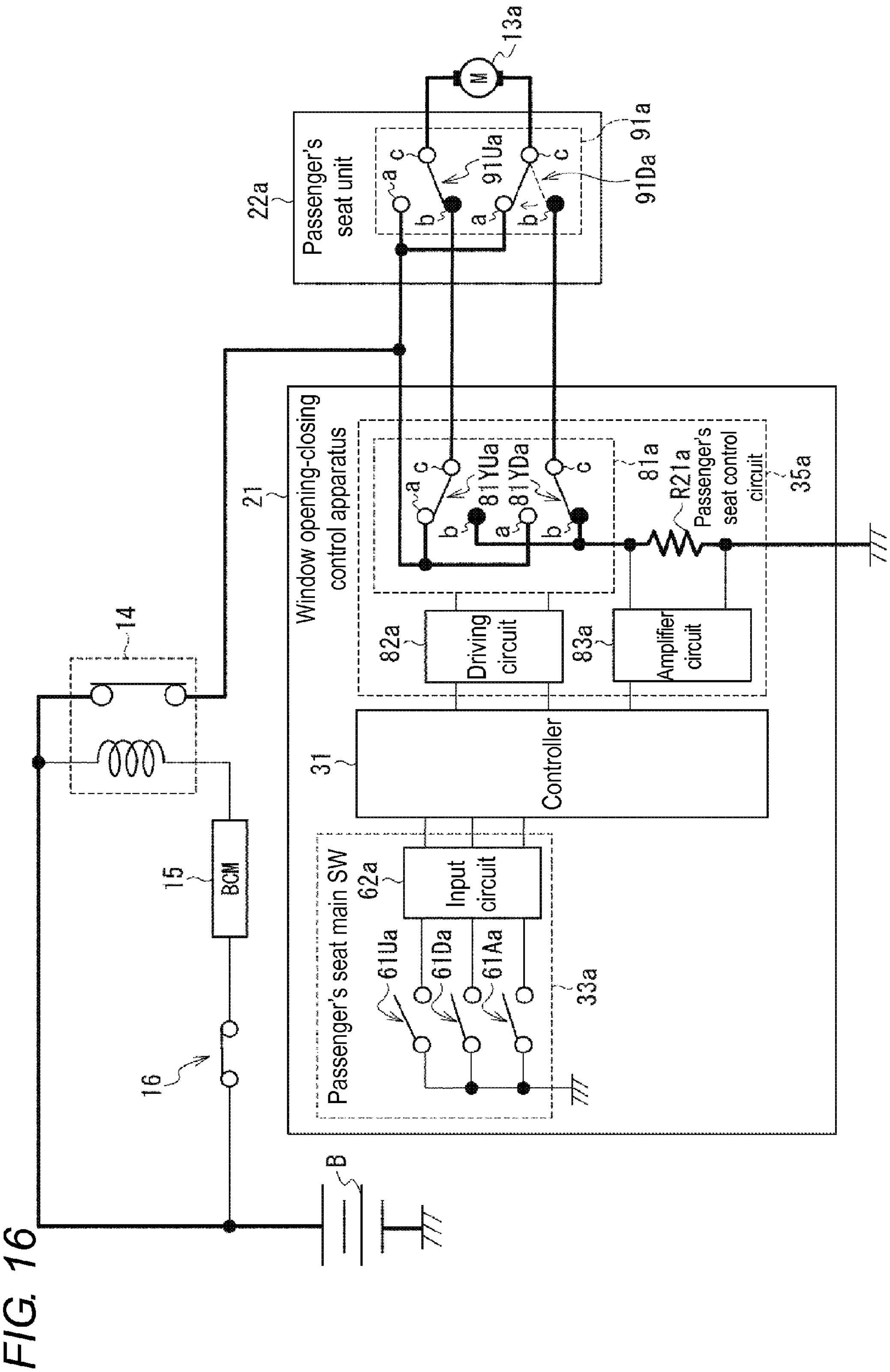
FIG. 16 is an explanatory diagram of the automatically closing motion with the passenger's seat sub switch according to the first embodiment.
Figure 17:
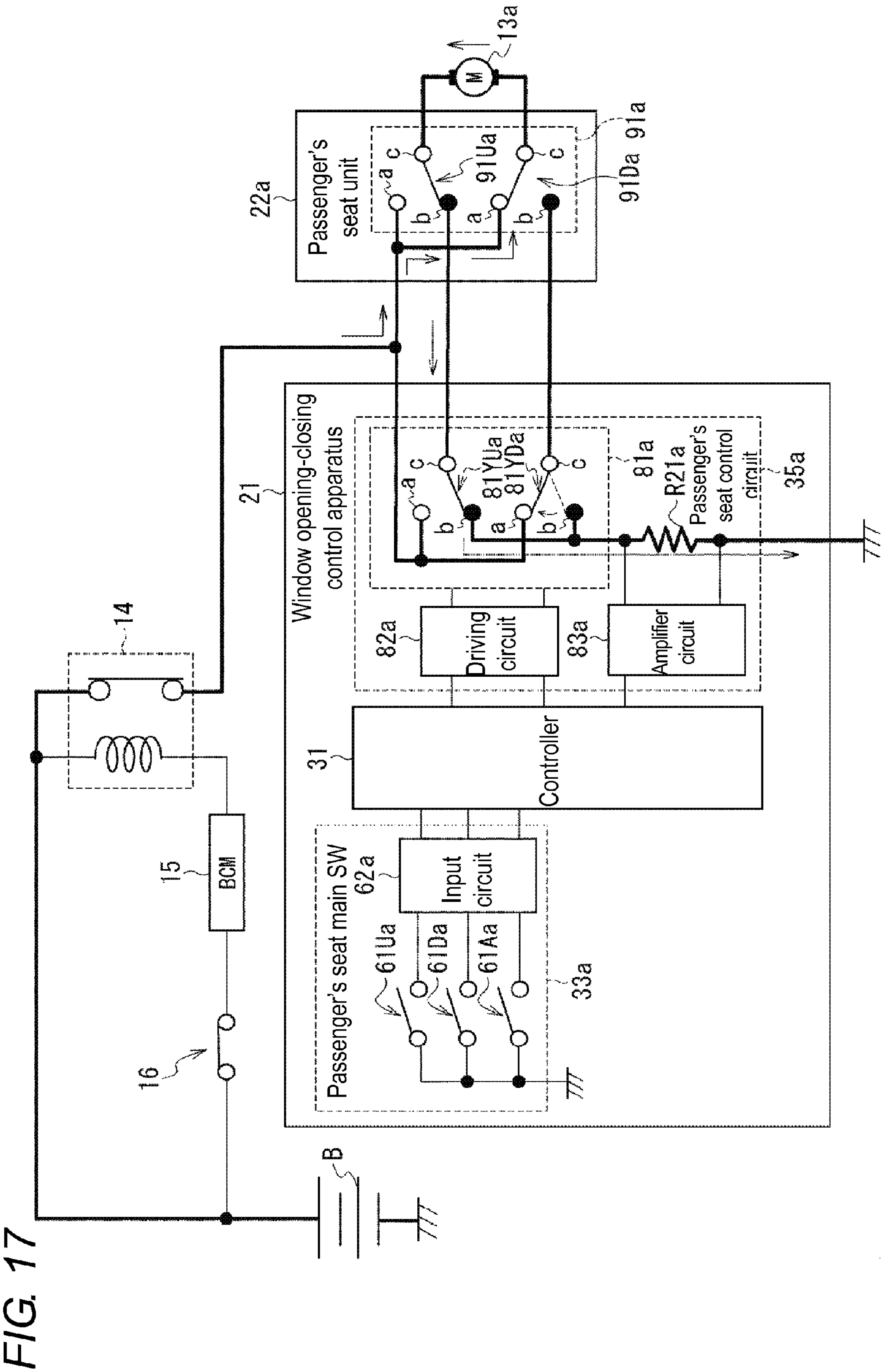
FIG. 17 is an explanatory diagram of automatically opening motion with the passenger's seat sub switch according to the first embodiment.

Alternatively, if the opening operation is performed to the passenger's seat sub switch 91*a* and the contact 91Da is turned ON as depicted in FIG. 16, the motor 13*a* has subsequently equal potential at the both ends and motor current stops. The operation detector 101 thus determines that the automatically closing motion is canceled if the operation detector 101 detects that motor current at the motor 13*a* stops for not less than a predetermined time period.

If the operation detector 101 determines that automatically closing motion is canceled, the process flow proceeds to step S7.

Alternatively, if the window position detector 102 determines that the passenger's seat window is fully closed in step S5, the process flow proceeds to step S7.

In step S7, the opening-closing controller 104 turns OFF the passenger's seat relay contact on the close side. Specifically, the opening-closing controller 104 turns OFF the relay contact 81YUa via the driving circuit 82*a*. This stops motor current to the motor 13*a*.

In this manner, the automatically closing motion of automatically fully closing the front passenger's seat window is achieved even if the closing operation to the passenger's seat sub switch 91*a* ends, unless the closing operation is canceled halfway.

The window opening-closing process then ends.

If the operation detector 101 determines that the closing operation has ended in step S2, the processes from steps S3 to S7 are not executed and the window opening-closing process ends. This applies to a case where the closing operation to the passenger's seat sub switch 91*a* ends before the prescribed time period Ta elapses.

As indicated in the left half in FIG. 13, the relay contact 81YUa serving as the passenger's seat relay contact on the close side is kept OFF in this case. When the contact 91Ua is turned OFF along with end of the closing operation, motor current to the motor 13*a* stops and the closing operation to the front passenger's seat window stops.

If the detection value of the motor current at the motor 13*a* is less than the threshold Ia, the operation detector 101 determines that the opening operation is performed in step S1. The process flow then proceeds to step S8.

The automatic window system 1 comes into the state depicted in FIG. 8 in this case, and motor current flows in the backward direction to the motor 13*a* to start the opening motion of the front passenger's seat window.

In step S8, the operation detector 101 determines whether or not the opening operation is performed continuously. For example, if the detection value of the motor current at the motor 13*a* is not less than a predetermined threshold Ib, the operation detector 101 determines that the opening operation is performed continuously. The process flow then proceeds to step S9. This threshold Ib can be set to be smaller than the minimum value of the motor current flowing to the motor 13*a* when the front passenger's seat window is opening in the stable state.

As in step S2, the operation detector 101 determines whether or not the prescribed time period Ta has elapsed in step S9. If the operation detector 101 determines that the prescribed time period Ta has not yet elapsed, the process flow returns to step S8.

The processes in steps S8 and S9 are then repeated until the operation detector 101 determines that the opening operation has ended in step S8 or determines that the prescribed time period Ta has elapsed in step S9.

If the operation detector 101 determines that the prescribed time period Ta has elapsed in step S9, the process flow proceeds to step S10.

In step S10, the opening-closing controller 104 turns ON the passenger's seat relay contact on the open side.

Specifically, the opening-closing controller 104 turns ON the relay contact 81YDa via the driving circuit 82*a*.

As indicated in the timing chart in the right half in FIG. 12, the relay contact 81YDa is turned ON if the opening operation is performed to the passenger's seat sub switch 91*a* continuously for not less than the prescribed time period Ta and motor current is continuously detected. The automatic window system 1 then comes into the state depicted in FIG. 17. Motor current does not change in route in this case, so that the opening motion of the front passenger's seat window continues.

Figure 18:
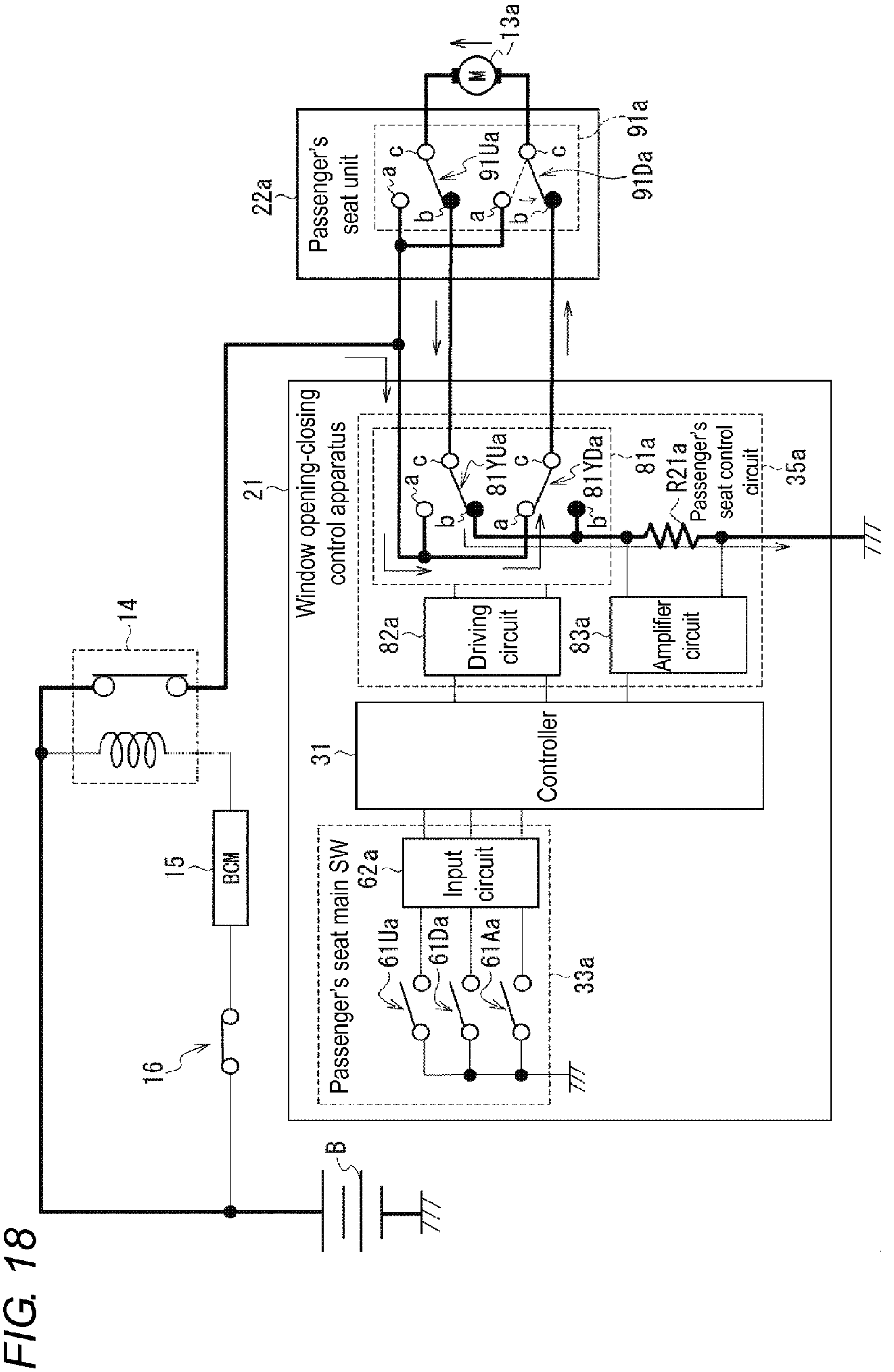
FIG. 18 is an explanatory diagram of the automatically opening motion with the passenger's seat sub switch according to the first embodiment.

As depicted in FIG. 18, even when the opening operation to the passenger's seat sub switch 91*a* subsequently ends and the contact 91Da is turned OFF, the opening-closing controller 104 keeps the state where the relay contact 81YDa is ON via the driving circuit 82*a*. Accordingly, current flows from the power supply B to ground via the main relay 14, the terminal a of the relay contact 81YDa, the terminal b of the contact 91Da, the motor 13*a,* the terminal b of the contact 91Ua, the terminal b of the relay contact 81YUa, and the resistor R21*a*. This causes motor current to continuously flow in the backward direction to the motor 13*a,* so as to continue the opening motion of the front passenger's seat window.

In step S11, the window position detector 102 determines whether or not the passenger's seat window is fully opened. Specifically, the window position detector 102 detects a position of the front passenger's seat window in the opening-closing direction in accordance with the ripple of motor current at the motor 13*a* as described above. If the window position detector 102 determines that the front passenger's seat window has not been fully opened yet, the process flow proceeds to step S12.

In step S12, the operation detector 101 determines whether or not the automatically opening motion is canceled. If the operation detector 101 determines that the automatically opening motion is not canceled, the process flow returns to step S11.

The processes in steps S11 and S12 are then repeated until the window position detector 102 determines that the passenger's seat window is fully opened in step S11 or the operation detector 101 determines that the automatically opening motion is canceled in step S12.

If the closing operation is performed to the passenger's seat main switch 33*a* or the passenger's seat sub switch 91*a,* for example, the operation detector 101 determines that the automatically opening motion is canceled in step S12. The operation detector 101 determines that the automatically opening motion is canceled if the closing operation is performed to the passenger's seat main switch 33*a* and the operation detector 101 detects that the contact 61Ua is turned ON via the input circuit 62*a,* for example.

Figure 19:
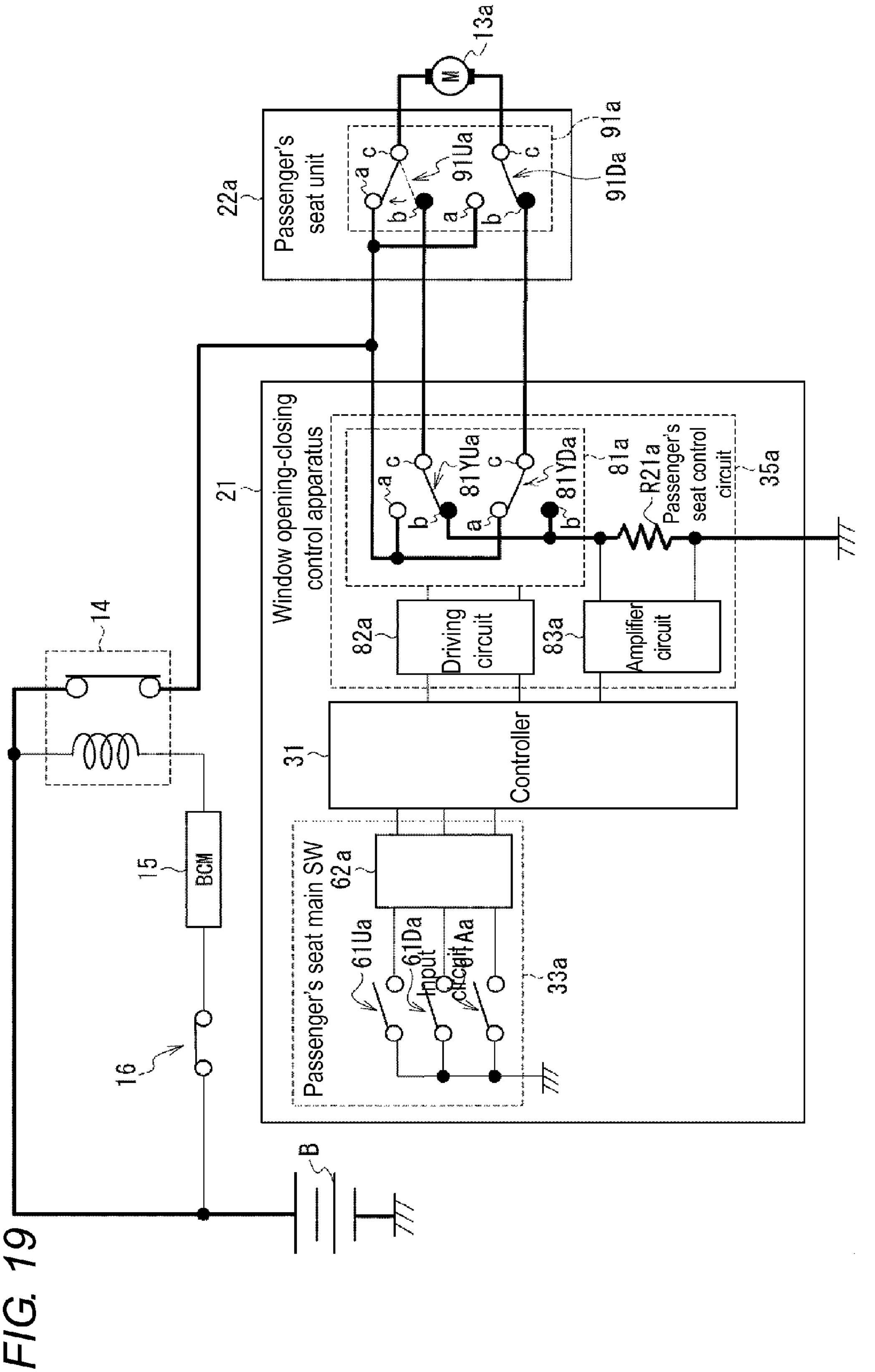
FIG. 19 is an explanatory diagram of the automatically opening motion with the passenger's seat sub switch according to the first embodiment.

Alternatively, if the closing operation is performed to the passenger's seat sub switch 91*a* and the contact 91Ua is turned ON as depicted in FIG. 19, the motor 13*a* has subsequently equal potential at the both ends and motor current stops. The operation detector 101 thus determines that the automatically opening motion is canceled if the operation detector 101 detects that motor current at the motor 13*a* stops for not less than a predetermined time period.

If the operation detector 101 determines that automatically opening motion is canceled, the process flow proceeds to step S13.

Alternatively, if the window position detector 102 determines that the passenger's seat window is fully opened in step S11, the process flow proceeds to step S13.

In step S13, the opening-closing controller 104 turns OFF the passenger's seat relay contact on the open side.

Specifically, the opening-closing controller 104 turns OFF the relay contact 81YDa via the driving circuit 82*a*. This stops motor current to the motor 13*a*.

In this manner, the automatically opening motion of automatically fully opening the front passenger's seat window is achieved even if the opening operation to the passenger's seat sub switch 91*a* stops, unless the opening operation is canceled halfway.

The window opening-closing process then ends.

If the operation detector 101 determines that the opening operation has ended in step S8, the processes from steps S9 to S13 are not executed and the window opening-closing process ends. This applies to a case where the opening operation to the passenger's seat sub switch 91*a* ends before the prescribed time period Ta elapses.

As indicated in the right half in FIG. 13, the relay contact 81YDa serving as the passenger's seat relay contact on the open side is kept OFF in this case. When the contact 91Da is turned OFF along with end of the opening operation, motor current to the motor 13*a* stops and the opening motion of the front passenger's seat window stops.

As described above, the closing operation or the opening operation is performed to the passenger's seat sub switch 91*a* continuously for not less than the prescribed time period Ta, so as to achieve the automatic operation to the front passenger's seat window.

The automatic operation to the rear right passenger's seat window and the rear left passenger's seat window can be achieved by similarly operating the passenger's seat sub switches 91*b* and 91*c*.

{Second Achievement Method}

The second achievement method for the automatic operation to the passenger's seat window with the passenger's seat sub switch 91 will be described next with reference to FIGS. 20 to 24. According to the second achievement method, the passenger's seat sub switch 91 is operated continuously for a period not less than a prescribed time period Tb and less than a prescribed time period Tc (hereinafter, referred to as short push operation) to achieve the automatic operation. The prescribed time period Tb is set to be long enough to prevent erroneous detection that the operation is performed by lightly touching the passenger's seat sub switch 91 with no intention, for example. The prescribed time period Tb can be set to zero. The prescribed time period Tc is set to be longer than the prescribed time period Tb and shorter than the prescribed time period Ta adopted in the first achievement method. The prescribed time period Tc can be set such that a user can recognize as having operated the passenger's seat sub switch 91*a* intentionally for a short period of time.

Figure 20:
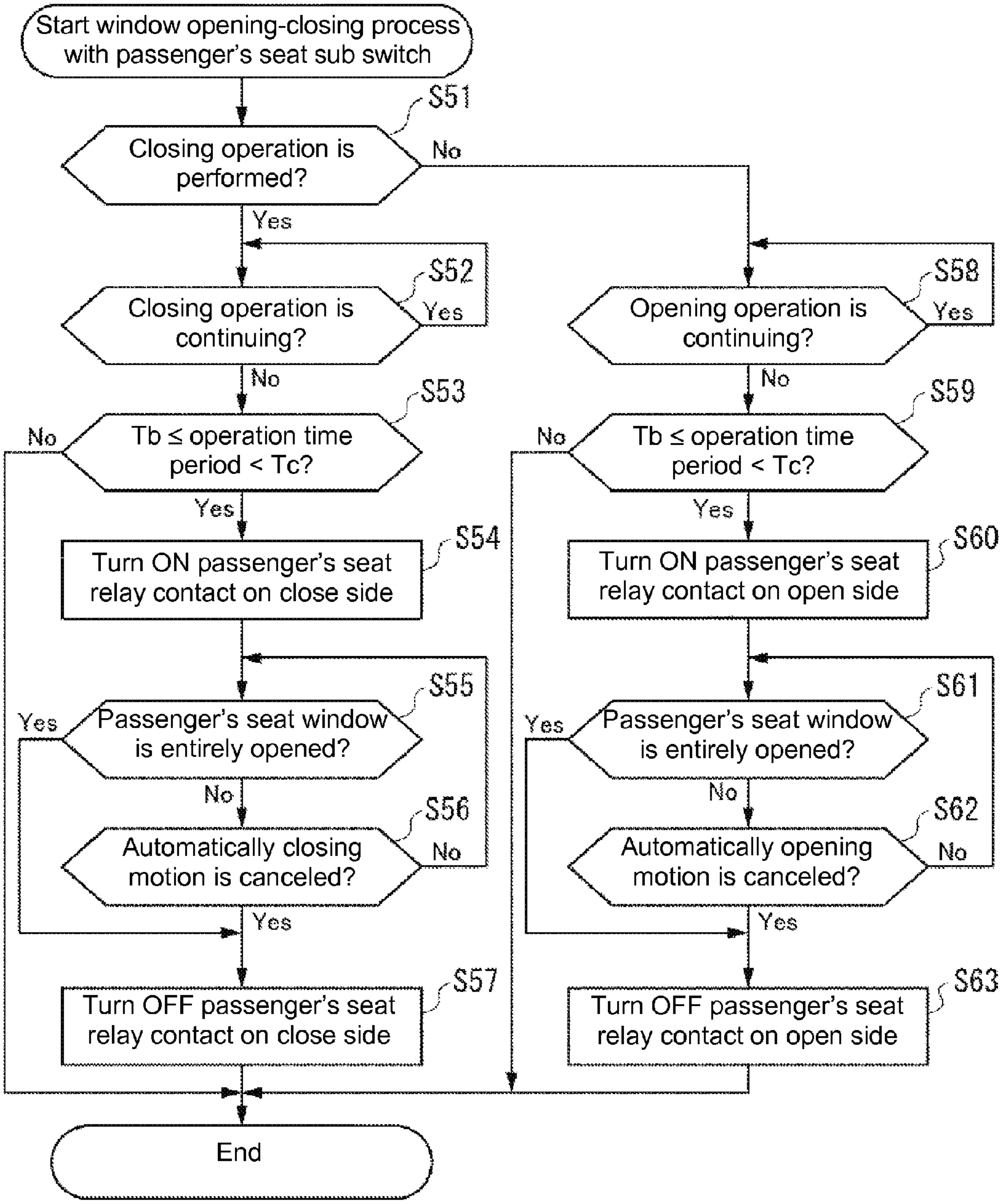
FIG. 20 is an explanatory flowchart of a window opening-closing process by a passenger's seat sub switch according to a second embodiment.

A window opening-closing process executed by the automatic window system 1 with the passenger's seat sub switch 91 according to a second embodiment will now be described with reference to the flowchart in FIG. 20 and the timing charts in FIGS. 21 and 22. This window opening-closing process starts when the closing operation or the opening operation is performed to any one of the passenger's seat sub switches 91*a* to 91*c* and the operation detector 101 detects that the operation is performed.

Figure 21:
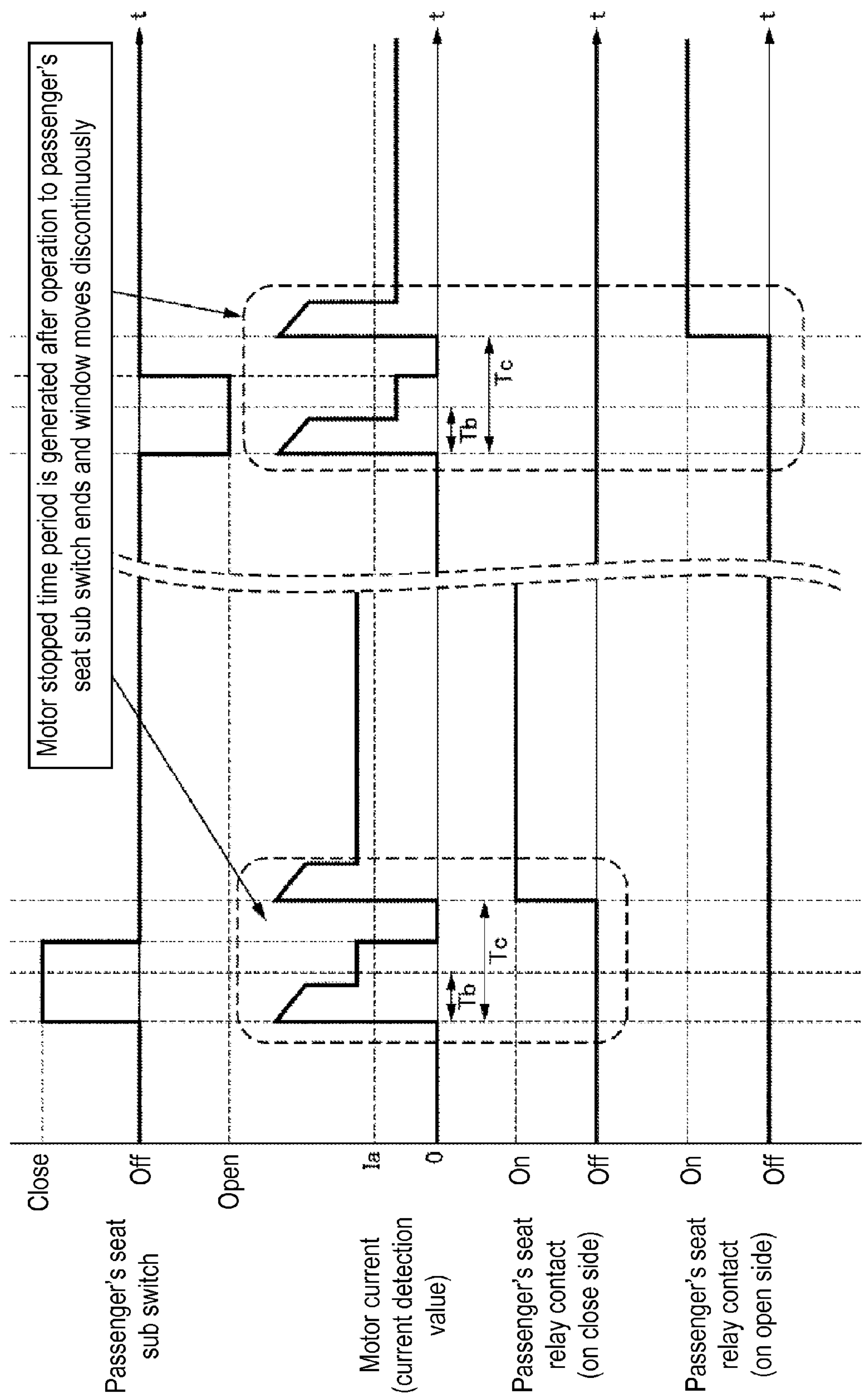
FIG. 21 is an explanatory timing chart of the window opening-closing process by the passenger's seat sub switch according to the second embodiment.
Figure 22:
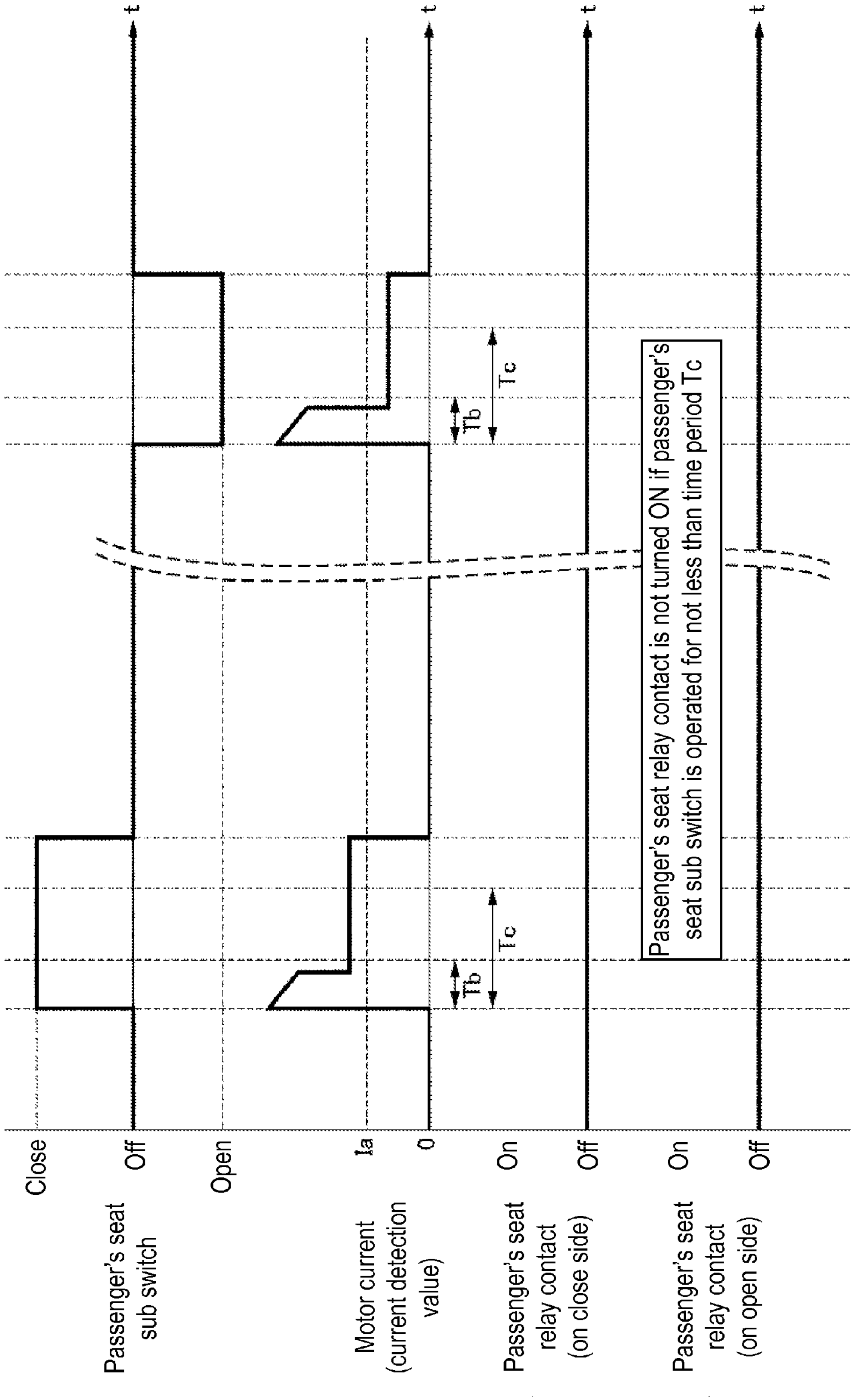
FIG. 22 is an explanatory timing chart of the window opening-closing process by the passenger's seat sub switch according to the second embodiment.

FIGS. 21 and 22 are timing charts similar to those in FIGS. 12 and 13. A timing chart for the automatically closing operation is indicated in the left half divided by the dotted lines in FIG. 21, whereas a timing chart for the automatically opening operation is indicated in the right half divided by the dotted lines in FIG. 21. A timing chart for the manually closing operation is indicated in the left half divided by the dotted lines in FIG. 22, whereas a timing chart for the manually opening operation is indicated in the right half divided by the dotted lines in FIG. 22.

Exemplified below is a case of opening and closing the front passenger's seat window with the passenger's seat sub switch 91*a*. The passenger's seat in the flowchart in FIG. 20 and the timing charts in FIGS. 21 and 22 mainly refer to the front passenger's seat in the following description.

Figure 11:
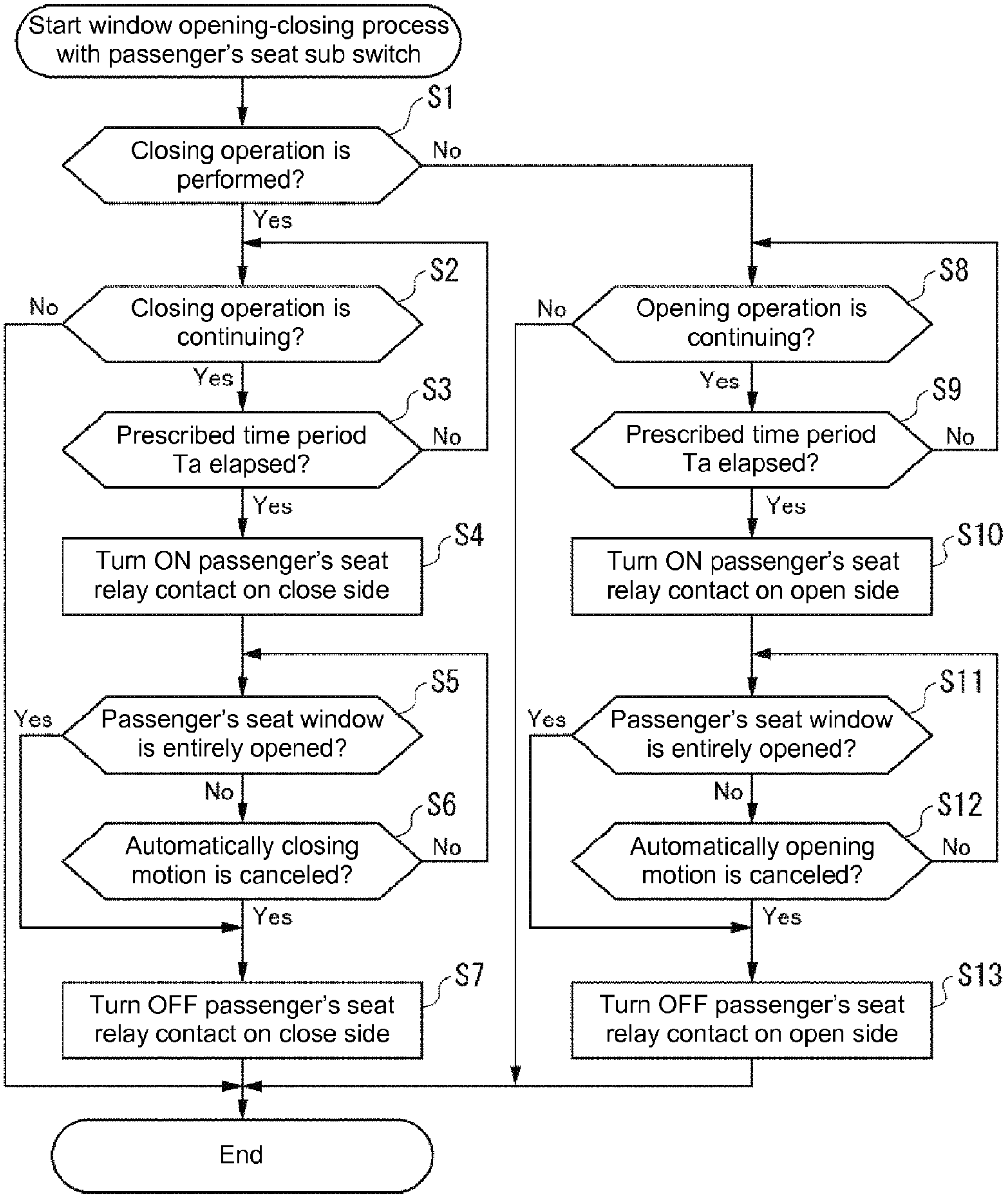
FIG. 11 is an explanatory flowchart of a window opening-closing process by a passenger's seat sub switch according to a first embodiment.

As in step S1 in FIG. 11, the operation detector 101 determines whether or not the closing operation is performed in step S51. If the operation detector 101 determines that closing operation is performed, the process flow proceeds to step S52.

As in step S2 in FIG. 11, the operation detector 101 determines whether or not the closing operation is performed continuously in step S52. This determination is repeated until the operation detector 101 determines that the closing operation has ended. If the operation detector 101 determines that the closing operation has ended, the process flow proceeds to step S53.

The automatic window system 1 is kept in the state depicted in FIG. 7 until the operation detector 101 determines that the closing operation has ended. Motor current flows in the forward direction to the motor 13*a* to achieve the closing motion of the front passenger's seat window. The closing motion of the front passenger's seat window stops along with end of the closing operation.

In step S53, the operation detector 101 determines whether or not the prescribed time period Tb≤the operation time period<the prescribed time period Tc is satisfied. The operation time period herein is duration of the closing operation from detection of the closing operation to the passenger's seat sub switch 91*a* to determination of end of the closing operation in step S52. If the operation detector 101 determines that the prescribed time period Tb≤the operation time period<the prescribed time period Tc is satisfied, the process flow proceeds to step S54.

Figure 23:
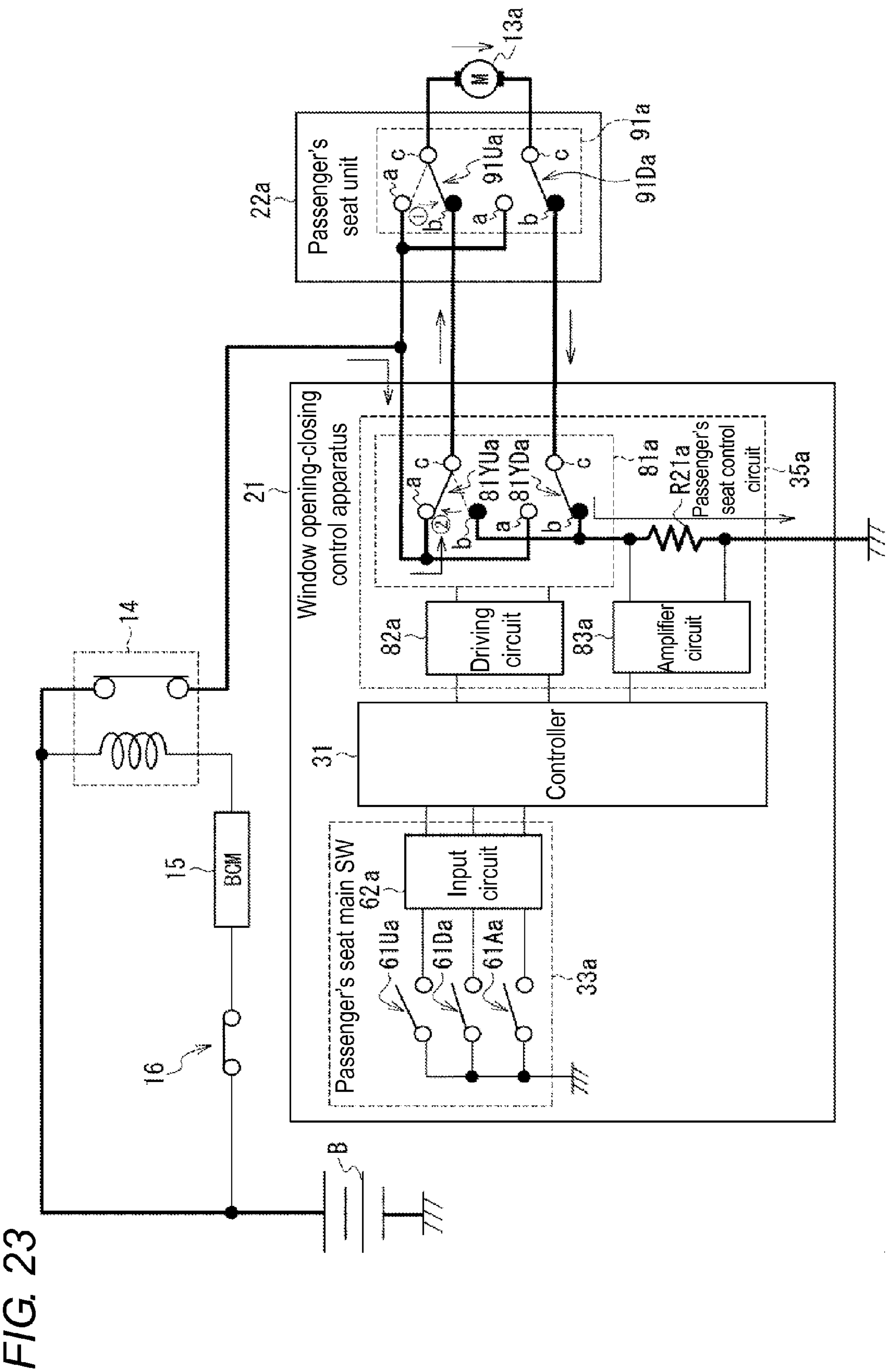
FIG. 23 is an explanatory diagram of automatically closing motion with the passenger's seat sub switch according to the second embodiment.

As in step S4 in FIG. 11, the passenger's seat relay contact on the close side is turned ON in step S54. As indicated in the timing chart in the left half in FIG. 21 as well as depicted in FIG. 23, the relay contact 81YUa is turned ON after end of the closing operation if the closing operation is performed to the passenger's seat sub switch 91*a* continuously for a period not less than the prescribed time period Tb and less than the prescribed time period Tc. Accordingly, as depicted in FIG. 23, current flows from the power supply B to ground via the main relay 14, the terminal a of the relay contact 81YUa, the terminal b of the contact 91Ua, the motor 13*a*, the terminal b of the contact 91Da, the terminal b of the relay contact 81YDa, and the resistor R21*a*. This causes motor current to restart flowing in the forward direction to the motor 13*a*, so as to restart the closing motion of the front passenger's seat window.

It is possible to appropriately set a time period from end of the closing operation to the passenger's seat sub switch 91*a* to turning ON the relay contact 81YUa.

Subsequently in steps S55 to S57, processes similar to the processes from steps S5 to S7 in FIG. 11 are executed and the window opening-closing process ends. In this manner, the automatically closing motion of automatically fully closing the front passenger's seat window is achieved if the closing operation to the passenger's seat sub switch 91*a* ends before the prescribed time period Tc elapses, unless the closing operation is canceled halfway.

If the operation detector 101 determines that the operation time period<the prescribed time period Tb or the operation time period≥the prescribed time period Tc is satisfied in step S53, the processes from steps S54 to S57 are not executed and the window opening-closing process ends.

As indicated in the left half in FIG. 22, the relay contact 81YUa serving as the passenger's seat relay contact on the close side is kept OFF in this case. The front passenger's seat window is thus closed only while the closing operation is performed to the passenger's seat sub switch 91*a* (manually closing motion).

If the operation detector 101 determines that the opening operation is performed in step S51, the process flow proceeds to step S58.

As in step S8 in FIG. 11, the operation detector 101 determines whether or not the opening operation is performed continuously in step S58. This determination is repeated until the operation detector 101 determines that the opening operation has ended. If the operation detector 101 determines that the opening operation has ended, the process flow proceeds to step S59.

The automatic window system 1 is kept in the state depicted in FIG. 8 until the operation detector 101 determines that the opening operation has ended. Motor current flows in the backward direction to the motor 13*a* to achieve the opening motion of the front passenger's seat window. The opening motion of the front passenger's seat window stops along with end of the opening operation.

As in step S53, the operation detector 101 determines whether or not the prescribed time period Tb≤the operation time period<the prescribed time period Tc is satisfied in step S59. If the operation detector 101 determines that the prescribed time period Tb≤the operation time period<the prescribed time period Tc is satisfied, the process flow proceeds to step S60. The operation time period is duration of the opening operation from detection of the opening operation to the passenger's seat sub switch 91*a* to determination of end of the opening operation in step S58.

Figure 24:
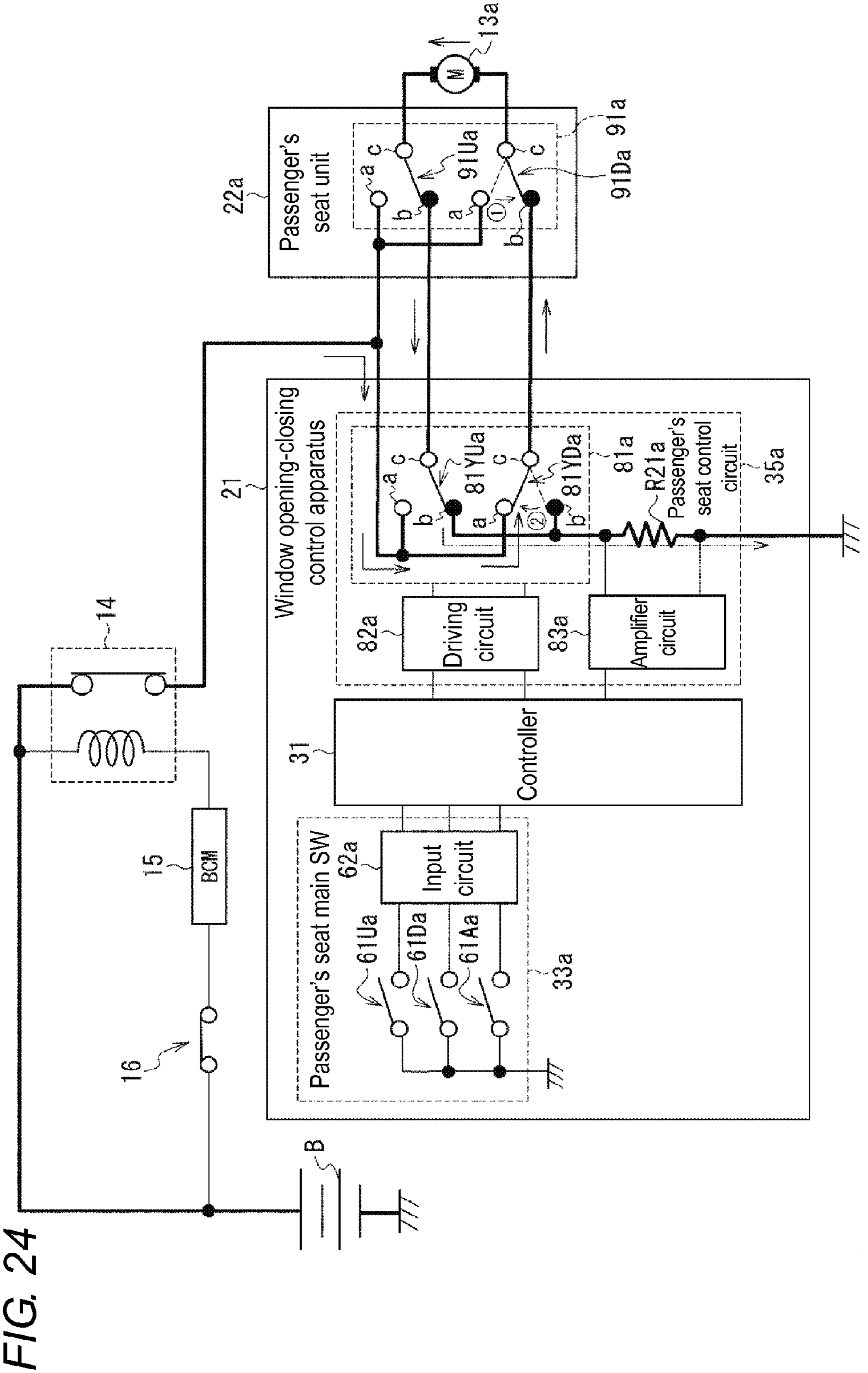
FIG. 24 is an explanatory diagram of automatically opening motion with the passenger's seat sub switch according to the second embodiment.

As in step S10 in FIG. 11, the passenger's seat relay contact on the open side is turned ON in step S60. As indicated in the timing chart in the right half in FIG. 21 as well as depicted in FIG. 24, the relay contact 81YDa is turned ON after end of the opening operation if the opening operation is performed to the passenger's seat sub switch 91*a* continuously for a period not less than the prescribed time period Tb and less than the prescribed time period Tc. Accordingly, as depicted in FIG. 24, current flows from the power supply B to ground via the main relay 14, the terminal a of the relay contact 81YDa, the terminal b of the contact 91Da, the motor 13*a*, the terminal b of the contact 91Ua, the terminal b of the relay contact 81YUa, and the resistor R21*a*. This causes motor current to restart flowing in the backward direction to the motor 13*a*, so as to restart the opening motion of the front passenger's seat window.

It is possible to appropriately set a time period from end of the opening operation to the passenger's seat sub switch 91*a* to turning ON the relay contact 81YDa.

Subsequently in steps S61 to S63, processes similar to the processes from steps S11 to S13 in FIG. 11 are executed and the window opening-closing process ends. In this manner, the automatically opening motion of automatically fully opening the front passenger's seat window is achieved if the opening operation to the passenger's seat sub switch 91*a* ends before the prescribed time period Tc elapses, unless the opening operation is canceled halfway.

If the operation detector 101 determines that the operation time period<the prescribed time period Tb or the operation time period≥the prescribed time period Tc is satisfied in step S59, the processes from steps S60 to S63 are not executed and the window opening-closing process ends.

As indicated in the right half in FIG. 22, the relay contact 81YDa serving as the passenger's seat relay contact on the open side is kept OFF in this case. The front passenger's seat window is thus opened only while the opening operation is performed to the passenger's seat sub switch 91*a* (manually opening motion).

As described above, the closing operation or the opening operation is performed to the passenger's seat sub switch 91*a* continuously for a period not less than the prescribed time period Tb and less than the prescribed time period Tc, so as to achieve the automatic operation to the front passenger's seat window.

The automatic operation to the rear right passenger's seat window and the rear left passenger's seat window can be achieved by similarly operating the passenger's seat sub switches 91*b* and 91*c*.

{Third Achievement Method}

The third achievement method for the automatic operation to the passenger's seat window with the passenger's seat sub switch 91 will be described next with reference to FIGS. 25 to 35. The third achievement method is achieved by modifying the second achievement method, and similarly to the second achievement method, the passenger's seat sub switch 91 is operated continuously for a period not less than the prescribed time period Tb and less than the prescribed time period Tc (e.g. short push operation) to achieve the automatic operation.

Specifically, according to the second achievement method, there is a motor stop period after end of the operation to the passenger's seat sub switch 91 during the automatic operation as indicated in FIG. 21. Accordingly, the passenger's seat window is opened or closed discontinuously. The third achievement method is provided to eliminate such discontinuous motion of the passenger's seat window.

Figure 25:
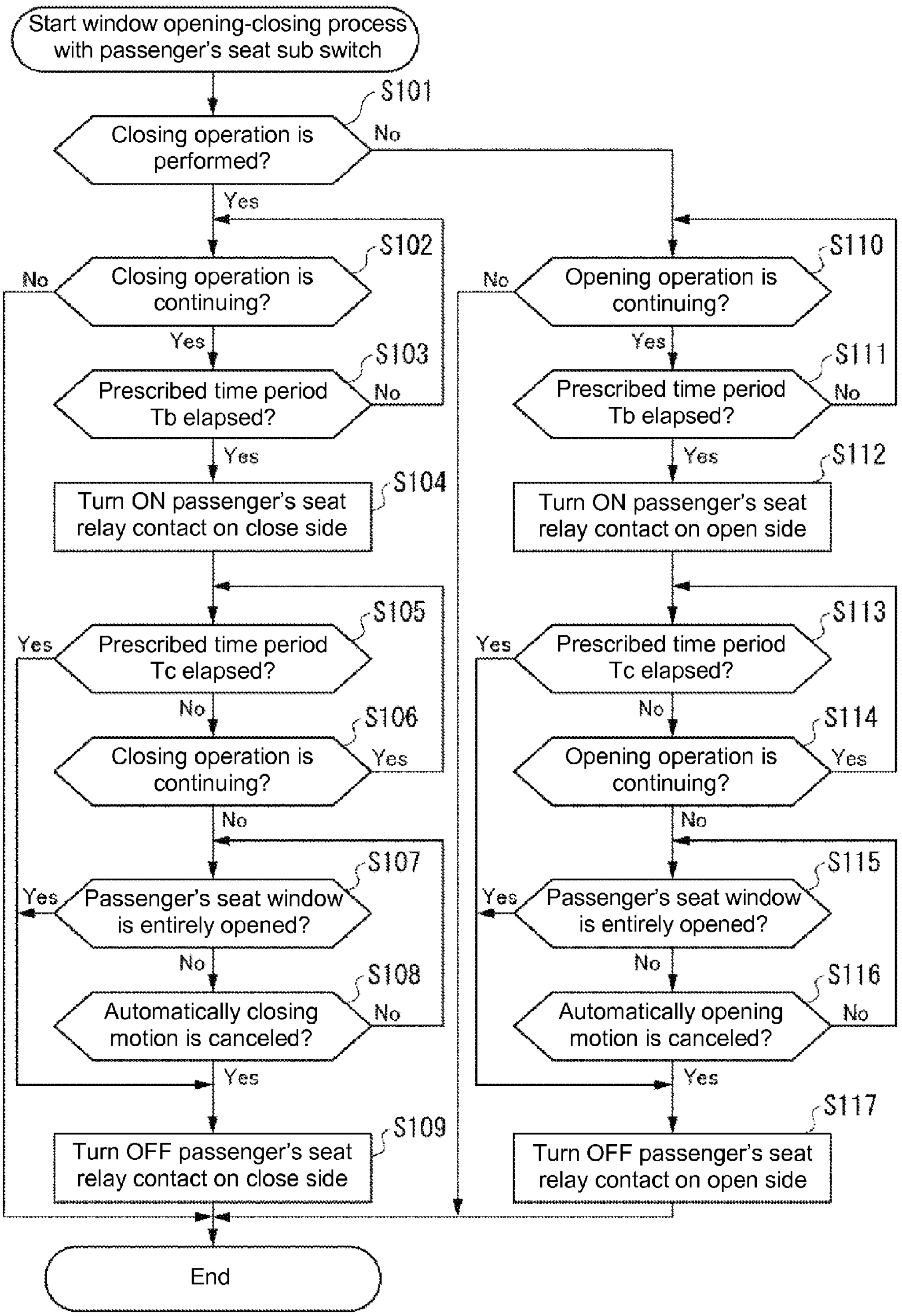
FIG. 25 is an explanatory flowchart of a window opening-closing process by a passenger's seat sub switch according to a third embodiment.

A window opening-closing process executed by the automatic window system 1 with the passenger's seat sub switch 91 according to a third embodiment will now be described with reference to the flowchart in FIG. 25 and the timing charts in FIGS. 26 and 27. This window opening-closing process starts when the closing operation or the opening operation is performed to any one of the passenger's seat sub switches 91*a* to 91*c* and the operation detector 101 detects that the operation is performed.

Figure 26:
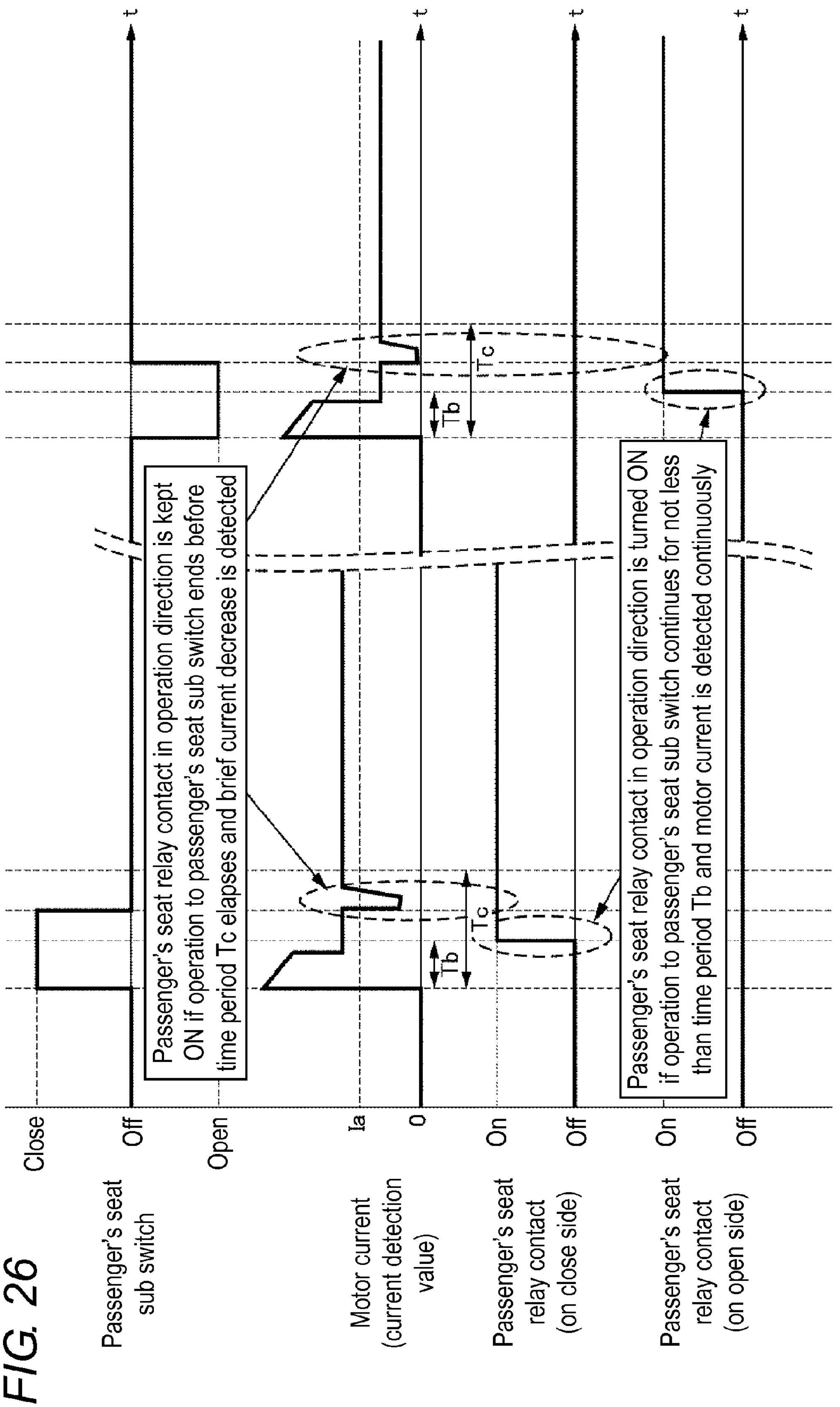
FIG. 26 is an explanatory timing chart of the window opening-closing process by the passenger's seat sub switch according to the third embodiment.
Figure 27:
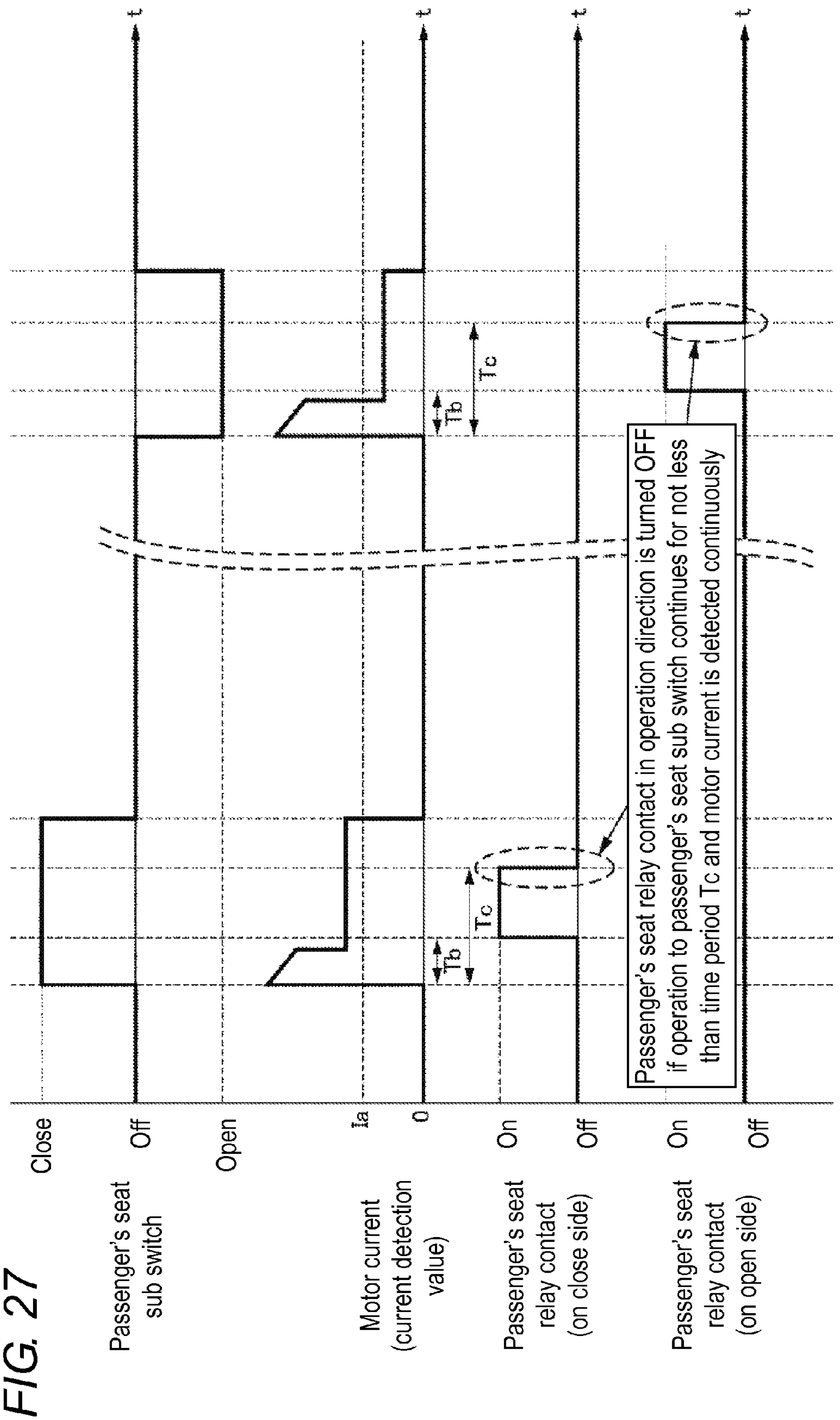
FIG. 27 is an explanatory timing chart of the window opening-closing process by the passenger's seat sub switch according to the third embodiment.

FIGS. 26 and 27 are timing charts similar to those in FIGS. 12, 13, 21, and 22. A timing chart for the automatically closing operation is indicated in the left half divided by the dotted lines in FIG. 26, whereas a timing chart for the automatically opening operation is indicated in the right half divided by the dotted lines in FIG. 26. A timing chart for the manually closing operation is indicated in the left half divided by the dotted lines in FIG. 27, whereas a timing chart for the manually opening operation is indicated in the right half divided by the dotted lines in FIG. 27.

Exemplified below is a case of opening and closing the front passenger's seat window with the passenger's seat sub switch 91*a*. The passenger's seat in the flowchart in FIG. 25 and the timing charts in FIGS. 26 and 27 mainly refer to the front passenger's seat in the following description.

As in step S1 in FIG. 11, the operation detector 101 determines whether or not the closing operation is performed in step S101. If the operation detector 101 determines that closing operation is performed, the process flow proceeds to step S102.

In this case, the automatic window system 1 comes into the state depicted in FIG. 7, and motor current flows in the forward direction to the motor 13*a* to start the closing motion of the front passenger's seat window.

As in step S2 in FIG. 11, the operation detector 101 determines whether or not the closing operation is performed continuously in step S102. If the operation detector 101 determines that closing operation is performed continuously, the process flow proceeds to step S103.

In step S103, the operation detector 101 determines whether or not the prescribed time period Tb has elapsed. If the operation detector 101 determines that the prescribed time period Tb has not yet elapsed, the process flow returns to step S102.

The processes in steps S102 and S103 are then repeated until the operation detector 101 determines that the closing operation has ended in step S102 or determines that the prescribed time period Tb has elapsed in step S103.

If the operation detector 101 determines that the prescribed time period Tb has elapsed in step S103, the process flow proceeds to step S104.

Figure 28:
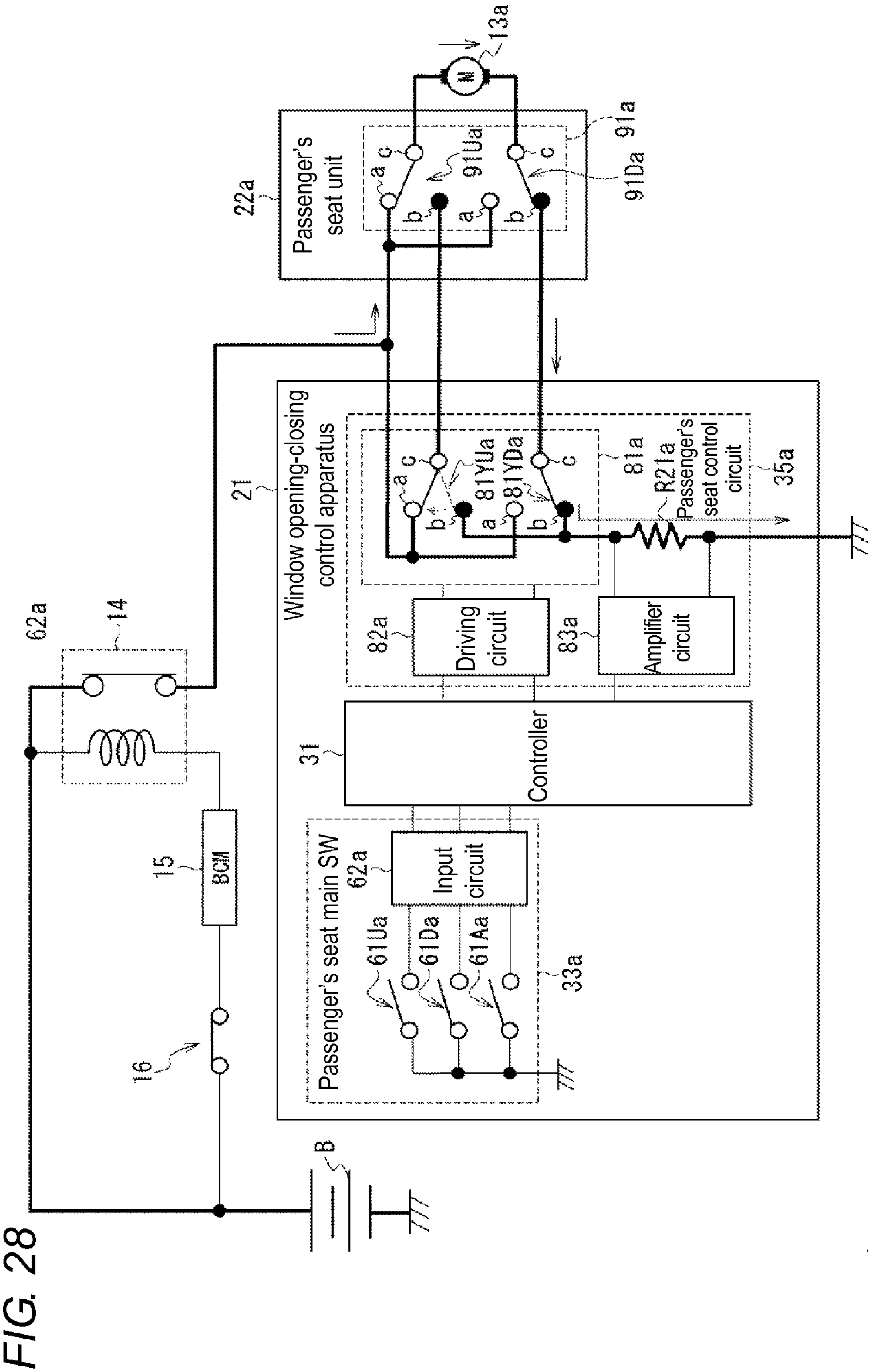
FIG. 28 is an explanatory diagram of automatically closing motion with the passenger's seat sub switch according to the third embodiment.

As in step S4 in FIG. 11, the passenger's seat relay contact on the close side is turned ON in step S104. Specifically, the relay contact 81YUa is turned ON as depicted in FIG. 28. Motor current does not change in route in this case, so that the closing motion of the front passenger's seat window continues.

In step S105, the operation detector 101 determines whether or not the prescribed time period Tc has elapsed. If the operation detector 101 determines that the prescribed time period Tc has not yet elapsed, the process flow proceeds to step S106.

As in step S2 in FIG. 11, the operation detector 101 determines whether or not the closing operation is performed continuously in step S106. If the operation detector 101 determines that closing operation is performed continuously, the process flow returns to step S105.

The processes in steps S105 and S106 are then repeated until the operation detector 101 determines that the prescribed time period Tc has elapsed in step S105 or determines that the closing operation has ended in step S106.

Figure 29:
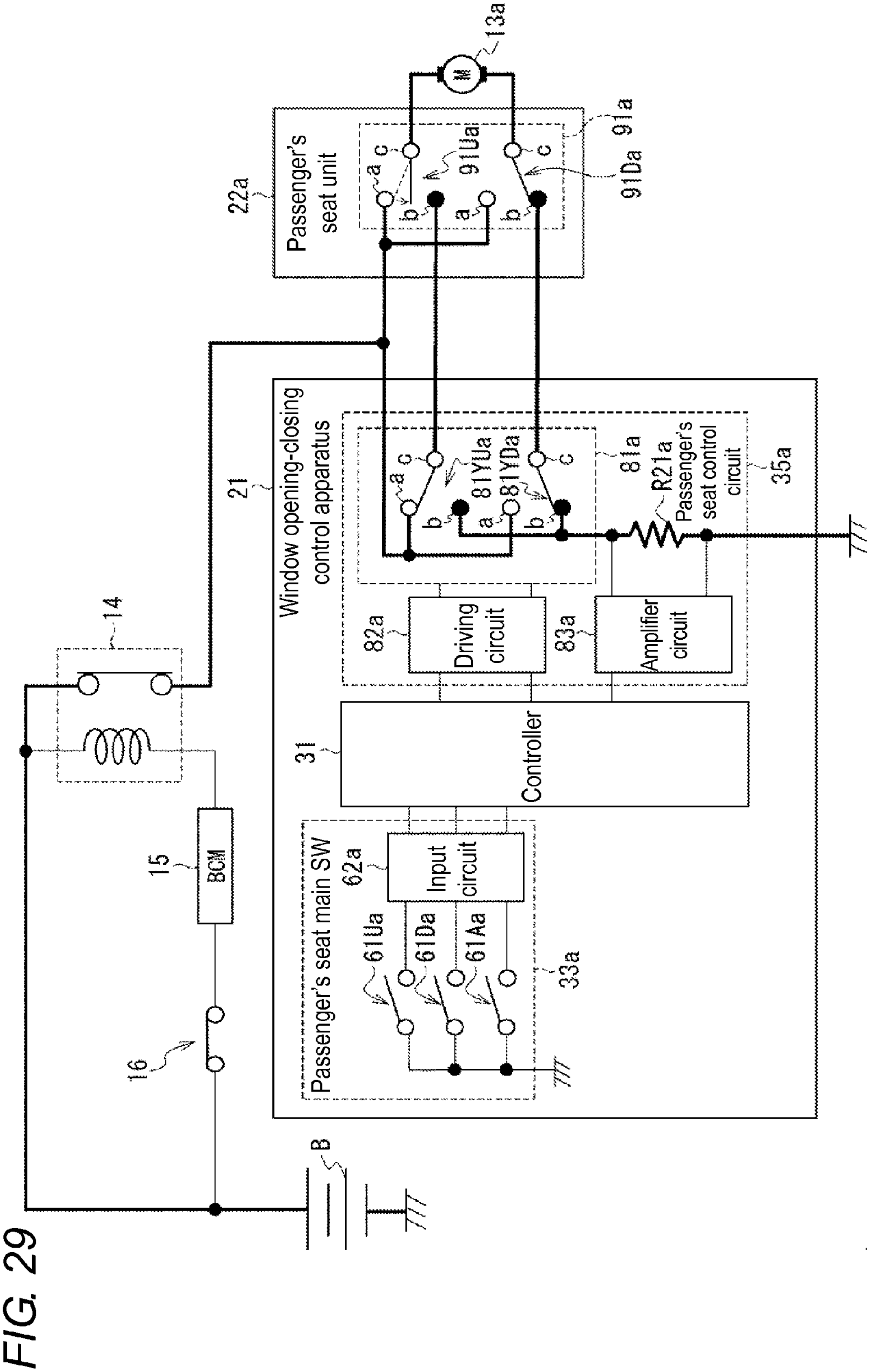
FIG. 29 is an explanatory diagram of the automatically closing motion with the passenger's seat sub switch according to the third embodiment.
Figure 30:
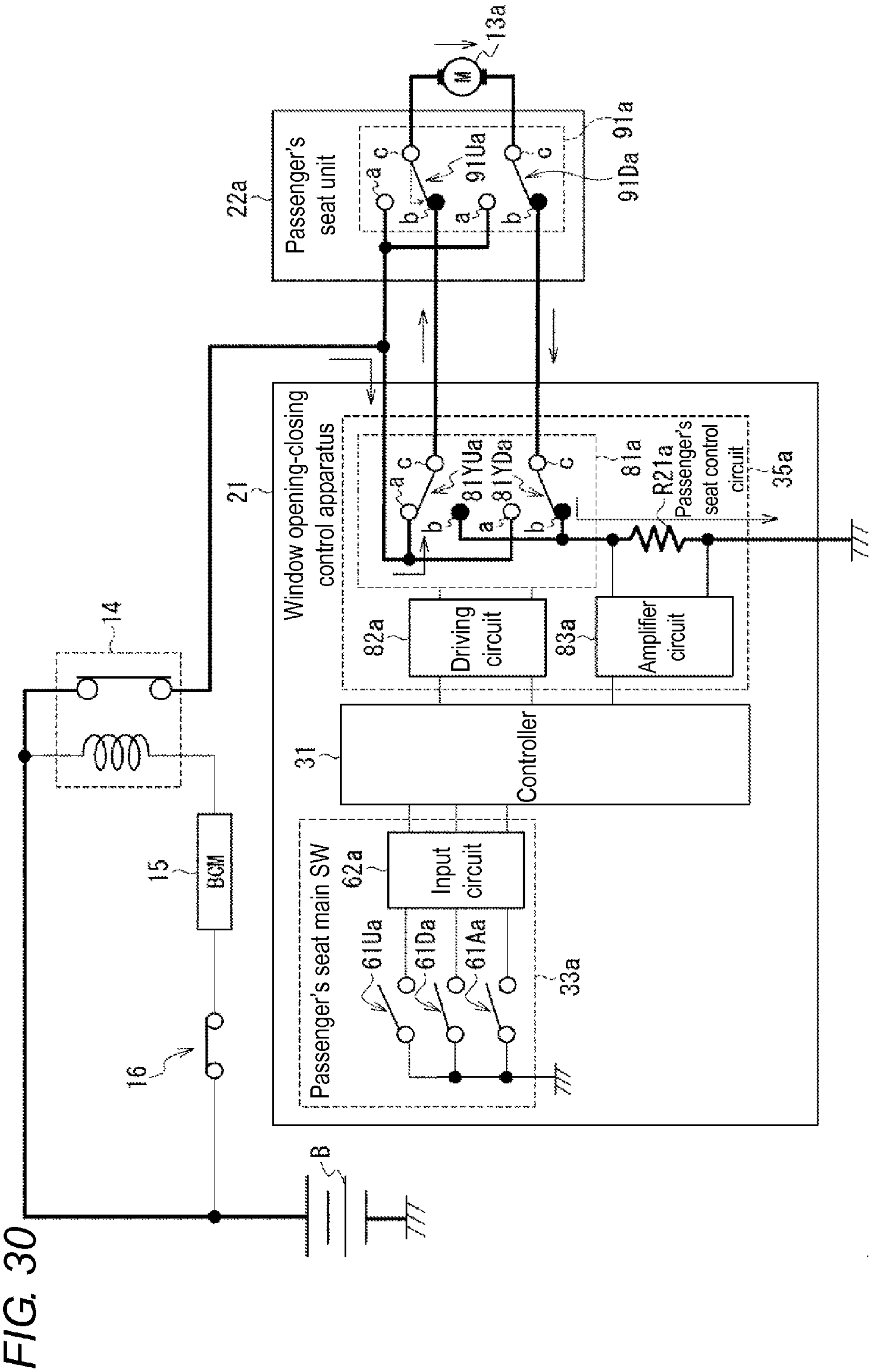
FIG. 30 is an explanatory diagram of the automatically closing motion with the passenger's seat sub switch according to the third embodiment.

While the closing operation to the passenger's seat sub switch 91*a* ends, the terminal c and the terminal a of the contact 91Ua are disconnected from each other, and the terminal c and the terminal b are connected to each other in step S106, the contact 91Ua is in a contactless state and motor current stops instantaneously as depicted in FIG. 29. If the contact 91Ua is thereafter turned OFF as depicted in FIG. 30, current flows from the power supply B to ground via the main relay 14, the terminal a of the relay contact 81YUa, the terminal b of the contact 91Ua, the motor 13*a*, the terminal b of the contact 91Da, the terminal b of the relay contact 81YDa, and the resistor R21*a*. In other words, motor current restarts flowing in the forward direction to the motor 13*a*.

As indicated in the left half in FIG. 26, motor current at the motor 13*a* thus decreases instantaneously after end of the closing operation and then returns to the stable state. If the operation detector 101 detects such brief decrease in motor current, the operation detector 101 determines that the closing operation has ended. The process flow then proceeds to step S107.

Thereafter, as indicated in the left half in FIG. 26, the passenger's seat relay contact 81YUa serving as the passenger's seat relay contact on the close side is kept ON even after the prescribed time period Tc elapses.

Subsequently in steps S107 to S109, processes similar to the processes from steps S5 to S7 in FIG. 11 are executed and the window opening-closing process ends. In this manner, the automatically closing motion of automatically fully closing the front passenger's seat window is achieved if the closing operation to the passenger's seat sub switch 91*a* ends before the prescribed time period Tc elapses, unless the closing operation is canceled halfway. Motor current may instantaneously stop at end of the closing operation to the passenger's seat sub switch 91*a* and the front passenger's seat window may move slowly. Such slow motion can be made to continue only briefly so that no user cares.

If the operation detector 101 determines that the prescribed time period Tc has elapsed in step S105, the processes from steps S106 to S108 are not executed and the process flow proceeds to step S109.

Figure 31:
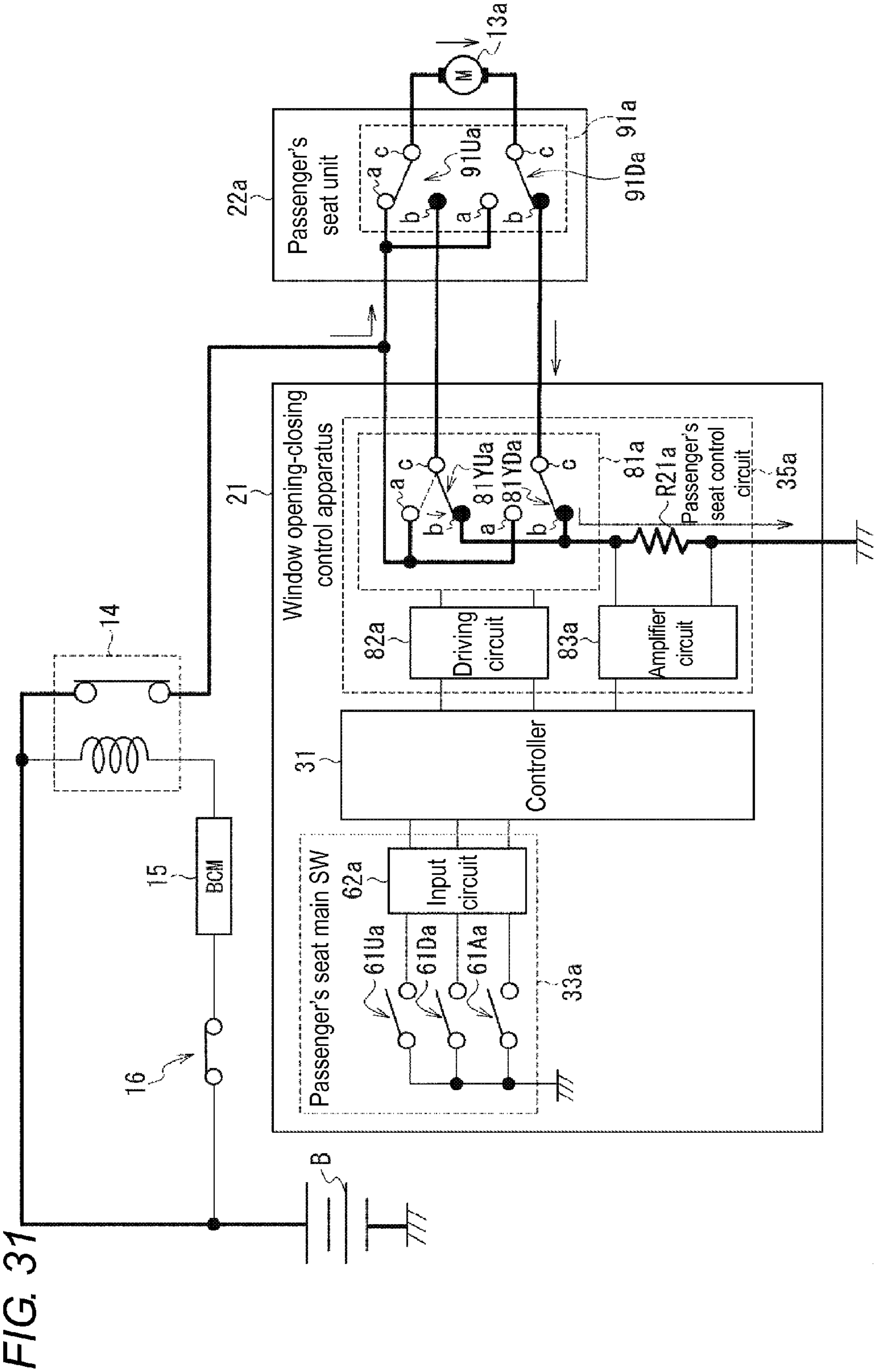
FIG. 31 is an explanatory diagram of the automatically closing motion with the passenger's seat sub switch according to the third embodiment.

As in step S7 in FIG. 11, the passenger's seat relay contact on the close side is turned OFF in step S109 and the window opening-closing process ends. As indicated in the left half in FIG. 27, if the closing operation to the passenger's seat sub switch 91*a* is performed continuously for not less than the prescribed time period Tc, the relay contact 81YUa is turned OFF as depicted in FIG. 31. Motor current does not change in route in this case, so that the closing motion of the front passenger's seat window continues.

If the closing operation to the passenger's seat sub switch 91*a* then ends and the contact 91Ua is turned OFF, motor current to the motor 13*a* stops and the closing motion of the front passenger's seat window stops.

If the operation detector 101 determines that the closing operation has ended in step S102, in other words, if the closing operation ends before the prescribed time period Tb elapses, the processes from steps S103 to S109 are not executed and the window opening-closing process ends.

If the operation detector 101 determines that the opening operation is performed in step S101, the process flow proceeds to step S110.

As in step S8 in FIG. 11, the operation detector 101 determines whether or not the opening operation is performed continuously in step S110. If the operation detector 101 determines that the opening operation is performed continuously, the process flow proceeds to step S111.

As in step S103, the operation detector 101 determines whether or not the prescribed time period Tb has elapsed in step S111. If the operation detector 101 determines that the prescribed time period Tb has not yet elapsed, the process flow returns to step S110.

The processes in steps S110 and S111 are then repeated until the operation detector 101 determines that the opening operation has ended in step S110 or determines that the prescribed time period Tb has elapsed in step S111.

If the operation detector 101 determines that the prescribed time period Tb has elapsed in step S111, the process flow proceeds to step S112.

Figure 32:
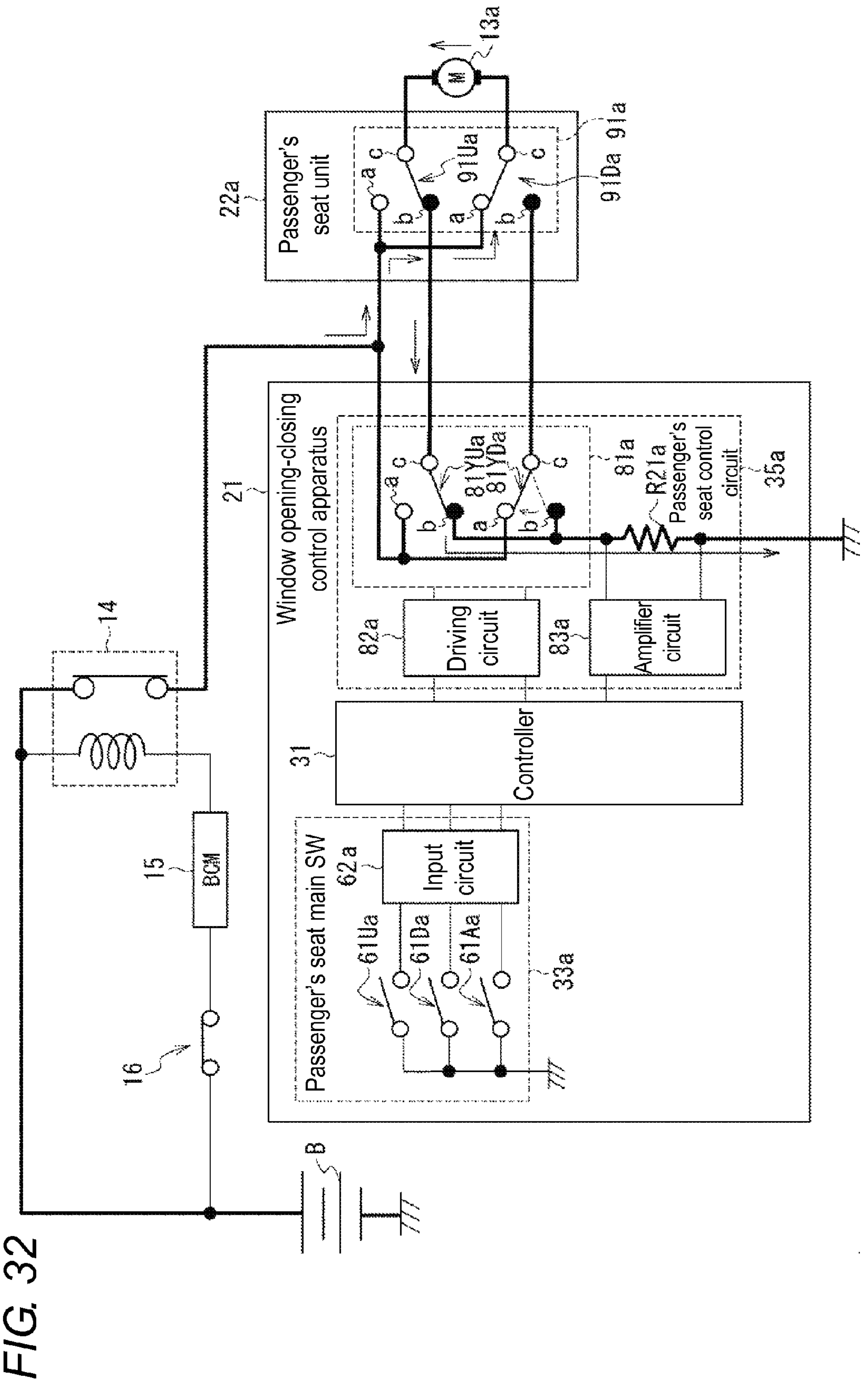
FIG. 32 is an explanatory diagram of automatically opening motion with the passenger's seat sub switch according to the third embodiment.

As in step S10 in FIG. 11, the passenger's seat relay contact on the open side is turned ON in step S112. Specifically, the relay contact 81YDa is turned ON as depicted in FIG. 32. Motor current does not change in route in this case, so that the opening motion of the front passenger's seat window continues.

As in step S105, the operation detector 101 determines whether or not the prescribed time period Tc has elapsed in step S113. If the operation detector 101 determines that the prescribed time period Tc has not yet elapsed, the process flow proceeds to step S114.

As in step S8 in FIG. 11, the operation detector 101 determines whether or not the opening operation is performed continuously in step S114. If the operation detector 101 determines that the opening operation is performed continuously, the process flow returns to step S113.

The processes in steps S113 and S114 are then repeated until the operation detector 101 determines that the prescribed time period Tc has elapsed in step S113 or determines that the opening operation has ended in step S114.

Figure 33:
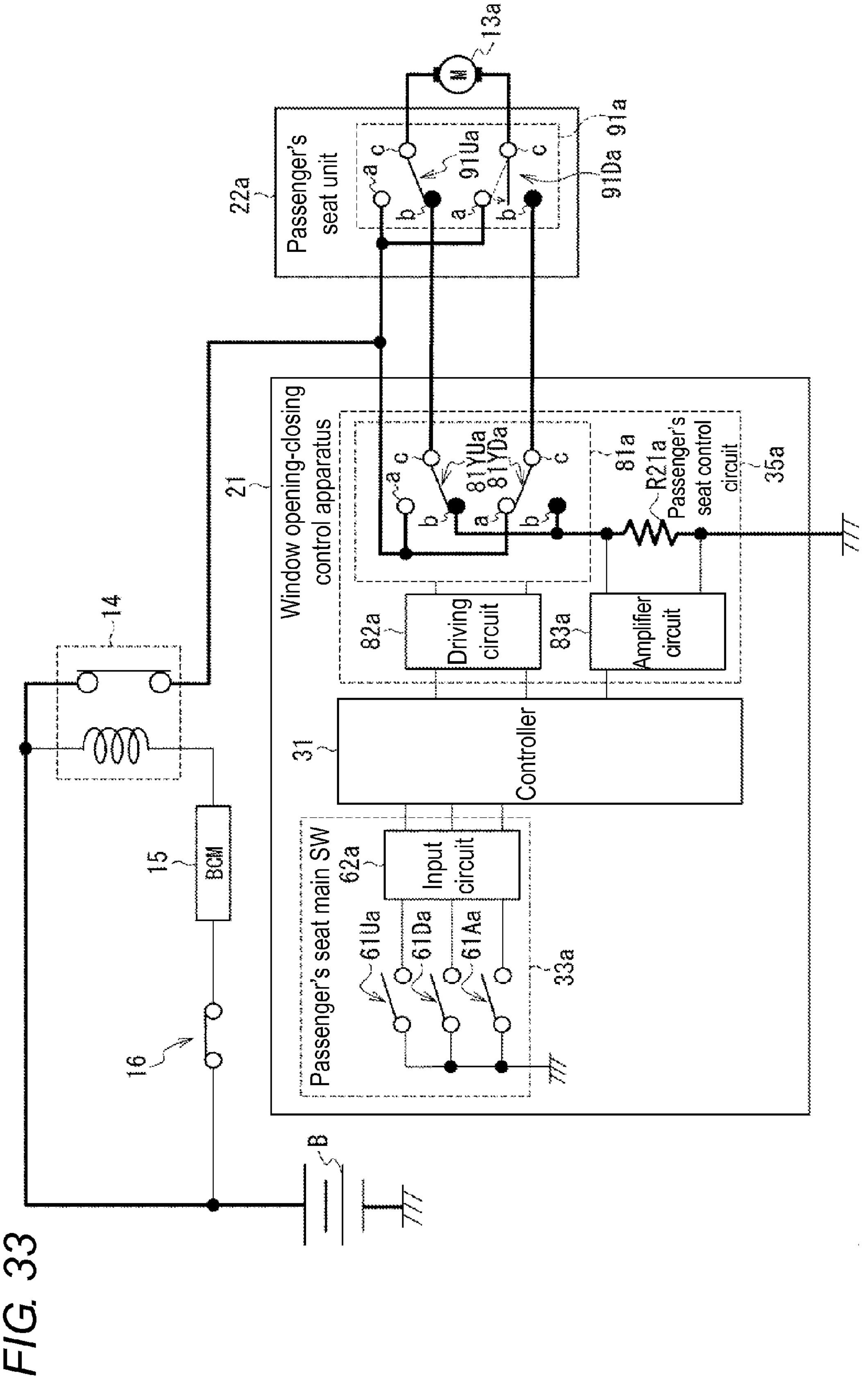
FIG. 33 is an explanatory diagram of the automatically opening motion with the passenger's seat sub switch according to the third embodiment.
Figure 34:
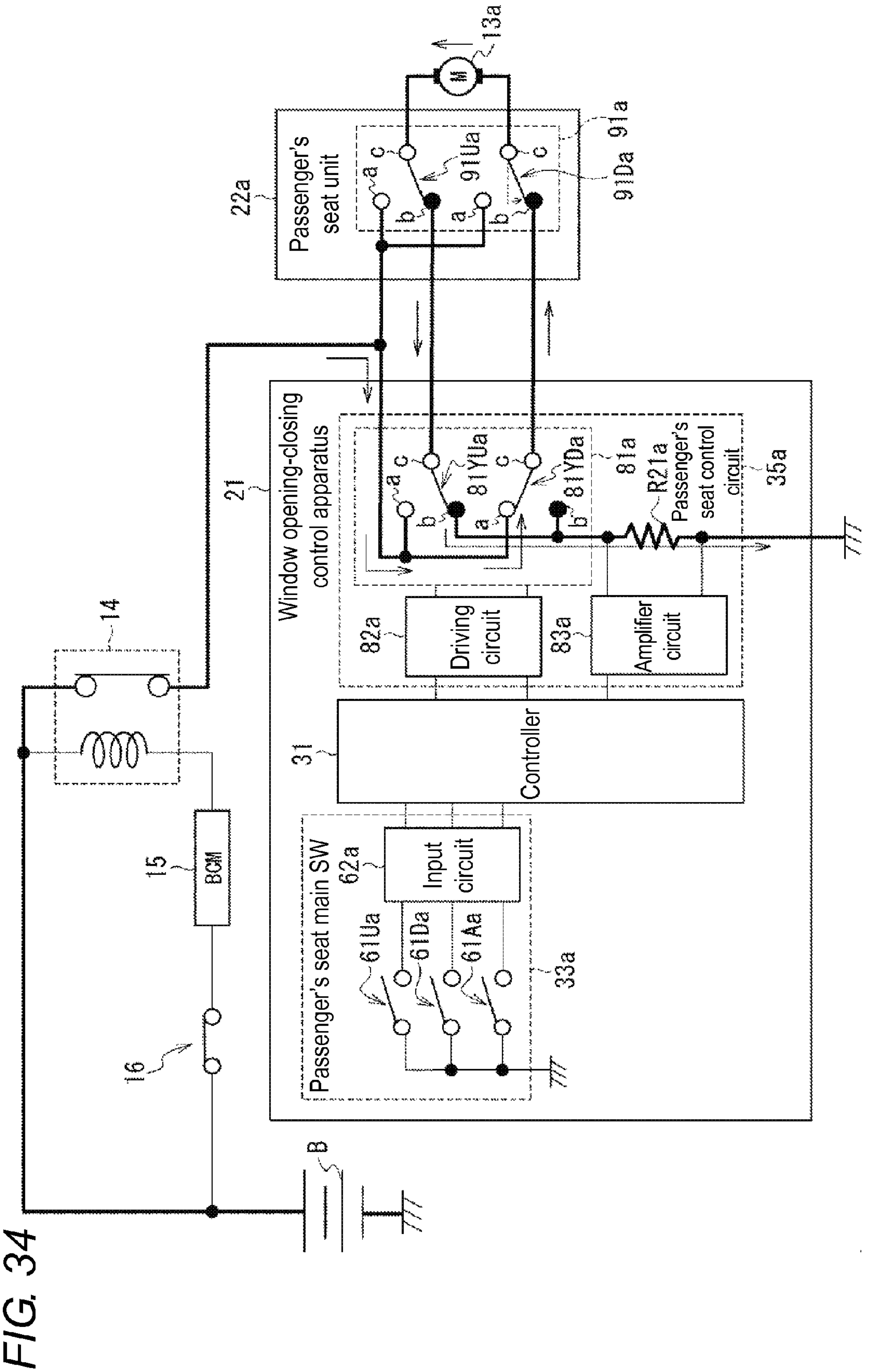
FIG. 34 is an explanatory diagram of the automatically opening motion with the passenger's seat sub switch according to the third embodiment.

While the opening operation to the passenger's seat sub switch 91*a* ends, the terminal c and the terminal a of the contact 91Da are disconnected from each other, and the terminal c and the terminal b are connected to each other in step S114, the contact 91Da is in the contactless state and motor current stops instantaneously as depicted in FIG. 33. If the contact 91Da is thereafter turned OFF as depicted in FIG. 34, current flows from the power supply B to ground via the main relay 14, the terminal a of the relay contact 81YDa, the terminal b of the contact 91Da, the motor 13*a*, the terminal b of the contact 91Ua, the terminal b of the relay contact 81YUa, and the resistor R21*a*. In other words, motor current restarts flowing in the backward direction to the motor 13*a*.

As indicated in the right half in FIG. 26, motor current at the motor 13*a* thus decreases instantaneously after end of the opening operation and then returns to the stable state. If the operation detector 101 detects such brief decrease in motor current, the operation detector 101 determines that the opening operation has ended. The process flow then proceeds to step S115.

Thereafter, as indicated in the right half in FIG. 26, the passenger's seat relay contact 81YDa serving as the passenger's seat relay contact on the open side is kept ON even after the prescribed time period Tc elapses.

Subsequently in steps S115 to S117, processes similar to the processes from steps S11 to S13 in FIG. 11 are executed and the window opening-closing process ends. In this manner, the automatically opening motion of automatically fully opening the front passenger's seat window is achieved if the opening operation to the passenger's seat sub switch 91*a* ends before the prescribed time period Tc elapses, unless the opening operation is canceled halfway. Motor current may instantaneously stop at end of the opening operation to the passenger's seat sub switch 91*a* and the front passenger's seat window may move slowly. Such slow motion can be made to continue only briefly so that no user cares.

If the operation detector 101 determines that the prescribed time period Tc has elapsed in step S113, the processes from steps S114 to S116 are not executed and the process flow proceeds to step S117.

Figure 35:
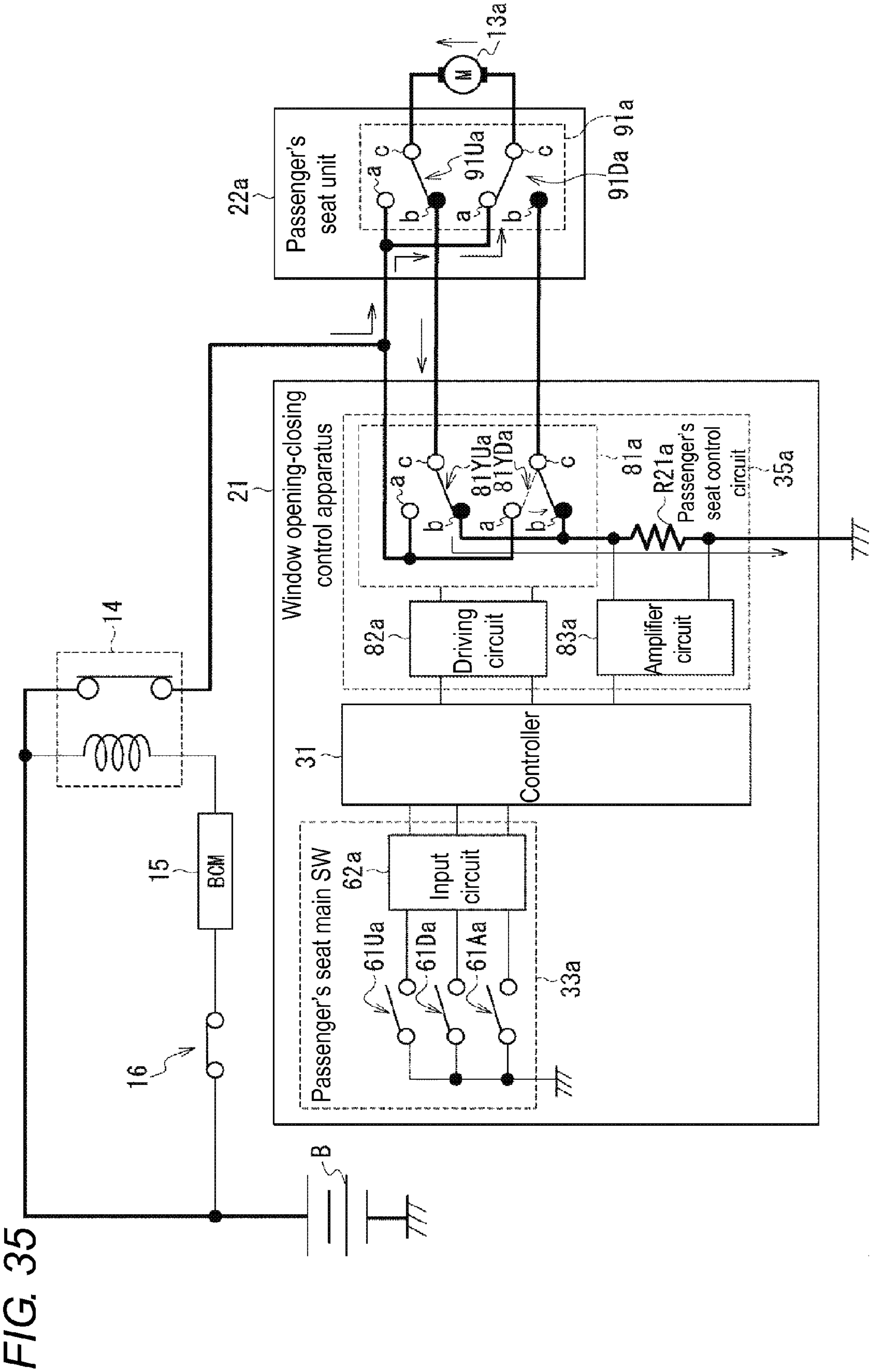
FIG. 35 is an explanatory diagram of the automatically opening motion with the passenger's seat sub switch according to the third embodiment.

As in step S13 in FIG. 11, the passenger's seat relay contact on the open side is turned OFF in step S117 and the window opening-closing process ends. As indicated in the right half in FIG. 27, if the opening operation to the passenger's seat sub switch 91*a* is performed continuously for not less than the prescribed time period Tc, the relay contact 81YDa is turned OFF as depicted in FIG. 35. Motor current does not change in route in this case, so that the closing motion of the front passenger's seat window continues.

If the opening operation to the passenger's seat sub switch 91*a* then ends and the contact 91Da is turned OFF, motor current to the motor 13*a* stops and the opening motion of the front passenger's seat window stops.

If the operation detector 101 determines that the opening operation has ended in step S110, in other words, if the opening operation ends before the prescribed time period Tb elapses, the processes from steps S111 to S117 are not executed and the window opening-closing process ends.

As described above, the closing operation or the opening operation is performed to the passenger's seat sub switch 91*a* continuously for a period not less than the prescribed time period Tb and less than the prescribed time period Tc, so as to achieve the automatic operation to the front passenger's seat window. Also achieved is prevention of discontinuous opening and closing of the front passenger's seat window.

The automatic operation to the rear right passenger's seat window and the rear left passenger's seat window can be achieved by similarly operating the passenger's seat sub switches 91*b* and 91*c*.

<2. Modification Examples>

Described below are modification examples of one or more embodiments according to the disclosure.

The above description exemplifies the case where there are the three passenger's seat windows, while the number of passenger's seat windows can be set optionally. The numbers of the motors 13, the passenger's seat units 22, the passenger's seat main switches 33, and the passenger's seat control circuits 35 can be increased or decreased in accordance with the number of the passenger's seat windows.

The main relay 14 can be replaced with a manual switch or the like, or the ignition switch 16 can be provided directly.

The above description exemplifies the case where the prescribed time periods Ta to Tc spent for detection of the automatically closing operation and the automatically opening operation are equally set for both the automatically closing operation and the automatically opening operation. Alternatively, the prescribed time periods Ta to Tc can be set differently for the automatically closing operation and the automatically opening operation.

The methods of detecting the automatically closing operation and the automatically opening operation are not necessarily the same. For example, the automatically closing operation can be determined as having been performed if the closing operation to the passenger's seat sub switch 91 continues for not less than the prescribed time period Ta. Furthermore, the automatically opening operation can be determined as having been performed if the opening operation to the passenger's seat sub switch 91 continues for not less than the prescribed time period Tb and less than the prescribed time period Tc.

The positions of the resistors (motor current detectors) configured to detect motor current at the motors 13 are not limited to the positions mentioned earlier. For example, a resistor can be provided between the terminal b of the relay contact 81YUa and ground, another resistor can be provided between the terminal b of the relay contact 81YDa and ground, and the resistors can be each connected with an amplifier circuit, so as to enable detection of motor current at the motor 13*a*. Alternatively, a resistor can be provided between the terminal c of the relay contact 81YUa and the terminal b of the relay contact 91Ua, another resistor can be provided between the terminal c of the relay contact 81YDa and the terminal b of the relay contact 91Da, and the resistors can be each connected with an amplifier circuit, so as to enable detection of motor current at the motor 13*a*. In these manners, the resistors can be provided anywhere on the route of current flowing to the passenger's seat motor 13.

Motor current at each of the motors can be detected in accordance with a method other than the above method of measuring voltage at the both ends of the resistor.

The disclosure is applicable to a vehicle of any type provided with an automatic window function.

Embodiments of the invention should not be limited to those embodiments described above but can be modified variously within the range not departing from the gist of the invention.

The invention claimed is:

1. A window opening-closing control system configured to control opening and closing a window at a driver's seat and a window at a passenger's seat other than the driver's seat in a vehicle, the window opening-closing control system comprising:

a passenger's seat unit provided at the passenger's seat; and a window opening-closing control apparatus provided at the driver's seat and configured to control a driver's seat motor configured to open and close the window at the driver's seat and a passenger's seat motor configured to open and close the window at the passenger's seat;

the passenger's seat unit including:

a momentary passenger's seat sub switch having a first contact operated to close the window at the passenger's seat and a second contact operated to open the window at the passenger's seat;

the first contact including:

a first common terminal connected to a first end of the passenger's seat motor;

a first normally opened terminal connected to a positive electrode of a power supply of the vehicle via a wire, and connected to the first common terminal in response to closing operation for closing the window at the passenger's seat; and a first normally closed terminal;

the second contact including:

a second common terminal connected to a second end of the passenger's seat motor;

a second normally opened terminal connected to the positive electrode of the power supply via the wire, and connected to the second common terminal in response to opening operation for opening the window at the passenger's seat; and a second normally closed terminal;

the window opening-closing control apparatus including:

a driver's seat main switch operated to open and close the window at the driver's seat;

a passenger's seat main switch having a third contact operated to close the window at the passenger's seat and a fourth contact operated to open the window at the passenger's seat, the passenger's seat main switch operated to open and close the window at the passenger's seat;

a motor current detector configured to detect current flowing to the passenger's seat motor;

a first relay circuit unit including a first common relay terminal connected to the first normally closed terminal, a first normally opened relay terminal connected to the positive electrode of the power supply, and a first normally closed relay terminal connected to ground;

a second relay circuit unit including a second common relay terminal connected to the second normally closed terminal, a second normally opened relay terminal connected to the positive electrode of the power supply, and a second normally closed relay terminal connected to ground;

an operation detector configured to detect operation to the passenger's seat sub switch in accordance with motor current detected by the motor current detector; and an opening-closing controller configured to control the first relay circuit unit and the second relay circuit unit in accordance with the operation to the passenger's seat sub switch;

wherein the operation detector detects whether the closing operation or the opening operation is performed to the passenger's seat sub switch in accordance with an amount of the motor current and detects duration of the operation to the passenger's seat sub switch, and wherein the opening-closing controller controls the first relay circuit unit or the second relay circuit unit to execute automatic motion of automatically closing or opening the window at the passenger's seat in accordance with the duration of the operation to the passenger's seat sub switch.

2. The window opening-closing control system according to claim 1, wherein the operation detector controls the first relay circuit unit or the second relay circuit unit to execute the automatic motion if the duration of the operation to the passenger's seat sub switch is less than a predetermined first prescribed time period.

3. The window opening-closing control system according to claim 2, wherein if the operation detector detects that the duration of the closing operation to the passenger's seat sub switch is not less than a predetermined second prescribed time period shorter than the first prescribed time period and less than the first prescribed time period, the opening-closing controller connects the first common relay terminal and the first normally opened relay terminal for the second prescribed time period and keeps the connection for more than the first prescribed time period, wherein if the operation detector detects that the duration of the closing operation to the passenger's seat sub switch is not less than the first prescribed time period, the opening-closing controller connects the first common relay terminal and the first normally opened relay terminal for the second prescribed time period and subsequently switches to connect the first common relay terminal to the first normally closed relay terminal for the first prescribed time period, wherein if the operation detector detects that the duration of the opening operation to the passenger's seat sub switch is not less than a predetermined second prescribed time period shorter than the first prescribed time period and less than the first prescribed time period, the opening-closing controller connects the second common relay terminal and the second normally opened relay terminal for the second prescribed time period and keeps the connection for more than the first prescribed time period, and wherein if the operation detector detects that the duration of the opening operation to the passenger's seat sub switch is not less than the first prescribed time period, the opening-closing controller connects the second common relay terminal and the second normally opened relay terminal for the second prescribed time period and subsequently switches to connect the second common relay terminal to the second normally closed relay terminal for the first prescribed time period.

4. The window opening-closing control system according to claim 2, wherein the opening-closing controller connects the first common relay terminal and the first normally opened relay terminal if the closing operation to the passenger's seat sub switch ends before the first prescribed time period elapses, and the opening-closing controller connects the second common relay terminal and the second normally opened relay terminal if the opening operation to the passenger's seat sub switch ends before the first prescribed time period elapses.

5. The window opening-closing control system according to claim 1, wherein the opening-closing controller controls the first relay circuit unit or the second relay circuit unit to execute the automatic motion if the duration of the operation to the passenger's seat sub switch is more than a predetermined third prescribed time period.

6. The window opening-closing control system according to claim 5, wherein the opening-closing controller connects the first common relay terminal and the first normally opened relay terminal if the closing operation to the passenger's seat sub switch continues for not less than the third prescribed time period and keeps the connection between the first common relay terminal and the first normally opened relay terminal after the closing operation ends, and the opening-closing controller connects the second common relay terminal and the second normally opened relay terminal if the opening operation to the passenger's seat sub switch continues for not less than the first prescribed time period and keeps the connection between the second common relay terminal and the second normally opened relay terminal after the opening operation ends.

7. The window opening-closing control system according to claim 1, wherein the operation detector detects whether the closing operation or the opening operation is performed to the passenger's seat sub switch in accordance with the amount of the motor current.

8. A window opening-closing control apparatus connected to a passenger's seat unit provided at a passenger's seat other than a driver's seat in a vehicle, the passenger's seat unit including:

a momentary passenger's seat sub switch having a first contact operated to close a window at the passenger's seat and a second contact operated to open the window at the passenger's seat;

the first contact including:

a first common terminal connected to a first end of a passenger's seat motor configured to open and close the window at the passenger's seat;

a first normally opened terminal connected to a positive electrode of a power supply of the vehicle via a wire, and connected to the first common terminal in response to closing operation for closing the window at the passenger's seat; and a first normally closed terminal;

the second contact including:

a second common terminal connected to a second end of the passenger's seat motor;

a second normally opened terminal connected to the positive electrode of the power supply via the wire, and connected to the second common terminal in response to opening operation for opening the window at the passenger's seat; and a second normally closed terminal;

the window opening-closing control apparatus provided at the driver's seat in the vehicle and configured to control a driver's seat motor configured to open and close a window at the driver's seat and the passenger's seat motor;

the window opening-closing control apparatus comprising:

a driver's seat main switch operated to open and close the window at the driver's seat;

a passenger's seat main switch having a third contact operated to close the window at the passenger's seat and a fourth contact operated to open the window at the passenger's seat, the passenger's seat main switch operated to open and close the window at the passenger's seat;

a motor current detector configured to detect current flowing to the passenger's seat motor;

a first relay circuit unit including a first common relay terminal connected to the first normally closed terminal, a first normally opened relay terminal connected to the positive electrode of the power supply, and a first normally closed relay terminal connected to ground;

a second relay circuit unit including a second common relay terminal connected to the second normally closed terminal, a second normally opened relay terminal connected to the positive electrode of the power supply, and a second normally closed relay terminal connected to ground;

an operation detector configured to detect operation to the passenger's seat sub switch in accordance with motor current detected by the motor current detector; and an opening-closing controller configured to control the first relay circuit unit and the second relay circuit unit in accordance with the operation to the passenger's seat sub switch;

wherein the operation detector detects whether the closing operation or the opening operation is performed to the passenger's seat sub switch in accordance with an amount of the motor current and detects duration of the operation to the passenger's seat sub switch, and the opening-closing controller controls the first relay circuit unit or the second relay circuit unit to execute automatic motion of automatically closing or opening the window at the passenger's seat in accordance with the duration of the operation to the passenger's seat sub switch.

* * * * *